United States Patent [19]
Martin et al.

[11] Patent Number: 6,165,062
[45] Date of Patent: Dec. 26, 2000

[54] METHOD AND APPARATUS FOR VENTING/ OPENING, EVISCERATING/CROPPING, INSPECTING AND CLEANING OF POULTRY.

[75] Inventors: Eugene G. Martin, Denver; Scott A. Cook, Strasburg, both of Pa.

[73] Assignee: Foodcraft Equipment Co., Ltd., Topeka, Kans.

[21] Appl. No.: 09/537,927

[22] Filed: Mar. 29, 2000

Related U.S. Application Data

[60] Division of application No. 09/014,342, Jan. 27, 1998, and a continuation-in-part of application No. 08/717,126, Sep. 20, 1996, Pat. No. 5,993,308.
[60] Provisional application No. 60/044,754, Apr. 21, 1997.

[51] Int. Cl.$^7$ .................................................. A22B 5/18
[52] U.S. Cl. ........................... 452/116; 452/123; 452/173
[58] Field of Search ........................ 452/173, 123, 452/116

[56] References Cited

U.S. PATENT DOCUMENTS

| | | |
|---|---|---|
| Re. 21,983 | 12/1941 | Brodeur . |
| Re. 28,666 | 12/1975 | Harben, Jr. . |
| Re. 32,402 | 4/1987 | Graham et al. . |
| 1,798,585 | 3/1931 | Bookheim . |
| 1,837,535 | 12/1931 | Duffey et al. . |
| 1,943,077 | 1/1934 | Jansen . |
| 1,984,562 | 12/1934 | Ashby . |
| 1,986,195 | 1/1935 | Griffin . |
| 2,189,484 | 2/1940 | Brodeur . |
| 2,327,224 | 8/1943 | Spang . |
| 2,381,044 | 8/1945 | Franz . |
| 2,423,299 | 7/1947 | Davis ..................... 452/116 |
| 2,427,840 | 9/1947 | Davis . |
| 2,517,168 | 8/1950 | Bennek . |
| 2,547,608 | 4/1951 | Toti et al. . |
| 2,590,785 | 3/1952 | Nealy . |
| 2,605,496 | 8/1952 | Spang . |
| 2,613,391 | 10/1952 | Still . |
| 2,723,421 | 11/1955 | Smith et al. . |
| 2,738,547 | 3/1956 | Zebarth . |
| 2,774,101 | 12/1956 | Ograbisz . |
| 2,795,815 | 6/1957 | Dahlberg . |
| 2,795,817 | 6/1957 | Dahlberg ..................... 452/116 |
| 2,818,599 | 1/1958 | Howe . |
| 2,830,319 | 4/1958 | Muntz . |
| 2,839,781 | 6/1958 | Jarvis . |
| 2,846,717 | 8/1958 | Patterson et al. . |
| 2,943,346 | 7/1960 | Jensen . |
| 2,975,469 | 3/1961 | Viscolosi . |
| 2,997,736 | 8/1961 | Ine . |
| 3,042,186 | 7/1962 | Varney . |
| 3,147,513 | 9/1964 | Schneider et al. . |
| 3,474,492 | 10/1969 | Viscolosi . |
| 3,510,907 | 5/1970 | Rejsa et al. . |
| 3,526,018 | 9/1970 | Lovitt . |
| 3,555,593 | 1/1971 | Scheier . |
| 3,559,233 | 2/1971 | Bottomley et al. . |
| 3,571,844 | 3/1971 | Stiles . |

(List continued on next page.)

*Primary Examiner*—Willis Little
*Attorney, Agent, or Firm*—Akin, Gump, Strauss, Hauer & Feld, L.L.P.

[57] ABSTRACT

A poultry processing machine is provided which automatically vents and opens the poultry, eviscerates the poultry, displays the poultry for inspection, and either provides a normal or radical clean out procedure to the poultry. When the poultry is being physically processed, it is maintained in a generally stationary position with respect to the surface supporting the poultry processor to provide for uniform positioning of the poultry on the conveyor. Further, the poultry is positioned in a generally horizontal position during the venting and opening, eviscerating and cleaning procedures, to facilitate removing the unwanted materials from the poultry without increasing the risk of contamination. The eviscerating station uses an eviscerating tool which includes an opening sized to receive the viscera package therethrough during the eviscerating process to prevent damage to the viscera package. The clean out station automatically recognizes whether a particular poultry is to receive the normal or radical clean out procedure, thereby reducing processing time.

12 Claims, 45 Drawing Sheets

U.S. PATENT DOCUMENTS

| | | |
|---|---|---|
| 3,605,179 | 9/1971 | Harben, Jr. . |
| 3,634,908 | 1/1972 | Chamberlain . |
| 3,653,093 | 4/1972 | Scheier . |
| 3,663,991 | 5/1972 | Harben, Jr. . |
| 3,685,096 | 8/1972 | Harben, Jr. . |
| 3,689,961 | 9/1972 | Crane . |
| 3,705,440 | 12/1972 | Lewis . |
| 3,711,897 | 1/1973 | Viscolosi . |
| 3,737,948 | 6/1973 | Van Mil . |
| 3,750,231 | 8/1973 | Schreuder . |
| 3,766,602 | 10/1973 | Bottomley et al. . |
| 3,769,656 | 11/1973 | Jahnke . |
| 3,802,028 | 4/1974 | Scheier et al. . |
| 3,803,669 | 4/1974 | Dillon . |
| 3,806,988 | 4/1974 | Harben, Jr. . |
| 3,837,045 | 9/1974 | Blacker . |
| 3,879,803 | 4/1975 | Verbakel . |
| 3,886,635 | 6/1975 | Meyn . |
| 3,902,221 | 9/1975 | Harben, Jr. et al. . |
| 3,908,229 | 9/1975 | Harben, Jr. et al. . |
| 3,958,302 | 5/1976 | Meyn . |
| 3,958,303 | 5/1976 | Scheier et al. . |
| 3,979,793 | 9/1976 | Hazenbroek . |
| 3,983,601 | 10/1976 | Verbakel . |
| 3,986,231 | 10/1976 | Harben, Jr. . |
| 4,004,320 | 1/1977 | Scheier et al. . |
| 4,019,222 | 4/1977 | Scheier et al. . |
| 4,023,237 | 5/1977 | Meyn . |
| 4,024,603 | 5/1977 | Harben, Jr. et al. . |
| 4,059,868 | 11/1977 | Meyn . |
| 4,087,886 | 5/1978 | Aubert . |
| 4,097,960 | 7/1978 | Graham et al. . |
| 4,106,161 | 8/1978 | Niccolls . |
| 4,117,570 | 10/1978 | Meyn . |
| 4,118,829 | 10/1978 | Harben, Jr. . |
| 4,131,973 | 1/1979 | Verbakel . |
| 4,136,421 | 1/1979 | Scheier et al. . |
| 4,153,972 | 5/1979 | Harben et al. . |
| 4,155,146 | 5/1979 | Meyn . |
| 4,178,659 | 12/1979 | Simonds . |
| 4,185,359 | 1/1980 | Niccols . |
| 4,208,764 | 6/1980 | Loth et al. . |
| 4,257,142 | 3/1981 | Hathorn et al. . |
| 4,262,387 | 4/1981 | Scheier et al. . |
| 4,265,001 | 5/1981 | Hathorn et al. . |
| 4,266,322 | 5/1981 | van Mil . |
| 4,270,242 | 6/1981 | Loth et al. . |
| 4,283,813 | 8/1981 | House . |
| 4,325,165 | 4/1982 | De Long . |
| 4,339,849 | 7/1982 | van Mil . |
| 4,382,314 | 5/1983 | Graham . |
| 4,418,445 | 12/1983 | Meyn et al. . |
| 4,424,608 | 1/1984 | Martin . |
| 4,467,498 | 8/1984 | Graham et al. . |
| 4,467,500 | 8/1984 | Olson . |
| 4,477,942 | 10/1984 | Martin et al. . |
| 4,480,353 | 11/1984 | Martin et al. . |
| 4,486,920 | 12/1984 | Tieleman et al. . |
| 4,503,587 | 3/1985 | Martin . |
| 4,516,290 | 5/1985 | van Mil . |
| 4,527,304 | 7/1985 | Ullum . |
| 4,550,473 | 11/1985 | Simmons . |
| 4,557,016 | 12/1985 | Market . |
| 4,561,148 | 12/1985 | Bonuchi et al. . |
| 4,563,791 | 1/1986 | Martin et al. . |
| 4,564,977 | 1/1986 | Scheier et al. . |
| 4,570,295 | 2/1986 | van Mil . |
| 4,574,427 | 3/1986 | Harben, Jr. et al. . |
| 4,575,901 | 3/1986 | Lerner . |
| 4,587,690 | 5/1986 | Kress . |
| 4,593,435 | 6/1986 | Martin et al. . |
| 4,597,133 | 7/1986 | van de Nieuwelaar . |
| 4,602,403 | 7/1986 | Martin . |
| 4,610,050 | 9/1986 | Tieleman et al. . |
| 4,616,380 | 10/1986 | Tieleman . |
| 4,677,709 | 7/1987 | Dixon . |
| 4,704,768 | 11/1987 | Hutting et al. . |
| 4,723,340 | 2/1988 | Markert . |
| 4,724,581 | 2/1988 | van de Nieuwealaar . |
| 4,731,907 | 3/1988 | Tieleman . |
| 4,745,658 | 5/1988 | Lerner . |
| 4,788,749 | 12/1988 | Hazenbroek et al. . |
| 4,856,144 | 8/1989 | de Greef . |
| 4,876,767 | 10/1989 | Harben, III et al. . |
| 4,899,421 | 2/1990 | Van Der Eerden . |
| 4,910,829 | 3/1990 | Simmons . |
| 4,918,787 | 4/1990 | Hazenbroek . |
| 4,928,351 | 5/1990 | van den Nieuwelaar et al. . |
| 4,958,408 | 9/1990 | Meyn . |
| 5,026,317 | 6/1991 | Kennedy . |
| 5,041,054 | 8/1991 | van den Nieuwelaar et al. . |
| 5,064,402 | 11/1991 | Koops . |
| 5,098,333 | 3/1992 | Cobb . |
| 5,098,334 | 3/1992 | Molang ................................. 452/116 |
| 5,122,090 | 6/1992 | van de Nieuwelaar et al. . |
| 5,123,871 | 6/1992 | van den Nieuwelaar et al. . |
| 5,133,686 | 7/1992 | van den Nieuwelaar et al. . |
| 5,135,431 | 8/1992 | van den Nieuwelaar et al. . |
| 5,141,471 | 8/1992 | Bekkers . |
| 5,167,568 | 12/1992 | Esbroeck et al. . |
| 5,176,562 | 1/1993 | Martin et al. . |
| 5,178,890 | 1/1993 | van den Nieuwelaar et al. . |
| 5,181,878 | 1/1993 | Bekkers . |
| 5,186,679 | 2/1993 | Meyn . |
| 5,199,922 | 4/1993 | Korenberg et al. . |
| 5,222,905 | 6/1993 | Van den Nieuwelaar et al. . |
| 5,240,454 | 8/1993 | Martin et al. . |
| 5,279,517 | 1/1994 | Koops . |
| 5,306,203 | 4/1994 | Martin et al. . |
| 5,346,427 | 9/1994 | Clark . |
| 5,374,214 | 12/1994 | Martin et al. . |
| 5,425,668 | 6/1995 | Martin et al. . |
| 5,466,185 | 11/1995 | Martin et al. . |
| 5,484,333 | 1/1996 | Martin et al. . |
| 5,499,390 | 3/1996 | Van Ochten et al. . |
| 5,549,521 | 8/1996 | van den Nieuwelaar et al. . |
| 5,580,304 | 12/1996 | Bleth et al. . |
| 5,679,069 | 10/1997 | Van Ochten . |
| 5,928,074 | 7/1999 | Schrader et al. ........................ 452/173 |
| 6,083,095 | 7/2000 | Simmons ............................... 452/173 |

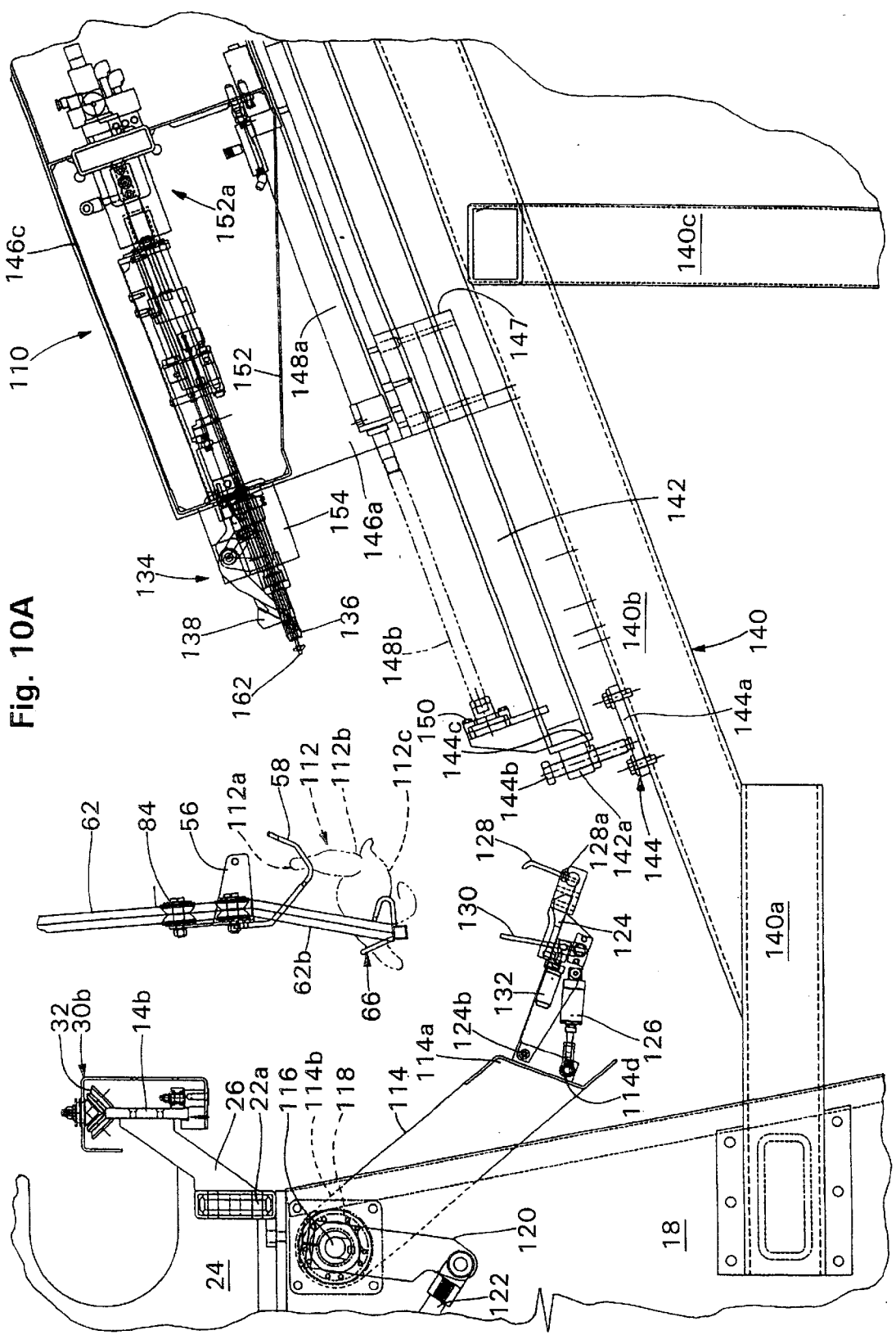

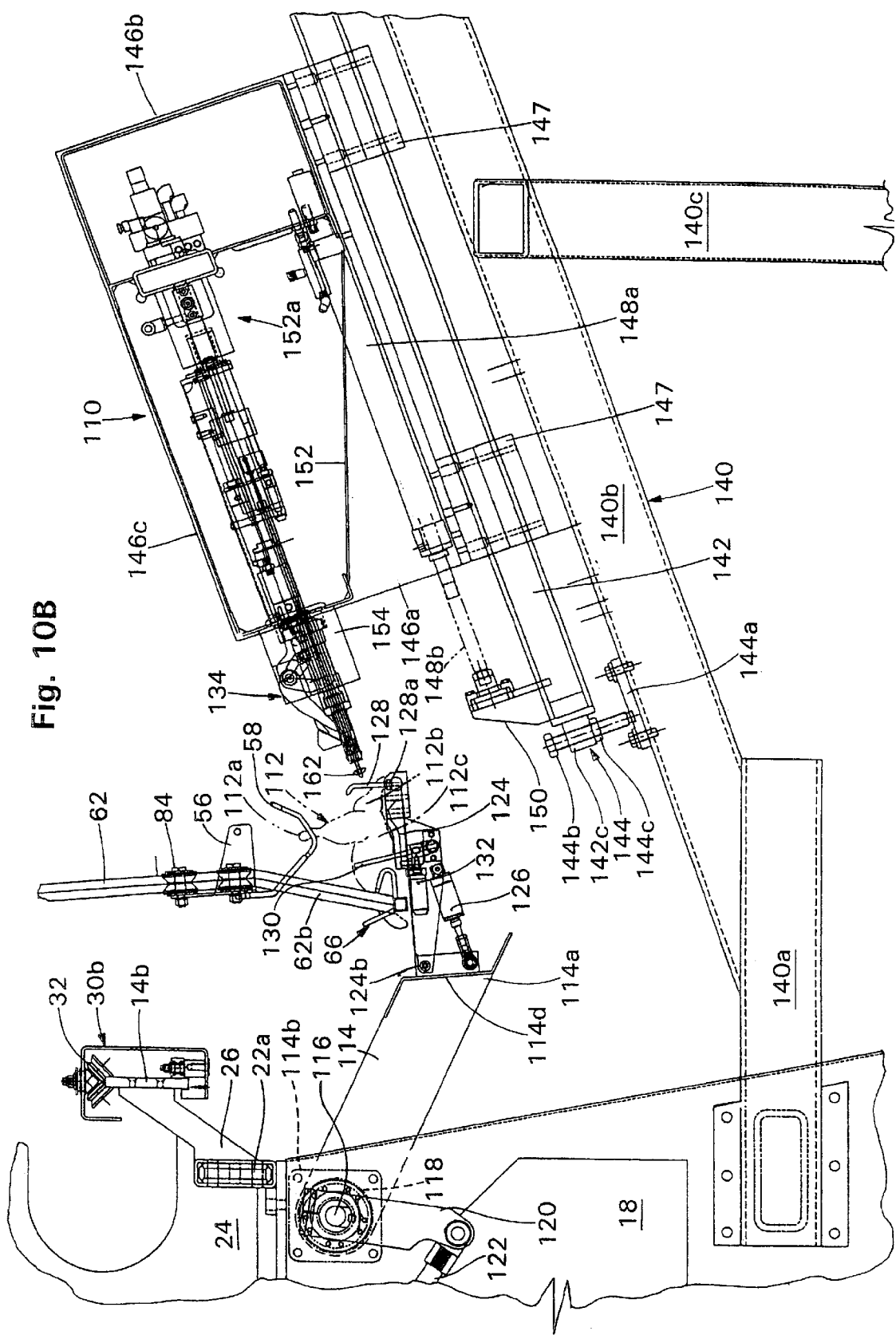

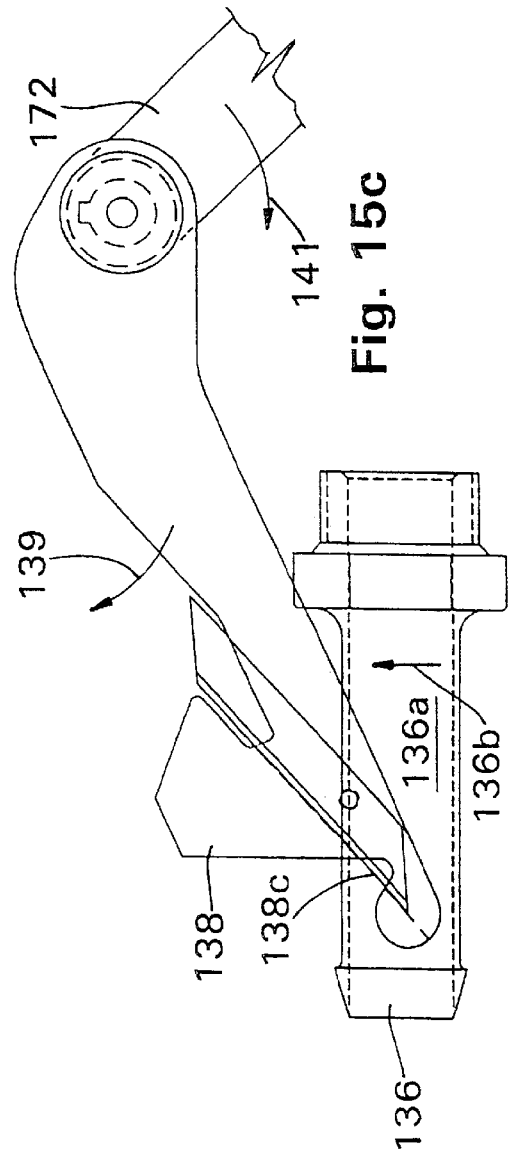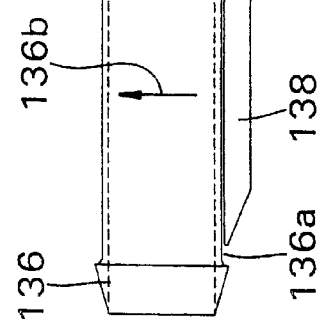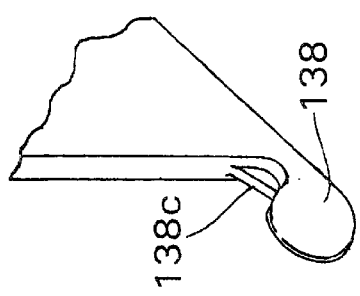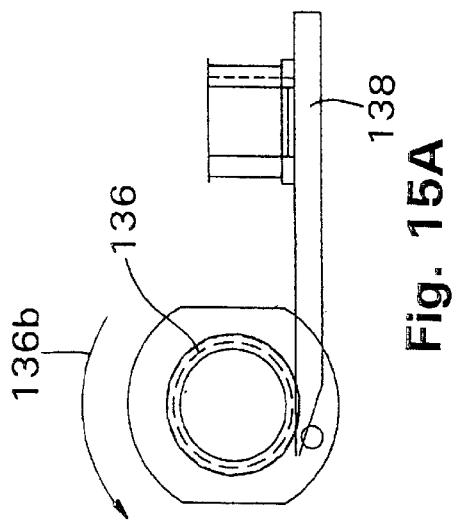

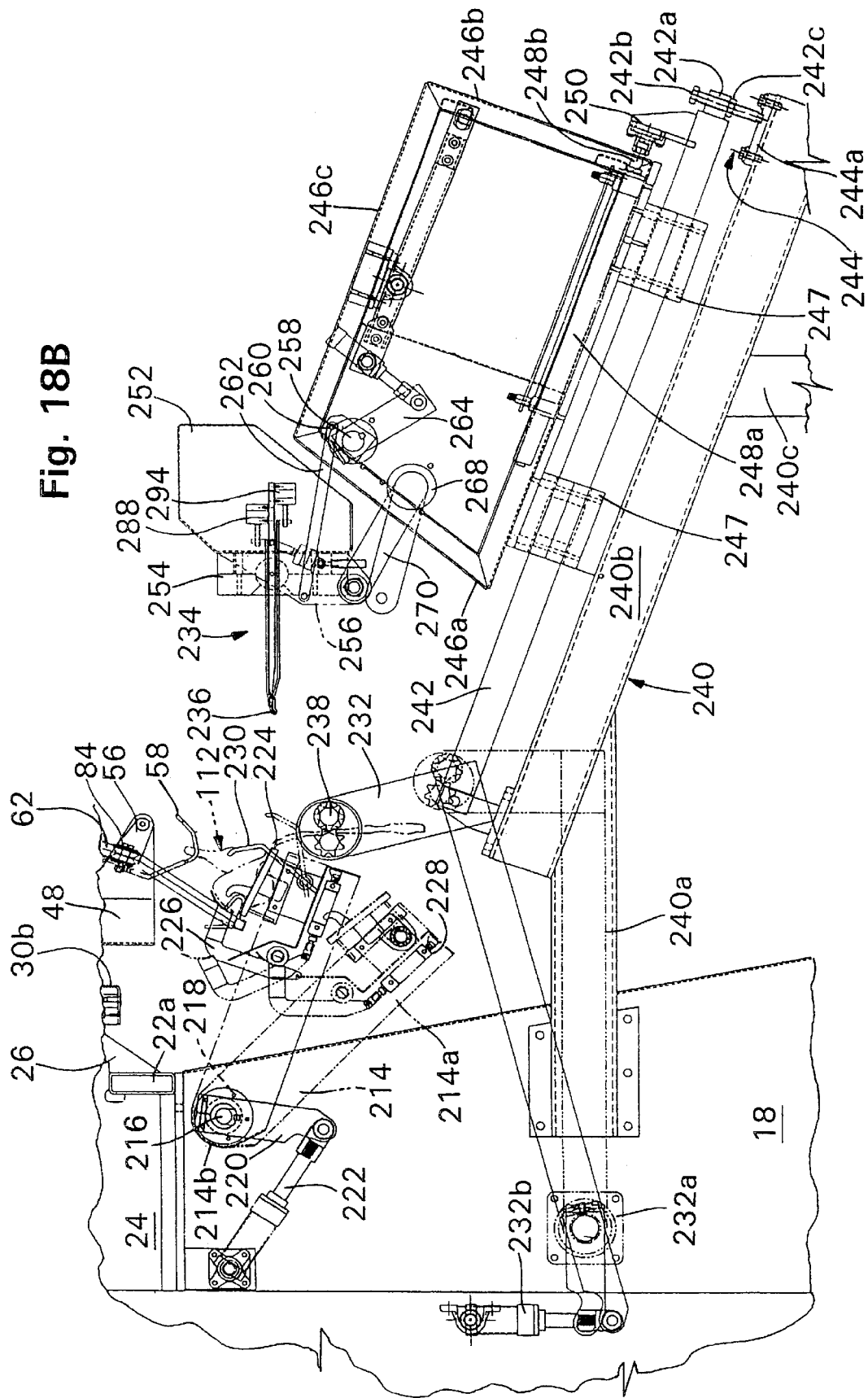

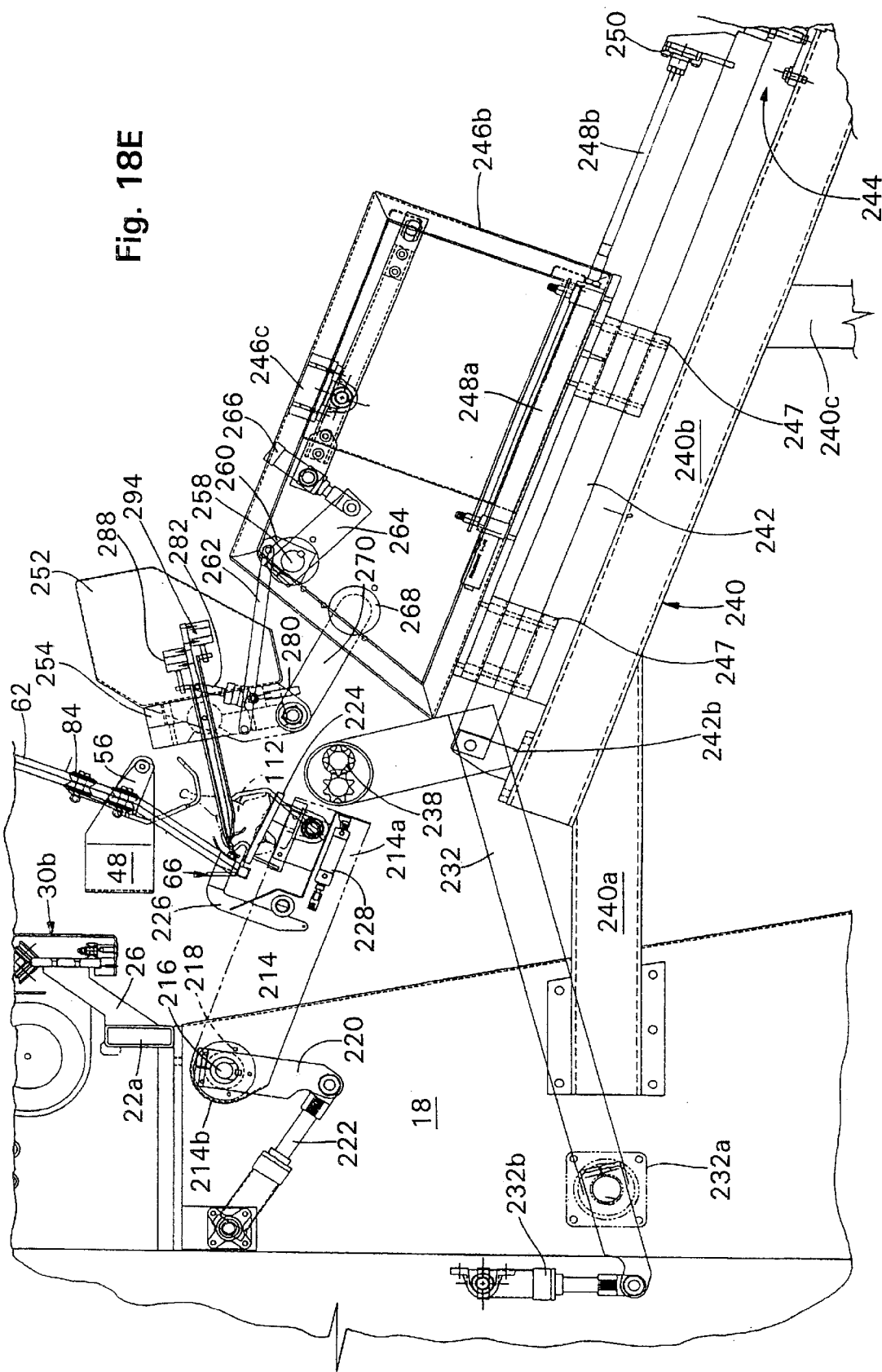

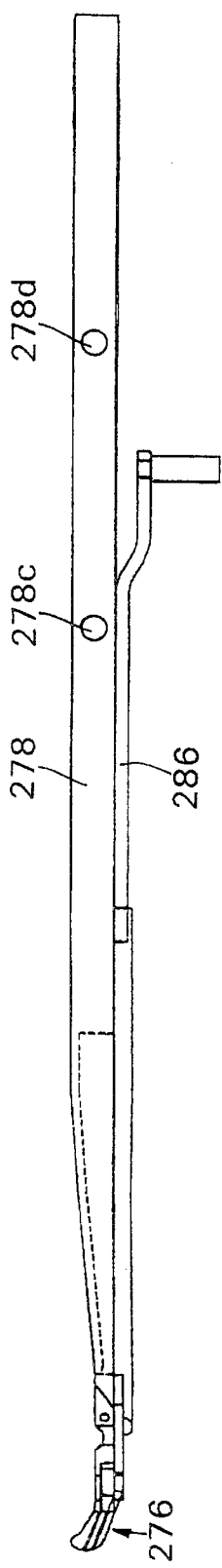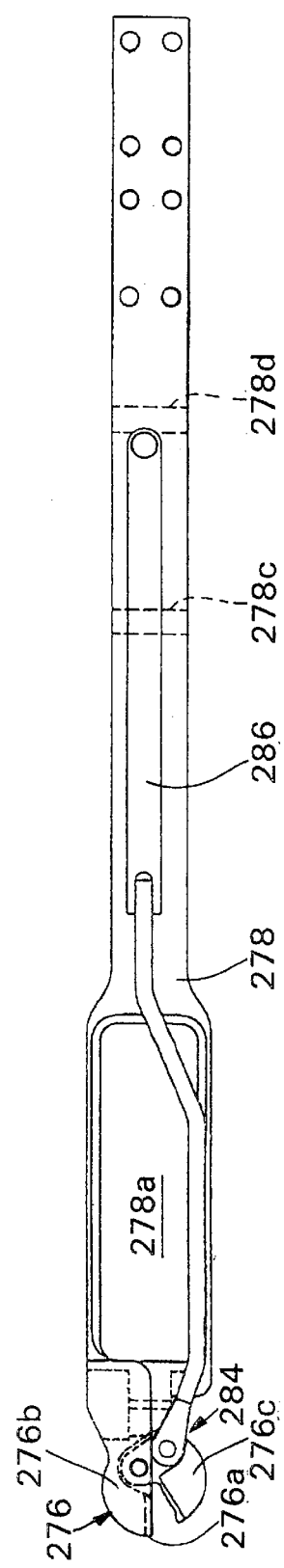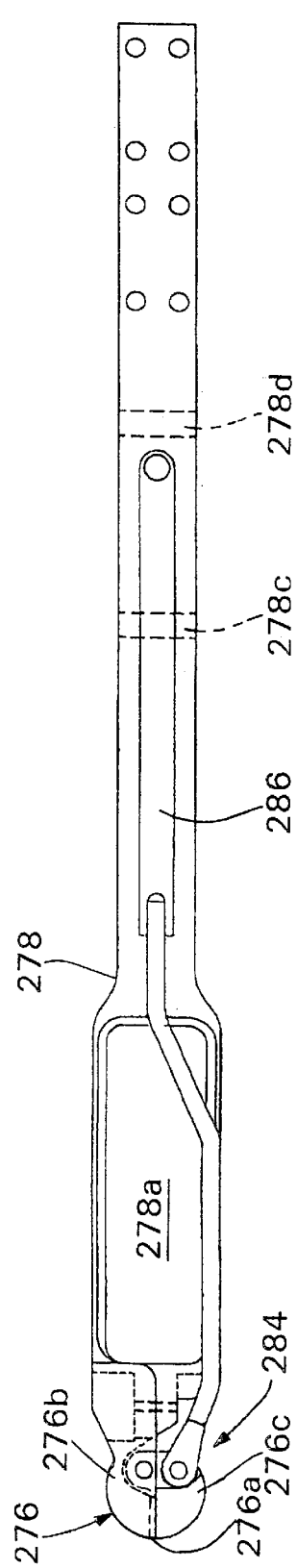

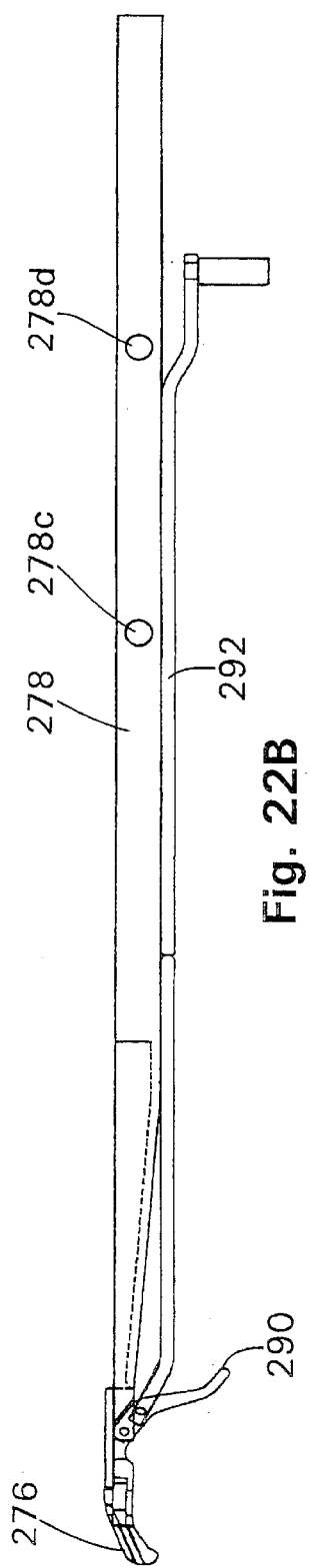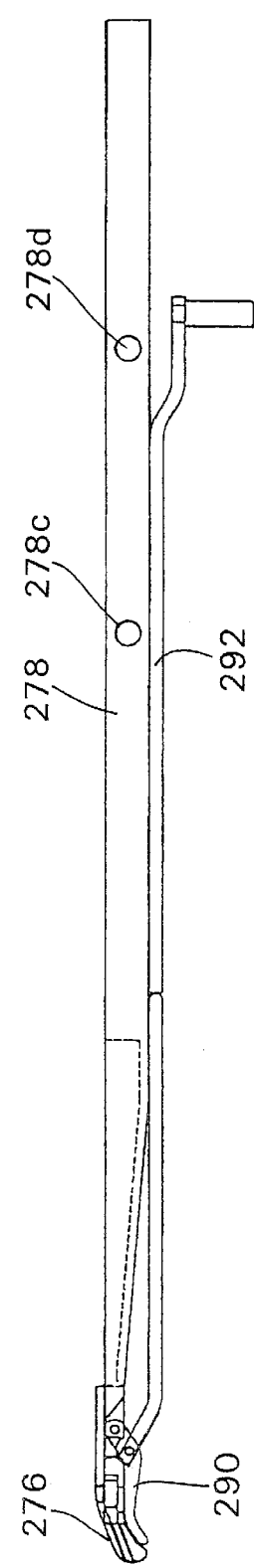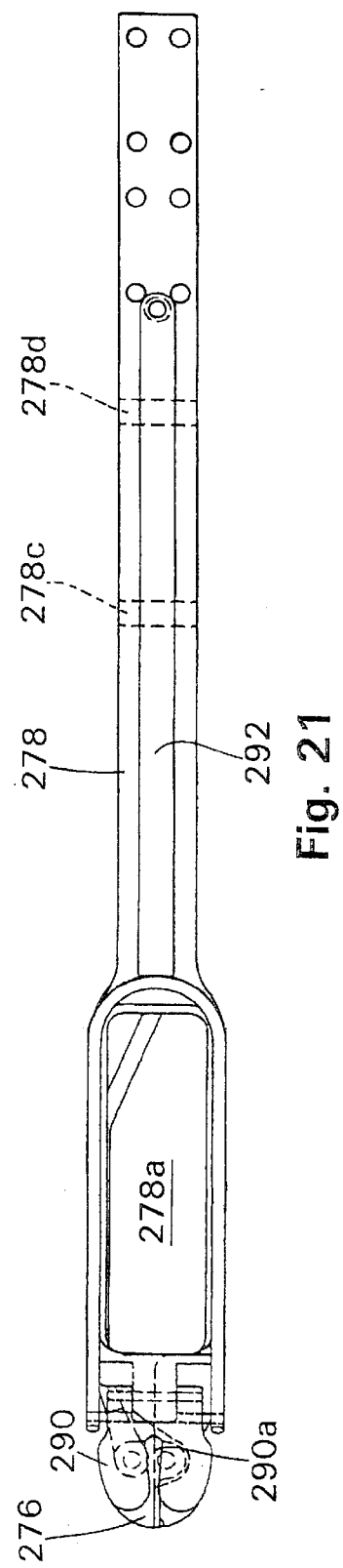
Fig. 22B
Fig. 22A
Fig. 21

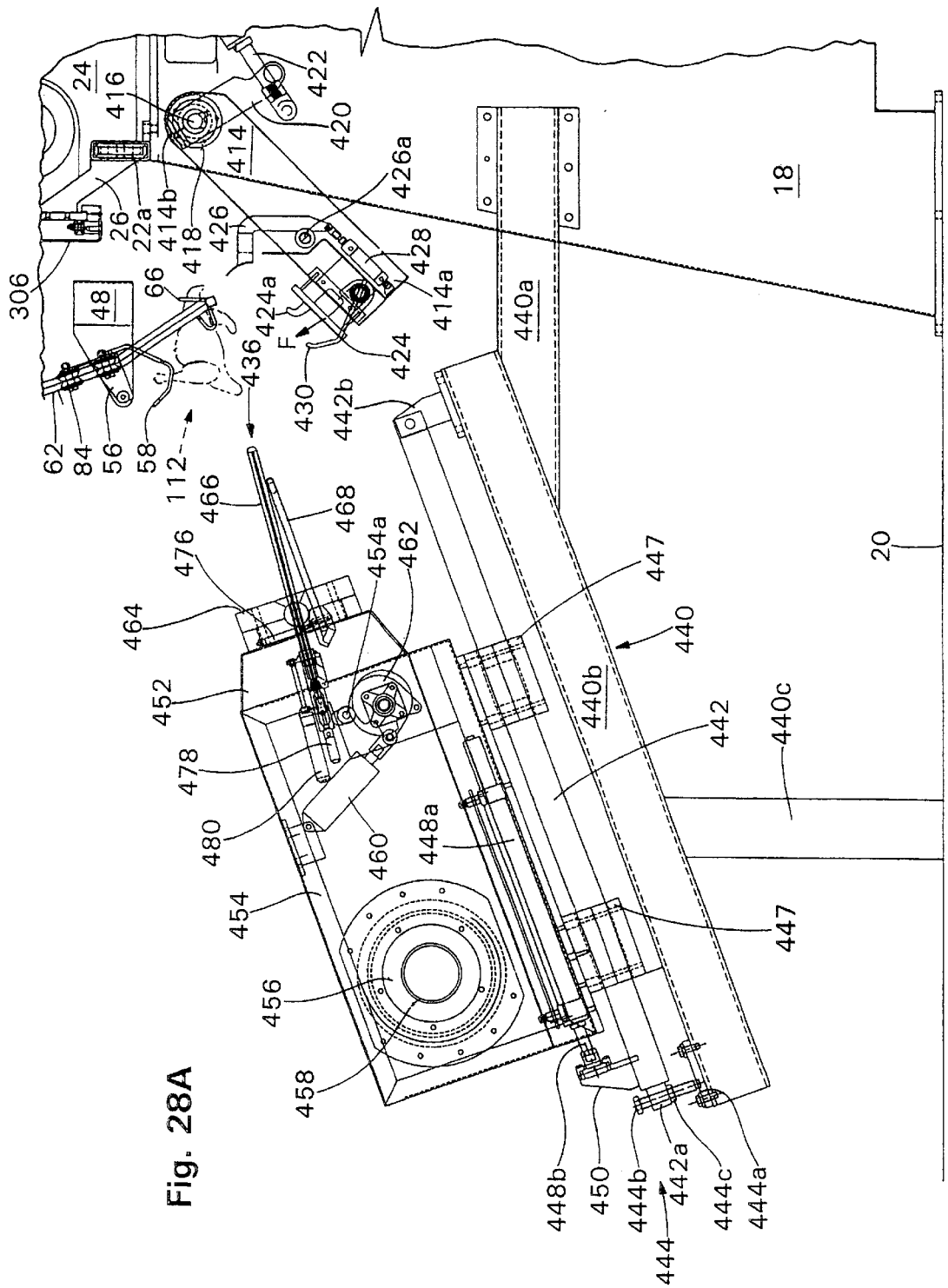

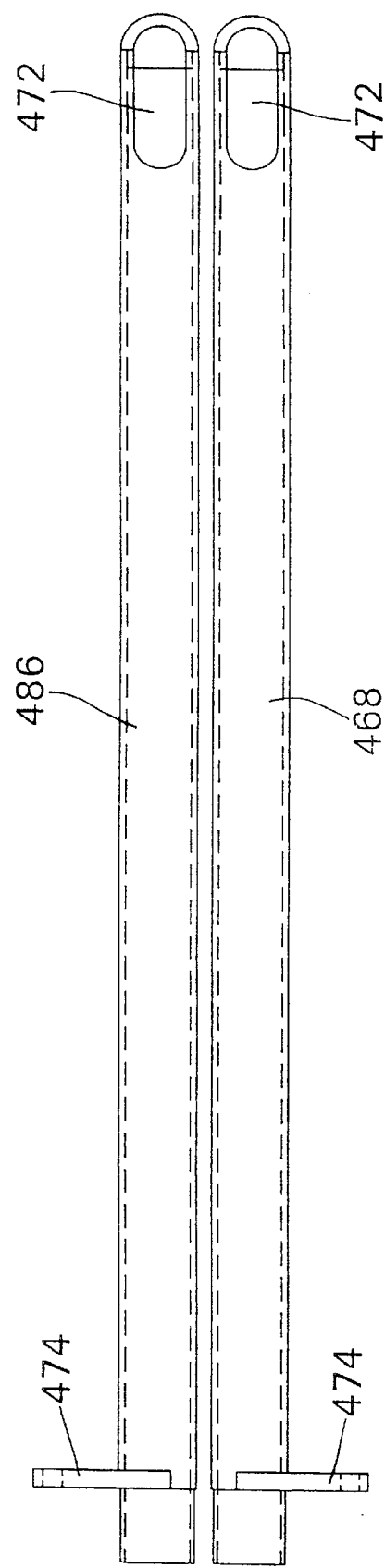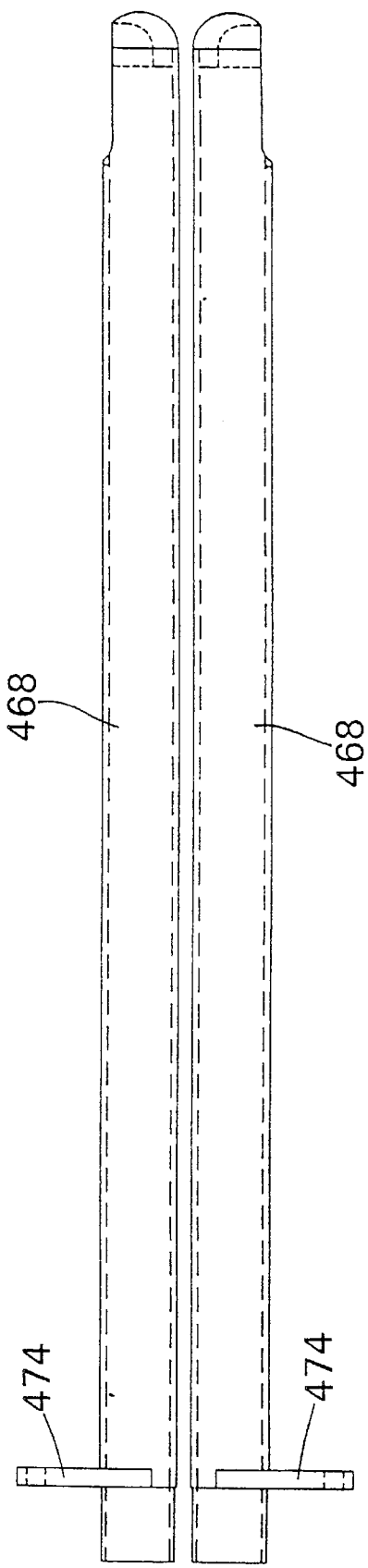

METHOD AND APPARATUS FOR VENTING/ OPENING, EVISCERATING/CROPPING, INSPECTING AND CLEANING OF POULTRY.

CROSS-REFERENCE TO RELATED APPLICATIONS

This application a division of copending application Ser. No. 09/014,342 filed Jan. 27, 1998, entitled "METHOD AND APPARATUS FOR VENTING/OPENING, EVISCERATING/CROPPING, INSPECTING AND CLEANING OF POULTRY," the entire disclosure of which is incorporated herein by reference. Application Ser. No. 09/014,342 is based on U.S. Provisional Application Ser. No. 60/044,754, filed Apr. 21, 1997, and is a continuation-in-part of U.S. patent application Ser. No. 08/717,126, filed Sep. 20, 1996, now U.S. Pat. No. 5,993,308.

BACKGROUND OF THE INVENTION

The present invention relates to processing poultry and, more particularly, to a method and apparatus for automatically venting/opening, eviscerating, displaying for inspection and cleaning poultry.

Conventionally, poultry was eviscerated by hand, but growing labor costs, concerns over worker health, and the desire to minimize product contamination led to the development of machinery to carry out the evisceration process. Such machines mimic what workers used to do: open the body of the bird at the vent without cutting the intestines (to avoid fecal contamination), then pull out the intestines, stomach and other internal organs through the opening. Certain organs must remain associated with the carcass until it is inspected, because they may display signs of poor health, and because some may be included, such as giblets, with the final product.

Conventional machines individually convey poultry through a plurality of processing stations, including vent/ open stations, eviscerating stations, inspection stations and cleaning stations. Such conventional machines continuously convey the poultry through these stations (i.e., without stopping the poultry for processing in the stations). Working on poultry while it is in motion yields problems with positioning the carcass in the correct position to receive treatment because of variations in carcass size, carcass position in the shackle, and shackle position in relation to the tool. If a carcass is not properly positioned with respect to the tool, the tool may not make a proper cut, resulting in a processing error which is left inside the carcass, or dripping down the outside of the carcass. Thus, there is a need for a conveying system for a poultry processing apparatus which will maintain the poultry in a stationary position during venting, eviscerating and/or cleaning of the poultry.

Conventional systems work on carcasses in motion, vertically hung on shackles by their hocks. In this manner, conventional venting and evisceration systems work or enter carcasses from above. Therefore, if a processing error occurs, the result of that error is left inside the carcass, or dripping down the outside of the carcass. Thus, there is a need for a poultry processing apparatus which can work on the carcasses from a nearly horizontal position. In this manner, if a rare processing error should occur, the result of the error is naturally brought outside of the carcass without contact to the exterior of the carcass. This results in producing carcasses which have a lower rate of contamination.

Conventional poultry processing machines position the poultry for processing in a fixed position, regardless of the size of the poultry. More particularly, the poultry is clamped in position for processing by various members which have finite positions, and which are positioned with respect to the operating tools at a finite location. Such finite positions are typically selected to account for receiving larger poultry. In the event that undersized or smaller poultry is used, it is often not correctly positioned with respect to the operating tool. Accordingly, a need has arisen for a poultry processing machine which can position the poultry in a manner which compensates for its size to properly orient the poultry for the motion of the operating tool. As mentioned above, by properly positioning the poultry with respect to the operating tool, processing errors are minimized.

During the evisceration process, it is known to use elongated spoons to scrape along the internal walls of the body cavity to remove the viscera package. However, conventional eviscerating spoons are problematic in that they do not provide for the movement of the viscera package during the viscera process. That is, the handle of the spoon moves throughout the body cavity during the evisceration process, and engages the viscera, and sometimes compresses it against portions of the internal walls of the body cavity of the poultry, resulting in damage to the viscera package. Accordingly, there is a need for an eviscerating spoon which allows the viscera package to move within the body cavity during the evisceration process without compressing the viscera package against internal walls of the body cavity of the poultry.

After the poultry has been eviscerated and the viscera package is hanging from the carcass, it is conveyed to an inspection station. Every chicken produced in the United States is required to be visually inspected by a U.S.D.A. inspector. At 30–35 birds or more per minute, the inspector's job is tedious and repetitious. Inspectors, like other workers, are subject to repetitive-motion injuries, as they must manipulate the birds to get a good look at the interior of the body cavity and the organs. Inspection is also a limitation on line speed. During the inspection process, the inspector usually designates birds for one of four categories: (1) normal clean-out procedure; (2) radical clean-out procedure; (3) condemned and (4) parts salvage, all of which are well understood by those of ordinary skill in the art. In conventional systems, if an inspector designates poultry condemned or for radical clean-out, it is removed off-line and processed differently. The remaining poultry then continues through the system to be normally cleaned out. Removing birds off-line is time consuming, and requires additional handling, thereby increasing the risk of contamination. There is a need in conventional inspection stations to provide the inspector with the ability to flag or label the poultry for one of the three treatments, and then have the system automatically recognize how the eviscerated poultry is to be cleaned, and then, in the case of a normal or radical clean-out, carrying out the same directly on line, and in the case of a condemned poultry, automatically transfer it from the system.

During the conventional cleaning process, the neck cavity of the poultry is cropped. Conventional croppers pass through the neck of the bird with a barbed end. The barbed end is rotated through the neck of the bird. However, such conventional croppers are problematic because the barbs on the end of the cropper often become bent, or sometimes break bones within the poultry, which then causes subsequent problems during the de-boning process. Accordingly, there is a need for an improved cropper which does not rotate within the neck cavity, and yet cleans the neck cavity and removes the crop.

Thus, there is a need for a poultry-cleaning station which will treat carcasses which pass inspection with an inside rinse of high-volume, low-pressure water, and then a vacuum, to remove the water on the way out. If a carcass is passed conditionally, the radical function engages, resulting in treating the carcass with a large volume of water, and increased vacuuming to remove water, lungs, kidneys, and any extraneous material.

The present invention resulted from the inventors' observation of the problems associated with conventional poultry processing machines, and their successful efforts to solve them. Therefore, the present invention is directed toward a poultry processing machine which minimizes contamination and reduces the inherent variability found in conventional systems by positioning each carcass, regardless of size, in the correct orientation for each machine operation. Thus, the present invention overcomes many of the disadvantages inherent in the above-described conventional poultry processing machines. Consequently, use of the present invention results in an improved yield and wholesomeness of processed poultry.

BRIEF SUMMARY OF THE INVENTION

Briefly stated, the present invention is directed to an apparatus for transporting poultry and the like through one or more processing stations. The apparatus includes a first track, extending along a predetermined pathway. A plurality of cars is movably mounted on the first track for receiving poultry. A transmission is drivingly engaged with a first car of the plurality of cars. The transmission drives the first car along a first portion of the first track at a first speed, and intermittently stops the first car at a second portion of the first track.

In another aspect, the present invention is directed to a method of automatically processing slaughtered poultry, the poultry having a back. The method comprises transporting the poultry along a conveyor. The poultry is then positioned with the back extending at an angle in the range of zero degrees to forty degrees with respect to a generally horizontal plane. The poultry is physically processed while the poultry is positioned at an angle in the range of zero degrees to forty degrees with respect to a generally horizontal plane.

In another aspect, the present invention is directed to a method of automatically processing slaughtered poultry. The method comprises transporting the poultry along a conveyor and physically processing the poultry while the conveyor is maintaining the poultry in a stationary position with respect to a support surface.

In another aspect, the present invention is directed to an apparatus for automatically venting and opening a slaughtered poultry. The slaughtered poultry includes a pair of hocks, a ring muscle and a back. The apparatus includes a conveyor for receiving the poultry and transporting the poultry along a predetermined path. The poultry is positioned on the conveyor in a first predetermined position wherein the poultry is hanging by its hocks with its back in a generally horizontal position. A venting and opening station receives the conveyed poultry. The venting and opening station includes a positioning arm having a first end movable between a stowed position spaced from the conveyed poultry, and a cutting position wherein the poultry is clamped in position on the first end for cutting and opening its vent. A support plate is mounted on the first end of the positioning arm. The first end includes a pivotally mounted clamping bar movable between an open position when the positioning arm is in the stowed position, and a clamping position when the positioning arm is in the cutting position. The positioning arm is located with respect to the conveyor such that, as the first end moves from the stowed position to the cutting position, the support plate engages the back of the poultry and maintains the back in a generally horizontal position. The clamping bar is moved to the clamping position to bias the poultry toward the support plate to hold the poultry against the support plate in position for venting and opening when the positioning arm is in the cutting position. A cutting tool is positioned with respect to the clamping bar and the support plate to consistently cut the poultry at a specific location on the poultry when the poultry is held against the support plate by the clamping bar.

In another aspect, the present invention is directed to an apparatus for automatically venting and opening a slaughtered poultry. The poultry has a ring muscle and an abdomen adjacent the ring muscle. The apparatus includes a drill rotated in a first direction for cutting the tissue around the ring muscle of the slaughtered poultry. The drill has a circumferential surface. The apparatus also includes a cutting blade having a cutting edge for cutting an opening in the abdomen adjacent the ring muscle. The cutting edge is disposed adjacent the circumferential surface of the drill such that, as the drill rotates in the first direction, the circumferential surface of the drill rotates away from the cutting edge.

In another aspect, the present invention is directed to a poultry eviscerating apparatus for removing viscera from the body cavity of poultry through a pre-cut opening at the poultry vent. The body cavity includes an internal breast wall and an opposed internal back wall. The apparatus includes a conveyor receiving the poultry, and transporting the poultry along a predetermined path. The poultry is positioned on the conveyor in a first predetermined position, wherein the poultry's back is in a generally horizontal position. An eviscerating station receives the conveyed poultry. The eviscerating station includes a locating arm having a first end movable between a stowed position spaced from the conveyed poultry and an eviscerating position wherein the poultry is clamped in position on the first end. A support plate is movably mounted on the first end to move between a fully extended position when the locating arm is in the stowed position, and a compressed position when the locating arm is in the eviscerating position. The support plate is biased toward the extended position by a first force. A first end includes a movably mounted breast positioning bar movable between an open position when the locating arm is in the stowed position, and a clamping position when the locating arm is in the eviscerating position. The locating arm is located with respect to the conveyor such that as the first end moves from the stowed position to the eviscerating position the support plate engages the back of the poultry and maintains the back in a position in the range of zero degrees and forty degrees downwardly from a horizontal plane. The breast positioning bar is moved to the clamping position to bias the poultry toward the support plate with a second force to hold the poultry against the support plate in position for eviscerating when the locating arm is in the eviscerating position. The evisceration station also includes an eviscerating tool having a working portion insertable into the body cavity of the poultry through the access opening along a predetermined path. A portion of the predetermined path includes moving the working portion of the tool along the breast wall of the cavity with a third force which is greater than the second force, such that the breast wall of the poultry can move with respect to the first end while being maintained against the working portion of the tool, without the working portion damaging the breast wall. Another portion of the predetermined path includes moving the working portion of the tool along the back wall of the cavity with a fourth force, which is greater than the first force, such that the back wall of the poultry and support plate can move with respect to the first end, while the back wall is maintained against the working portion of the tool without the working portion damaging the back wall.

In another aspect, the present invention is directed to a device for the removal of internal organs of slaughtered poultry. The device comprises a spoon attached to an elongated carrier. The spoon has an arcuate front edge. The elongated carrier has an opening therein adjacent the spoon. The opening is sized to permit the removed internal organs to pass therethrough.

In another aspect, the present invention is directed to a method of removing viscera from the body cavity of poultry through a pre-cut opening at the poultry vent. The body cavity includes an internal breast wall, an opposed internal back wall, a heart, lungs, and a trachea. The method comprises applying a first spring force against the back wall of the poultry, and a second spring force against the breast wall of the poultry to position the poultry in a first position wherein the back wall of the poultry extends at an angle in the range of zero degrees and forty degrees downwardly from a horizontal plane. An eviscerating tool having a working portion is moved into the body cavity of the poultry through the access opening. The working portion of the tool is moved into engagement with the breast wall. The working portion of the tool is moved along the breast wall of the cavity with a third force which is greater than the first spring force when the poultry is in the first position, such that the breast wall of the poultry can move with respect to the first position while being maintained against the working portion of the tool, without the working portion damaging the breast wall. A jaw located on the working portion of the tool is then opened. A rake extending from the working portion is swung away from the working portion toward the back wall to peel the heart, lungs and trachea from the body cavity. The working portion of the tool is moved along the back wall of the cavity a first distance, with a fourth force which is greater than the first spring force, when the poultry is in the first position, such that the back wall of the poultry and support plate can move with respect to the first position while the back wall is maintained against the working portion of the tool without the working portion damaging the back wall, whereupon the jaw is closed to pinch the esophagus. The working portion of the tool is then moved further along the back wall of the cavity with the fourth force, which is greater than the first spring force, when the poultry is in the first position such that the back wall of the poultry and support plate can move with respect to the first position, while the back wall is maintained against the working portion of the tool without the working portion damaging the back wall, until the working portion of the tool exits the body cavity through the access opening. The jaw is then opened, and the rake swung toward the working portion such that the heart, lungs, esophagus and other organs that were in the body cavity hang downwardly from the poultry as an entire unit.

In another aspect, the present invention is directed to an elongated washer for cleaning the inside of slaughtered, eviscerated poultry. The washer includes an elongate hollow tube having a first end and an interior area. A rod has a first end with a plurality of holes therein in fluid communication with a source of fluid. The rod is reciprocally mounted within the tube to move between a closed position, wherein the first end of the rod is sealingly engaged with the first end of the tube, and an open position, wherein the first end of the rod is spaced from the first end of the tube. The rod is sized to create a radial space between the rod and the tube, such that a vacuum can be applied to the interior area when the rod is in the open position, to thereby cause portions of the inside of the poultry to be pulled into the tube through the first end thereof.

In another aspect, the present invention is directed to a method of automatically selectively cleaning the inside of the body cavity of a plurality of slaughtered, eviscerated poultry with either a normal clean-out procedure, or a radical clean-out procedure. The body cavity contains a neck, crop, lungs, leaf fat pads and kidneys. The normal clean-out procedure maintains the leaf fat pads and kidneys in the body cavity, and the radical clean-out procedure removes the leaf fat pads and kidneys from the body cavity. The method comprises the steps of conveying the poultry through an inspection station. The poultry is positioned on the conveyor in a first position to permit inspection of the poultry. The poultry is then inspected, and a portion of the poultry is selected for receiving the radical clean-out procedure. The poultry is then conveyed to a cleaning station. The selected poultry passing through the cleaning station is identified, and the radical clean-out procedure is then applied to the selected poultry. The normal clean-out procedure is applied to the balance of the poultry.

In another aspect, the present invention is directed to an apparatus for cleaning the inside of a body cavity, including a neck, of a plurality of slaughtered, eviscerated poultry with either a normal clean-out procedure or a radical clean-out procedure. The body cavity having a back wall and containing leaf fat pads and kidneys. The normal clean-out procedure maintains the leaf fat pads and kidneys in the body cavity, and the radical clean-out procedure removes the leaf fat pads and kidneys from the body cavity. The apparatus includes a conveyor receiving the poultry and transporting the poultry along a predetermined path. The poultry is positioned on the conveyor in a first position. A cleaning station receives the conveyed poultry. The cleaning station includes a locating arm having a first end movable between a stowed position, spaced from the conveyed poultry, and a cleaning position, wherein the poultry is clamped in position on the first end. A support plate is movably mounted on the first end to move between a fully extended position, when the locating arm is in the stowed position, and a compressed position, when the locating arm is in the cleaning position. The support plate is biased toward the extended position by a first force. The first end includes a movably mounted breast positioning bar movable between an open position, when the locating arm is in the stowed position, and a clamping position, when the locating arm is in the cleaning position. The locating arm being located with respect to the conveyor such that, as the first end moves from the stowed position to the cleaning position, the support plate engages the back of the poultry and maintains the back in a position in the range of zero degrees and forty degrees downwardly from a horizontal plane. The breast positioning bar is moved to the clamping position to bias the poultry toward the support plate with a second force less than the first force to hold the poultry against the support plate in position for cleaning the poultry when the locating arm is in the cleaning position. A washing tool, having a working portion, is insertable into the body cavity of the poultry through the access opening along a predetermined path. A portion of the predetermined path includes moving the working portion of the tool into the neck of the poultry with a third force, which is greater than the second force, such that the neck of the poultry can move with respect to the first end while being maintained against the working portion of the tool, without the working portion damaging the neck. Another portion of the predetermined path includes moving the working portion of the tool along the back wall of the cavity with a fourth force, which is greater than the first force, such that the back wall of the poultry and support plate can move with respect to the first end while the back wall is maintained against the working portion of the tool, without the working portion damaging the back wall.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings an embodiment which is presently preferred. It should be understood, however, that the invention is not limited to the precise arrangements and instrumentalities shown. In the drawings:

FIGS. 10A through 10J are left side elevational views sequentially illustrating the venting and opening processes in accordance with the present invention;

FIG. 15A is a front-elevational view of a drill and cutting blade for venting and opening poultry in accordance with the present invention;

FIG. 15B is a top plan view of the drill and cutting blade shown in FIG. 15A;

FIG. 15C is a right side elevational view of the drill and cutting blade shown in FIG. 15A;

FIG. 15D is an enlarged top perspective view of a portion of the cutting blade shown in FIGS. 15A–15D;

FIGS. 18A–H are right-side elevational views of the evisceration station shown in FIG. 16 sequentially showing the evisceration process;

FIG. 19A is a top plan view of an evisceration tool in accordance with the present invention;

FIG. 19B is a top plan view of the evisceration tool shown in FIG. 19A with the jaw in the open position;

FIG. 20 is a right-side elevational view of the evisceration tool shown in FIG. 19A;

FIG. 21 is a bottom plan view of the evisceration tool shown in FIG. 19A;

FIG. 22A is a left-side elevational view of the evisceration tool shown in FIG. 19A;

FIG. 22B is a left-side elevational view of the evisceration tool shown in FIG. 19A with the rake in the open position;

FIGS. 28A–D are enlarged right-side elevational views of the cleaning station shown in FIG. 24 sequentially showing the cleaning process;

FIGS. 29A–29B are greatly enlarged elevational views of the lung tubes of the clean-out assembly shown in FIGS. 26 and 27;

DETAILED DESCRIPTION OF THE INVENTION

Figure 1:
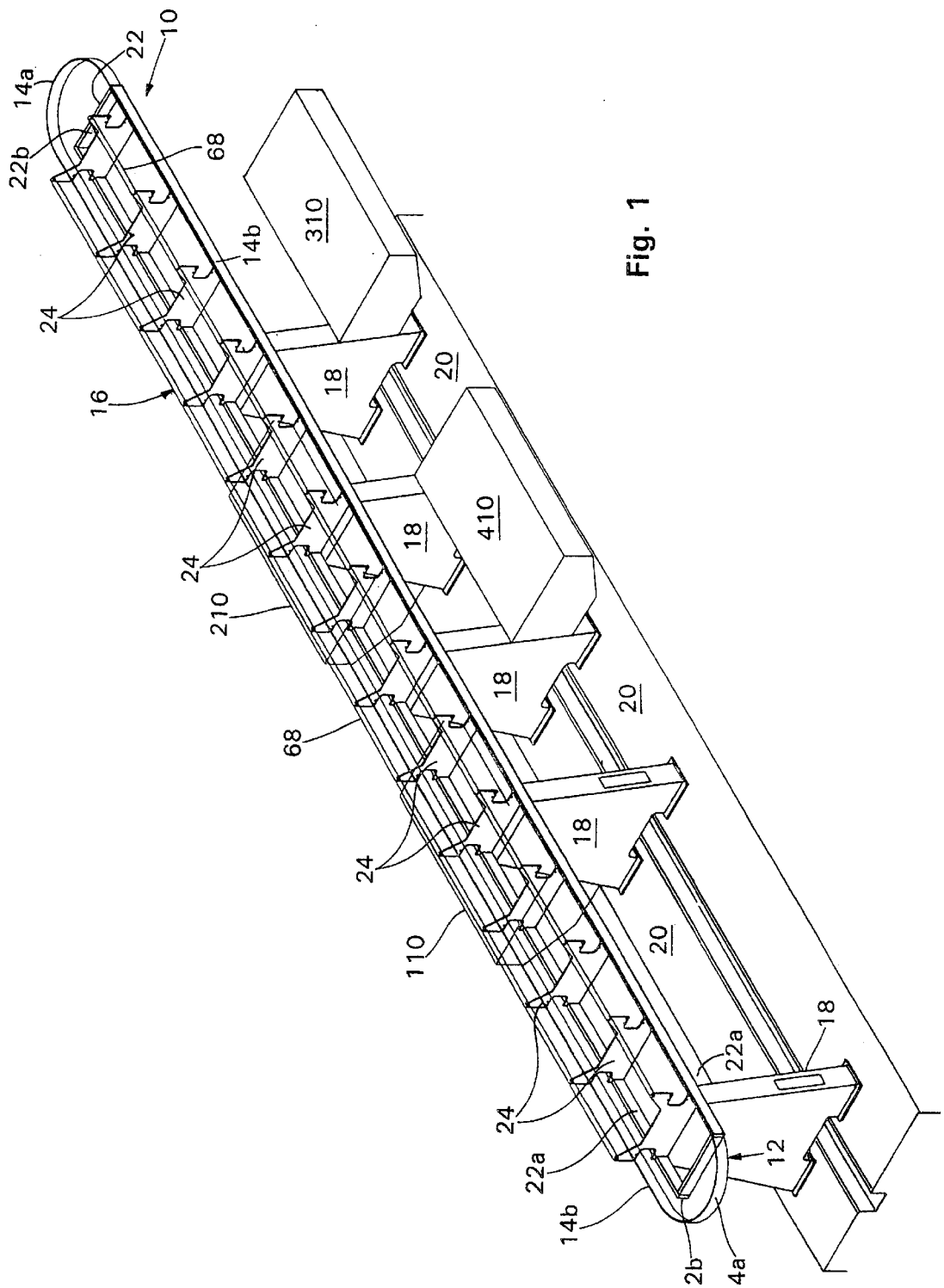
FIG. 1 is a top perspective view of an apparatus for venting, eviscerating, positioning for inspection and cleaning poultry.

Certain terminology is used in the following description for convenience only, and is not limiting. The words "right," "left," "lower" and "upper" designate directions in the drawings to which reference is made. The words "inwardly" and "outwardly" refer to directions toward and away from, respectively, the geometric center of the poultry processor and designated parts thereof. The terminology includes the words above specifically mentioned, derivatives thereof and words of similar import.

Referring to the drawings in the detail, wherein like numerals indicate like elements throughout, there is shown in FIGS. 1 through 31 a preferred embodiment of an apparatus for venting and opening, eviscerating and cropping, displaying for inspection and cleaning poultry, generally designated 10, in accordance with the present invention, hereinafter referred to as the "poultry processor" 10. Referring now to FIGS. 1 through 9, the poultry processor 10 includes a conveyor apparatus, generally designated 12, for transporting poultry and the like through one or more processing stations. As described in more detail hereinafter, the conveyor 12 receives and transports the poultry through four different processing stations, namely a venting and opening station 110, an eviscerating and cropping station 210, an inspection station 310, and an on line processing or cleaning station 410. It is understood by those of ordinary skill in the art from this disclosure that the conveyor 12 is not limited to conveying the poultry through any number or particular type of stations. Nor is the conveyor 12 limited to transporting poultry, as other slaughtered animals, such as pigs or beef, could be conveyed by the conveyor 12, without departing from the spirit and scope of the invention.

Referring now to FIGS. 1–4 and 6, the conveyor 12 includes a first track 14 extending along a predetermined pathway. In the preferred embodiment, the first track 14 is generally in form of an endless oval. As used herein, the term "oval" means like a racetrack, with two constant-radius curves 14a interconnected by two straight sections 14b.

Figure 2:
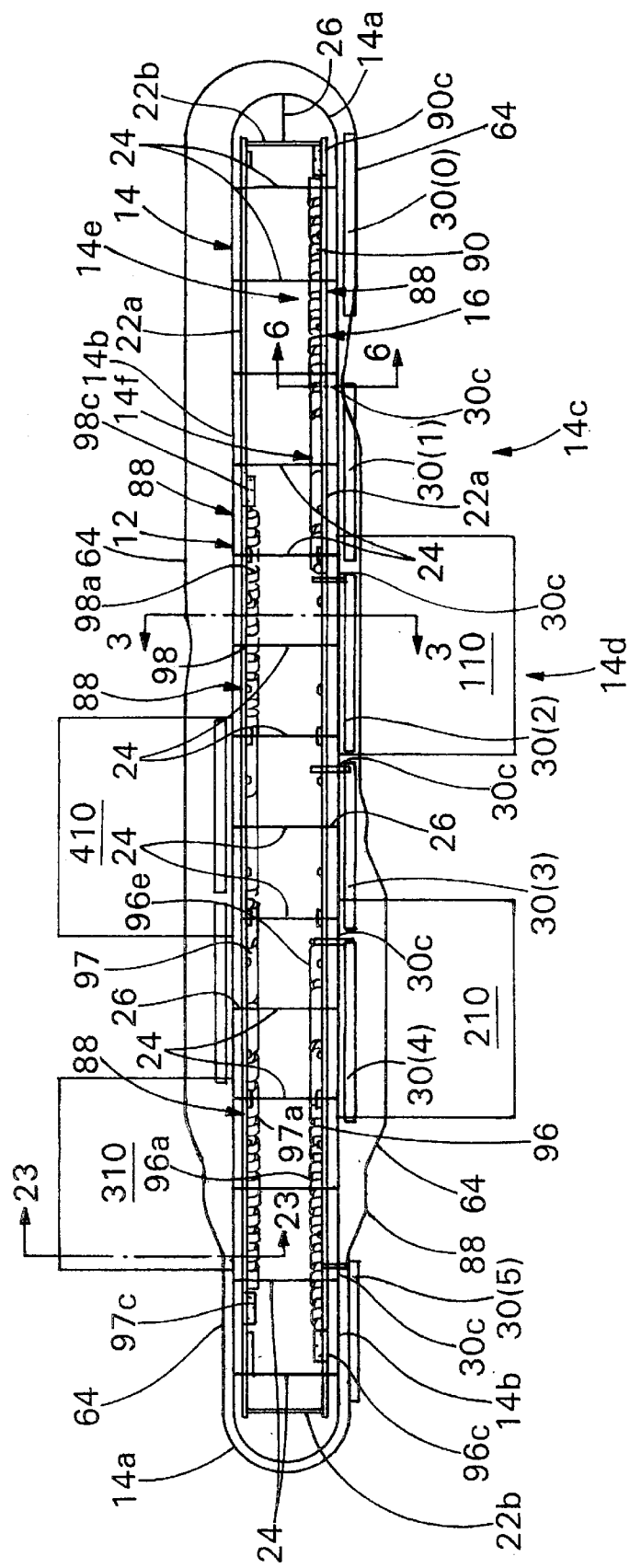
FIG. 2 is a top plan view of the apparatus shown in FIG. 1.
Figure 3:
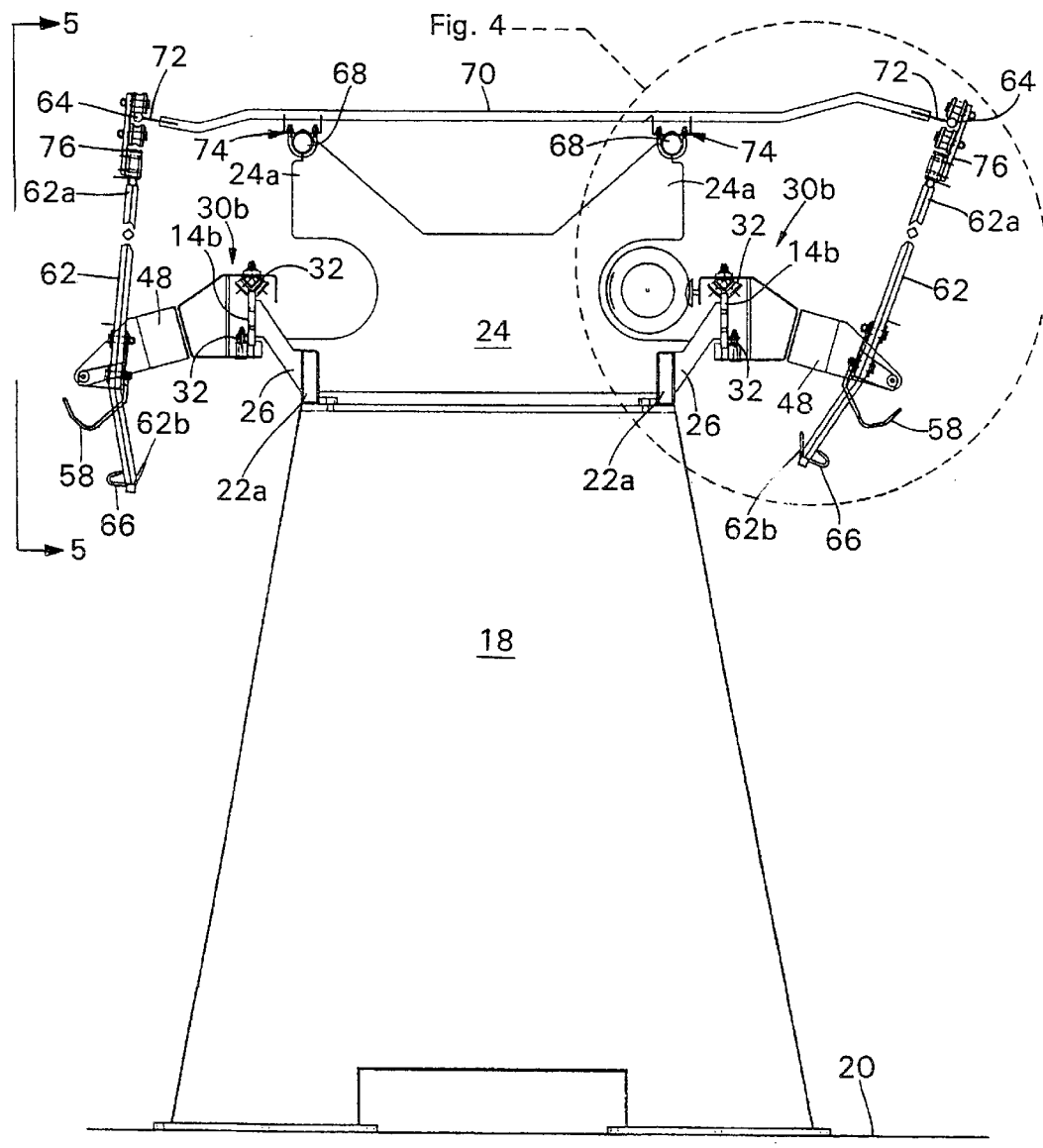
FIG. 3 is an enlarged cross-sectional view of the apparatus shown in FIG. 2, taken along line 3—3 of FIG. 2.

Referring now to FIGS. 1 through 3, the conveyor 12 is supported by a frame 16. The frame 16 includes five towers 18 which rest on or are secured to a support surface 20, such as a plant floor. The towers 18 are generally trapezoidally shaped in elevational view. However, it understood by those of ordinary skill in the art from this disclosure that the precise design and shape of the towers 18 are not pertinent to the present invention, and that the towers 18 could be of other configurations, such as generally rectangular. The upper end of the towers 18 support a generally rectangular box frame 22 having lateral sides 22a and end members 22b. A series of cross members 24 extend between the lateral sides 22a of the box frame 22 to provide the box frame 22 with structural rigidity as well as to support other elements of the poultry processor 10, as described in more detail hereinafter. The cross members 24 are preferably spaced at even intervals over the length of the box frame 22, although other spacings could be used without departing from the spirit and scope of the invention.

The frame 16, including the towers 18, box frame 22 and cross members 24, is preferably constructed of a high-strength, lightweight material, such as stainless steel. The various elements of the frame 16 are interconnected using standard fastening methods, such as welding, nuts and bolts, riveting, etc., as is well understood by those of ordinary skill in the art. Unless otherwise stated herein, the subsequent elements of the poultry processor 10 are constructed of the same materials as the frame 16, and assembled in like manners.

Figure 4:
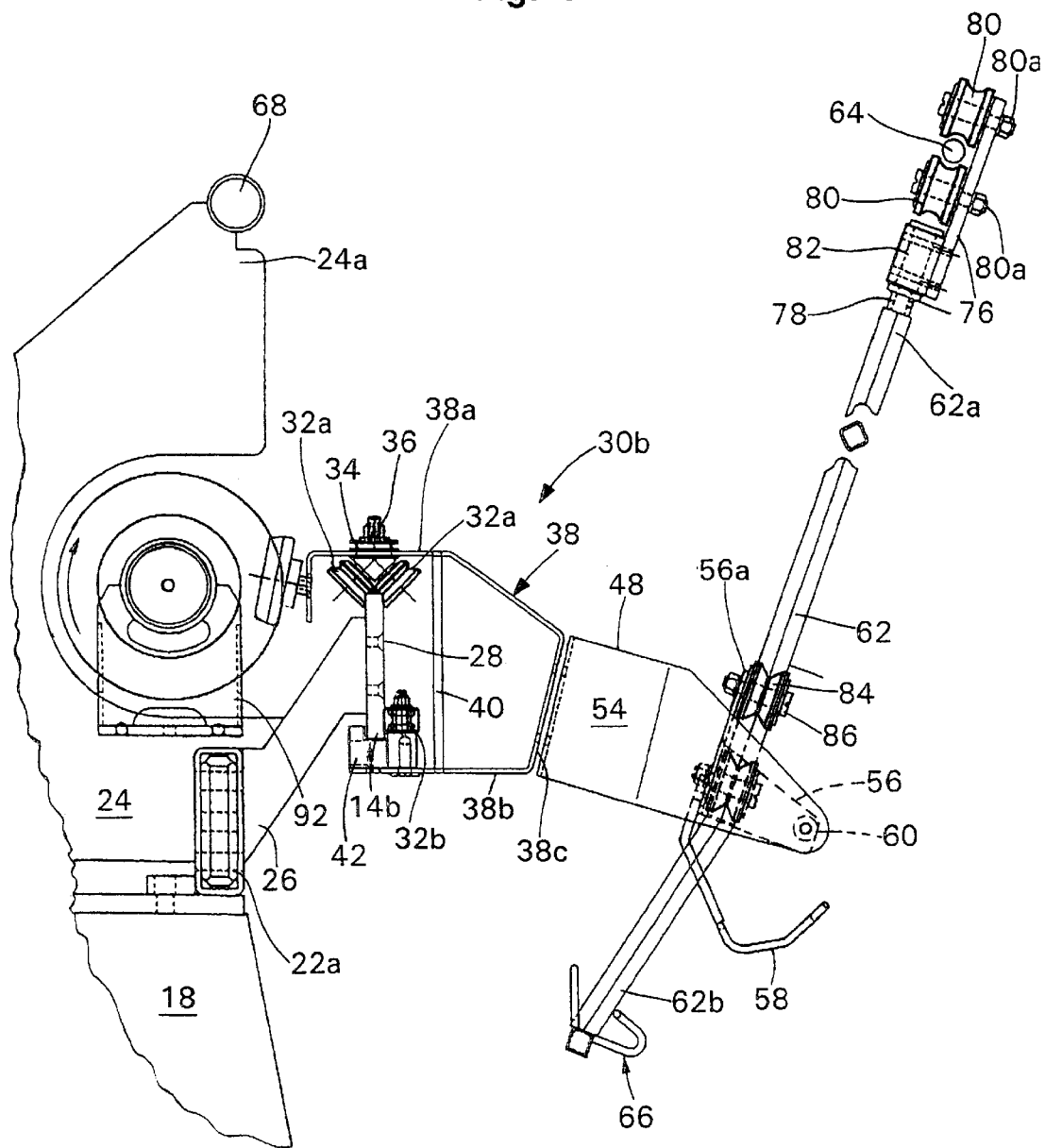
FIG. 4 is a greatly enlarged fragmentary view of a portion of FIG. 3.
Figure 6:
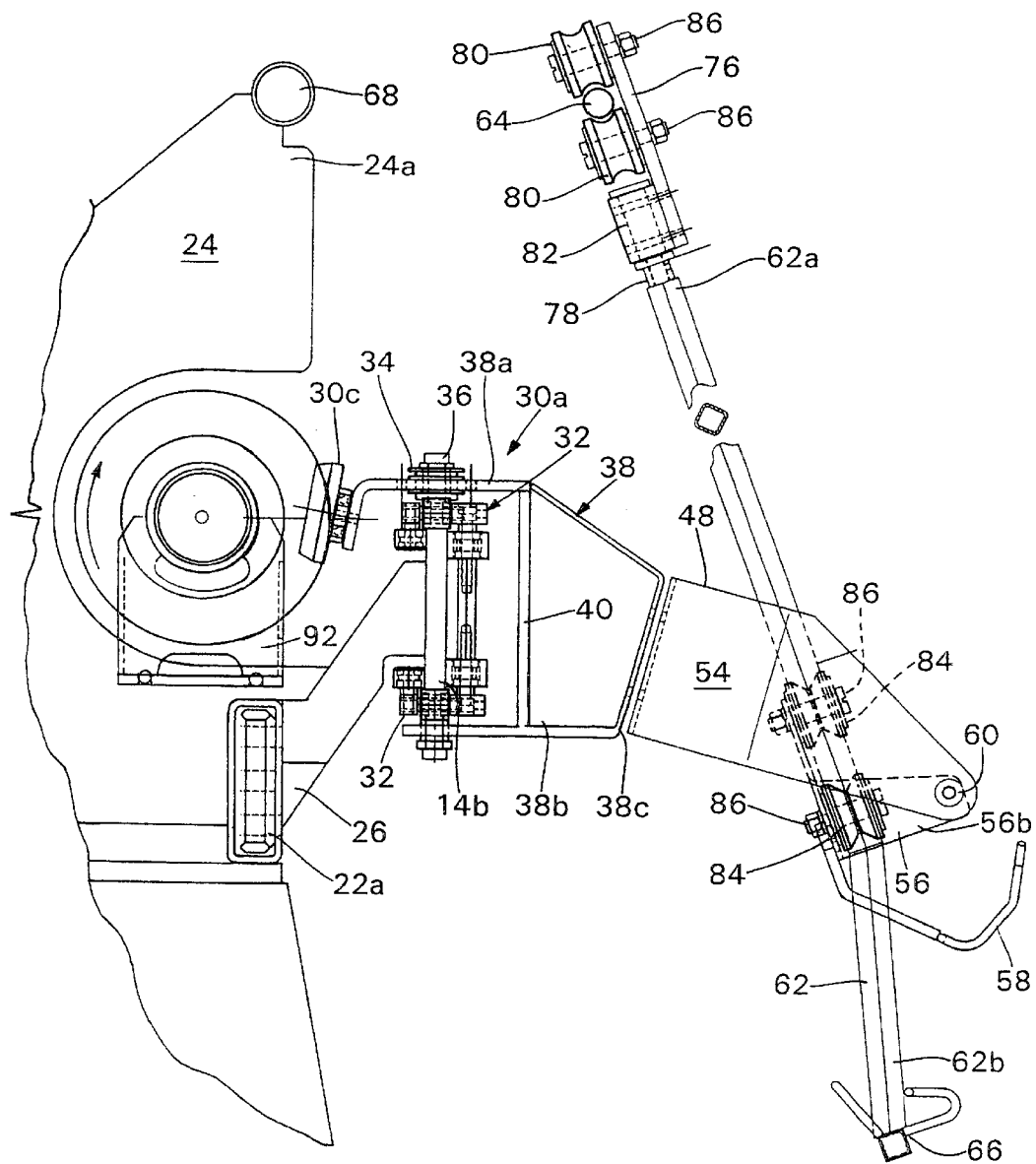
FIG. 6 is a greatly enlarged cross-sectional view of the apparatus shown in FIG. 2, taken along line 6—6 of FIG. 2.

Referring now to FIGS. 3, 4 and 6, the first track 14 is preferably constructed of stainless steel plate having a thickness of approximately three quarter inch, and having height of about six inches. The first track 14 is supported on the frame 16 by a plurality of angled brackets 26 which extend between the inwardly facing surface of the first track 14 and the lateral sides 22a of the box frame 22. As shown in FIG. 4, the first track 14 is secured to the brackets 26 by suitable fasteners, such as by welding. The number of brackets 26 used generally corresponds to the number of cross members 24 but, in any event is selected to prevent undue flexing of the first track 14, in a manner well understood by those of ordinary skill in the art. As shown in FIG. 2, the curved sections 14a of the first track 14 are also supported by brackets 26 extending from the end members 22b of the box frame 22. The first track 24 extends generally vertically, and is positioned in a single horizontal plane.

Referring now to FIGS. 3 through 8, a plurality of cars 30 are movably mounted on the first track 14 for receiving poultry. Each of the cars 30 includes a plurality of wheels 32 in rotatable engagement with the first track 14. The wheels 32 are arranged to conform and grasp the first track 14 to support the cars 30 on the first track 14. More particularly, the cars 30 are arranged in groups of N cars, N being a positive integer greater than one. All cars 30 within each group are interconnected in the form of a train. Only every Nth car is driven around the first track 14 (i.e., only one car 30 in each train is actually driven around the first track 14, as described in more detail hereinafter.

Figure 7:
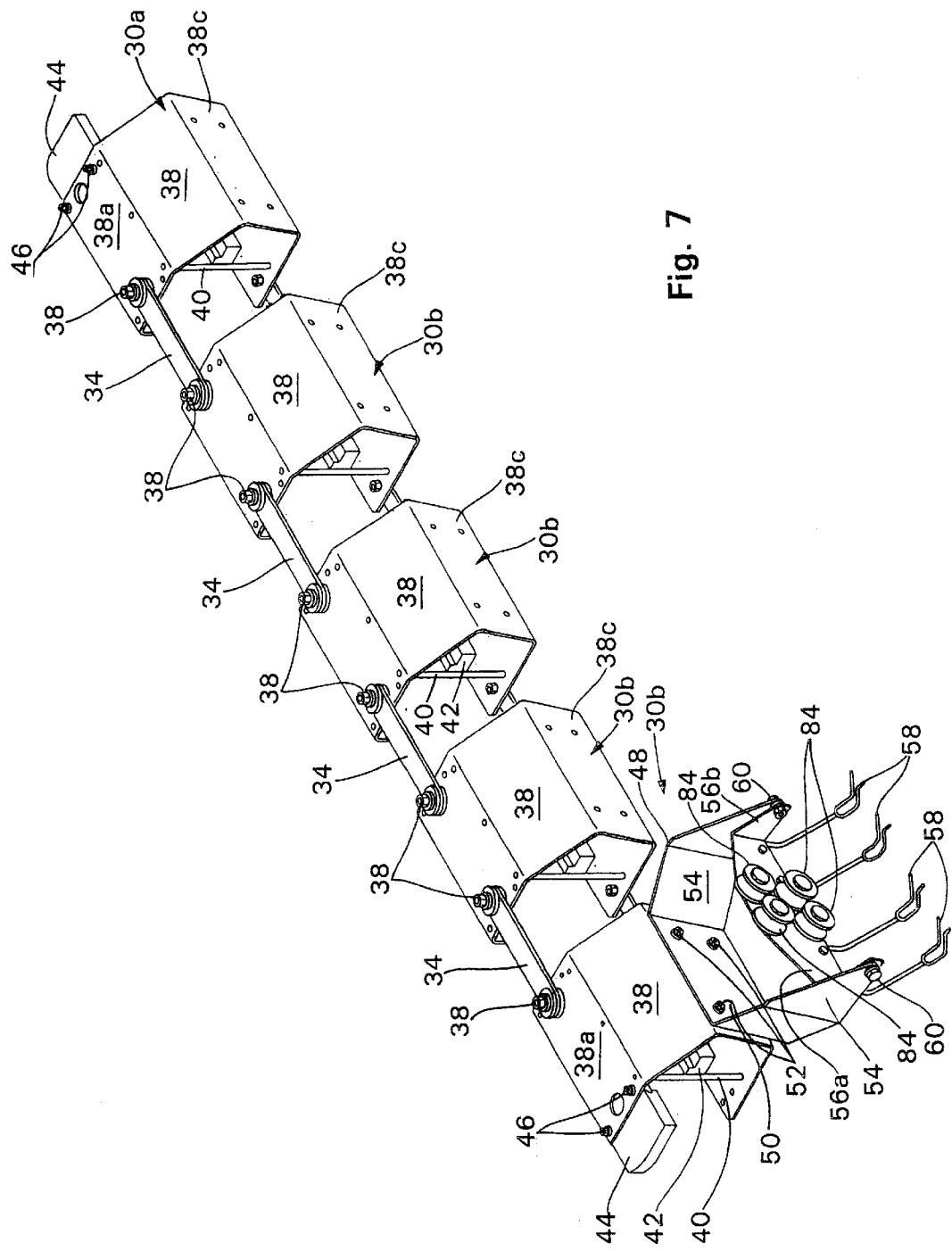
FIG. 7 is an enlarged perspective view showing a portion of a train of cars for transporting poultry for processing in accordance with the present invention.
Figure 8:
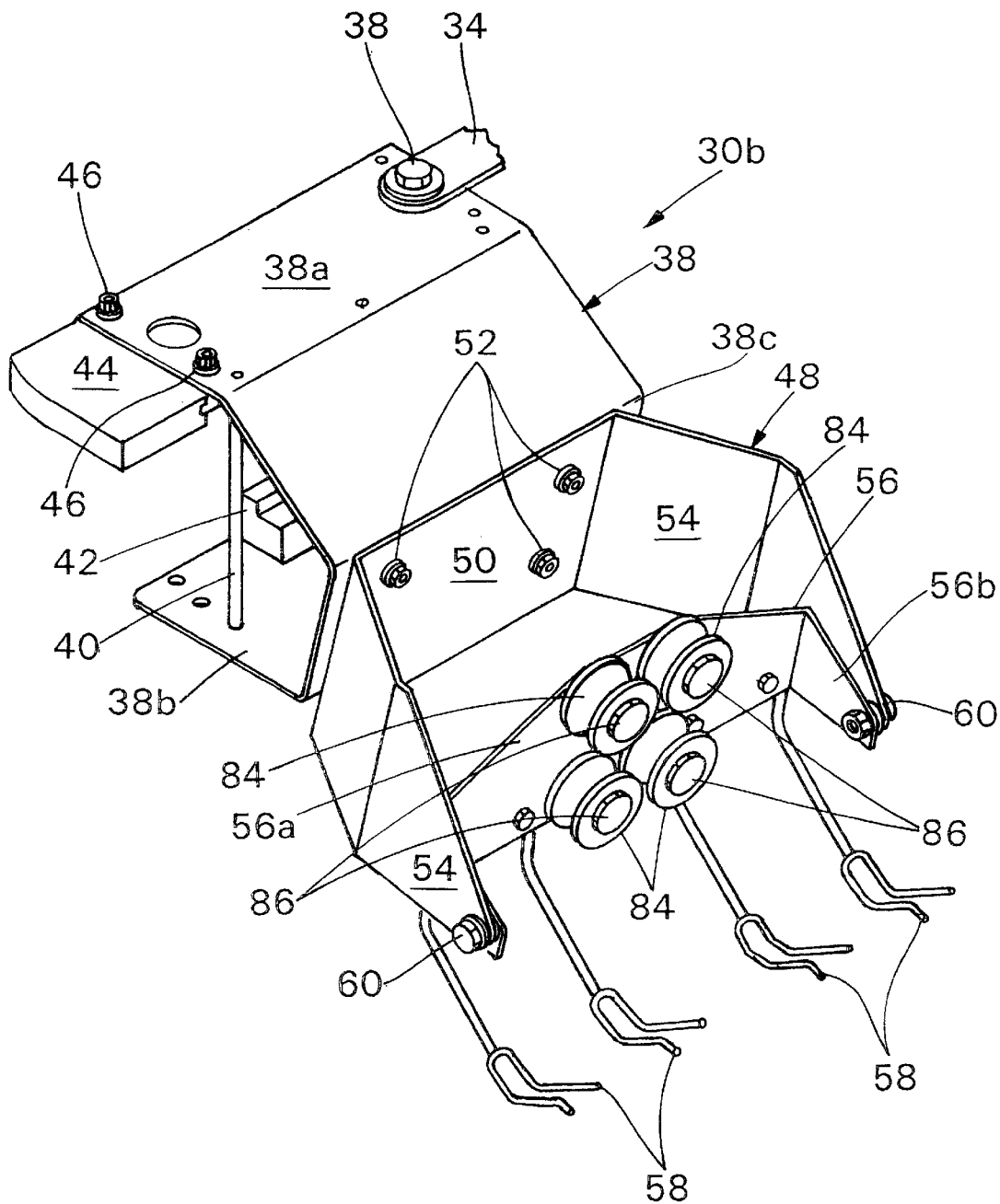
FIG. 8 is a greatly enlarged perspective view of one of the cars shown in FIG. 7.

Referring now to FIG. 7, there is shown a group of five cars 30 arranged in the form of a train. There are two types of cars 30 in the train. The first type of car (hereinafter referred to as the "first car 30a") is actually the last car in the train, but is a pusher-type car in that it is driven around the first track 14, as described in more detail hereinafter. The remaining four cars 30 on the train are of a second type (hereinafter generally referred to as "second car 30b"), which are linked together in front of the first car 30a. More particularly, a linkage 34 extends between each of the second cars 30b and the second car 30b which is next to the first car 30a. The linkages are pivotally secured to each of the first and second cars 30a, 30b, by a standard pintle connection 36, such as a conventional nut, bolt and washer arrangement. The pintle connection 36 and linkage 34 allow the train of cars 30 to move around the first track 14 along both the curved section 14a and the straight section 14b. FIG. 2 shows each train of cars 30 schematically in the form of rectangles.

Referring now to FIG. 6, there is shown a first car 30a mounted on the straight section 14b of the first track 14 with its wheels 32 arranged to conform and grasp the first track 14 to support the first car 30a on the first track 14. The first car 30a is comprised of a generally U-shaped subframe 38 having upper and lower walls 38a, 38b which surround and capture the first track 14. A front wall 38c extends between the upper and lower walls 38a, 38b at a slight angle facing downwardly. A support rod 40 extends between the upper and lower walls 38a, 38b for providing the first car 30a with structural rigidity. The wheels 32 surround the first track 14 and engage all four sides of the first track 14 such that the wheels 32 grasp the first track 14 and firmly maintain the first car 30a thereon. The wheels 32 include bearings which permit them to readily rotate so that the first track 30a easily translates along the first track 14, as described in more detail hereinafter.

It is understood by those of ordinary skill in the art from this disclosure, that the precise arrangement of the wheels 32 on the car 30a is not pertinent to the present invention. It is only important that the wheels 32 sufficiently engage the first track 14 to permit the first car 30a to readily translate along the first track 14. To this end, it is also understood by those of ordinary skill in the art from this disclosure, that the present invention is not limited to mounting the first car 30a on the first track 14 with wheels 32 which grasp the first track 14. For instance, the first track 14 could have a longitudinal slot therein for receiving a pin (not shown) extending from the first car 30a for guiding the first car 30a around the first track 14.

Referring now to FIGS. 3 and 4, the second car 30b is generally identical to the first car 30a except for the manner in which the wheels 32 engage the first track 14. Accordingly, like numerals are used to identify like elements on the first and second cars 30a and 30b, without a repeat in description for purposes of brevity and convenience only.

As shown in FIG. 4, the wheels 32 of the second car 30b are comprised of a pair of angularly offset first wheels 32a, having V-shaped grooves therein, extend from the upper wall 38a of the sub-frame 38. The first wheels 32a extend at an angle of about forty-five degrees with respect to a horizontal plane to engage the orthogonal corners of the upper surface of the first track 14. A generally L-shaped guide block 42 extends upwardly from the lower wall 38b into complementary engagement with the lower surface and inside surface of the first track 14. The guide block 42 is preferably constructed of a material which has a low coefficient of friction with respect to stainless steel, such as 1900 UHMW. However, it is understood by those of ordinary skill in the art from this disclosure that the guide block could be constructed of other materials, such as polymeric materials like Delrin and 101 Nylon. without departing from the spirit and scope of the invention. A second wheel 32b is mounted to the lower wall 38b of the subframe 38 and engages the outwardly facing surface of the first track 14, so that the first track 14 is sandwiched between the guide block 42 and the second wheel 32b. In this manner, the first wheels 32a, guide block 42 and second wheel 32b surround and grasp the first track 14 to permit the second car 30b to translate along the first track 14, as described in more detail hereinafter.

Referring now to FIG. 7, there is shown the first car 30a positioned behind four second cars 30b, as mentioned above. The leading second car 30b includes a bumper block 44 secured to the upper wall 38a by suitable conventional fasteners, such as nuts and bolts 46. Similarly, a bumper block 44 extends rearwardly from the upper wall 38a of the first car 30a, and is secured to the upper wall 38a of the first car 30a by suitable fasteners, such as nuts and bolts 46. The bumper block 44 extends from the front of each leading second car 30b and the rear of each first car 30b of each train of cars 30. Each bumper block 44 is preferably constructed of a polymeric material, such as 1900 UHMW which is of high durability, as the bumper blocks 44 are used to push other trains of cars 30 around the first track 14, as described in more detail hereinafter. The train of cars 30 shown in FIG. 7 omits the wheels 32 for purposes of clarity.

Referring now to FIGS. 4–8, each car 30 includes an extension arm 48 which is generally U-shaped in plan view. The extension arm 48 includes a base plate 50 which is in facing engagement with the front wall 38c of the subframe 38. The base plate 50 is secured to the front wall 38c of the subframe 38 by a plurality of fasteners 52, such as nuts and bolts. The extension arm 48 includes two side plates 54 extending generally perpendicularly therefrom a predetermined distance.

While in the preferred embodiment, it is preferred that the extension arm 48 be fastened to the subframe 38, it is understood by those of ordinary skill in the art that the extension arm 48 could be integrally formed with the subframe 38, without departing from the spirit and scope of the invention. For instance, if the subframe 38 and extension arm 48 were constructed of a polymeric material, they could be molded as a single piece.

Referring now to FIGS. 4–7, each of the cars 30 includes a positioning end bracket 56 pivotally mounted thereon, having at least one pair of hock hooks 58 extending therefrom. More particularly, the positioning bracket 56 is pivotally mounted on the side plates 54 by a nut-and-bolt pintle mechanism 60, and preferably includes two pairs of hock hooks 58 extending therefrom. The positioning bracket 56 is generally U-shaped and complements the configuration of the extension arm 48 to allow the positioning bracket 56 to pivot through a range of motion of one hundred and twenty degrees, although only a small portion of that is actually necessary for carrying out the present invention, as described in more detail hereinafter. Like the extension arm 48, the positioning bracket 56 includes a base plate 56a and a pair of side plates 56b extending therefrom in a generally perpendicular direction. The side plates 56b of the positioning bracket 56 are pivotally secured to the side plates 54 of the extension arm 48 by the pintle mechanisms 60.

Referring now to FIGS. 3–6, each car 30 includes a shoulder support arm 62 having a first end 62a movably mounted on a second track 64 which is mounted proximate the first track 14. The shoulder support arm 62 includes a second end 62b having shoulder-supporting members 66 extending therefrom for supporting the shoulders of the poultry as described in more detail hereinafter. The shoulder support arm 62 is slidably disposed on the positioning bracket 56, as described in more detail hereinafter.

In the present embodiment, it is preferred that the second track 64 be in the form of a continuous, generally oval cam rail, formed of one-inch rod, supported by the cross members 24 above the first track 14. More particularly, as shown in FIGS. 1 and 3, the upper ends 24a of the cross members 24 are interconnected by two generally longitudinal, generally parallel support rods 68 which extend from one end of the poultry processor 10 to the other. The support rods 68 are secured in complementary fashion to the upper ends 24a of the cross members 24, such as by welding. A beam 70 extends across each cross member 24 generally perpendicular to the support rods 68. The support rods 68 support the beam 70 above the upper ends 24a of the cross member 24. The terminal ends of the beam 70 receive a small pin 72 extending from the second track 64, to thereby support the second track 64. The beam 70 is mounted to the support rod 68 by a U bolt and bracket combination 74, wherein the U bolt is bolted to the support rod 68 and the bracket is welded to the beam 70. Each of the cross members 24 includes a beam 70 that supports the second track 64.

While in the present embodiment, it is preferred that the second track 64 be supported with respect to the first track 14 by the cross members 24, support rods 68, beam 70 and pins 72, it is understood by those of ordinary skill in the art that the second track 64 could be supported with respect to the first track 14 in other manners. For instance, the second track 64 could be supported from the ceiling of the plant in which the poultry processor 10 is installed, without departing from the spirit and scope of the invention. Similarly, while it is preferred that the second track 64 be endless, to match the configuration of the first track 14, if the first track 14 were not in an endless configuration, the second track 64 would be as well.

Figure 5:
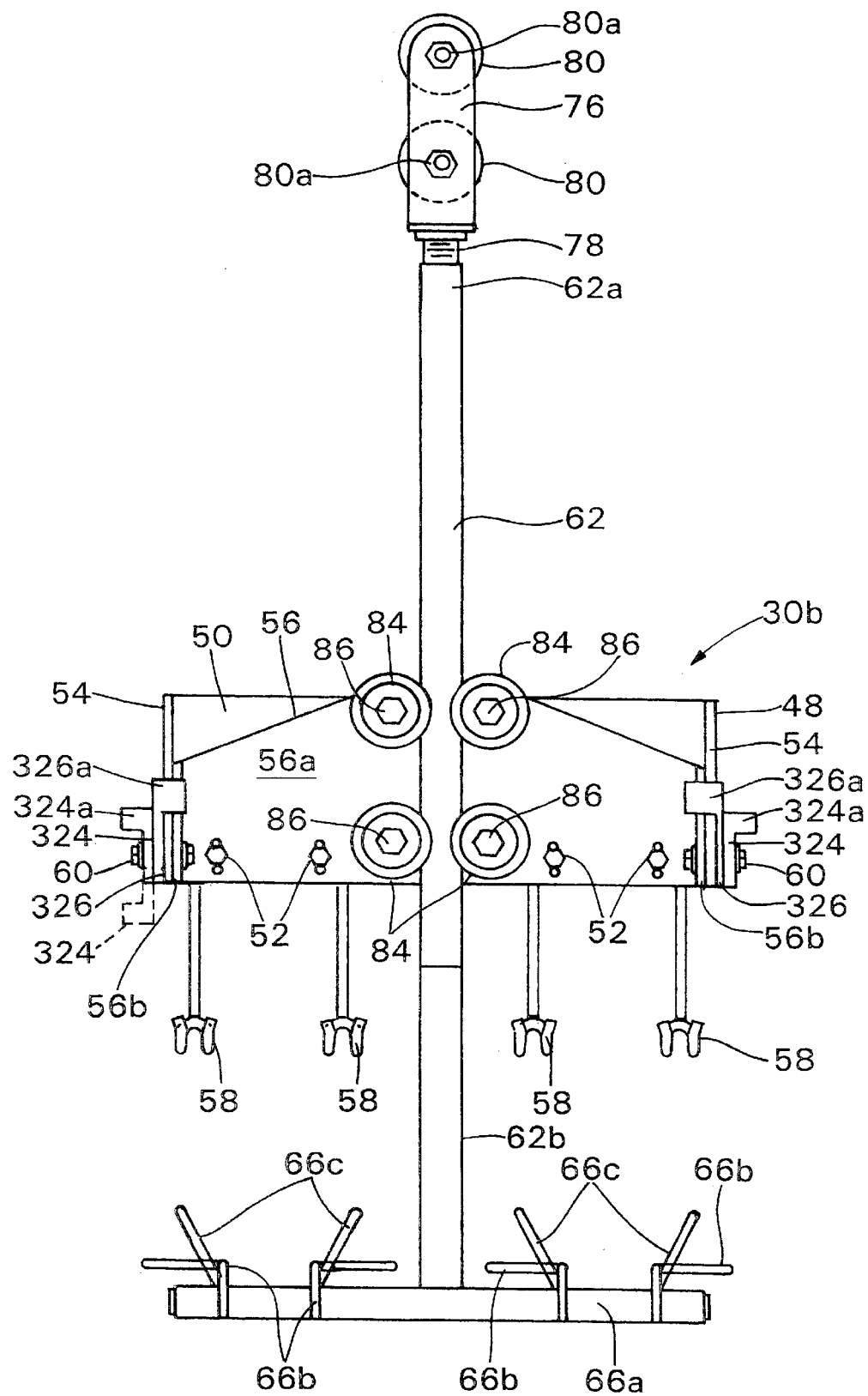
FIG. 5 is a greatly enlarged view of a car for transporting a pair of poultry, taken along line 5—5 of FIG. 3.

As shown in FIG. 5, the shoulder-supporting members 66 are in the form of a bar 66a welded to the second end 62b of the shoulder support arm 62. The bar 66a extends generally perpendicularly from second end 62b of the shoulder support arm 62.

On each side of the second end 62b of the shoulder support arm 62 are a pair of generally L-shaped rods 66b for engaging the back side of the shoulders of the poultry and for hooking under the wings of the poultry, and a pair of angled rods 66c for engaging the top of the shoulders of the, as shown in FIG. 10A.

Referring now to FIGS. 3 through 6, the first end 62a of the shoulder support arm 62 includes a plate 76 extending therefrom. The plate 76 is offset from the longitudinal axis of the shoulder support arm 62, and is threadably secured thereto by a threaded shaft 78. The plate 76 supports a pair of juxtaposed guide wheels 80, each having rounded grooves therein riding on either side of the second shaft 64 in complementary relationship thereto. The guide wheels 80 are secured to the plate 76 by suitable bolts 80a. As shown in FIG. 4, the threaded shaft 78 is secured to the plate 76 by a collar 82 which permits the threaded shaft 78 to rotate with respect to the plate 76.

Referring now to FIGS. 4 through 8, the base plate 56a of the positioning bracket 56 includes two pairs of oppositely disposed wheels 84, secured to the base plate 56a by bolts 86 passing through the wheels 84 into the base plate 56a. The wheels 84 secured to the base plate 56a include V-shaped grooves which conform to the cross-sectional configuration of the shoulder support arm 62 (see FIG. 4). As such, the shoulder support arm 62 is slidably disposed with respect to the base plate 56a.

In this manner, the first and second tracks 14, 64 are configured such that as the trains of cars 30 move along the first track 14, the first end 62a of each shoulder support arm 62 follows the second track 64 and moves with respect to the first track 14 to cause the positioning bracket 56 to pivot with respect to the extension arm 48 and car 30, and the second end 62b of the shoulder support arm 62 to move with respect to the hock hooks 58 on the positioning bracket 56. The relative positions of the first and second tracks 14, 64 are selected such that the shoulder supporting members 66 are positioned with respect to the hock hooks 58 throughout the range of motion of the cars 30 through the various stations of the poultry processor 10 to properly position the poultry for the particular station's process, as described in more detail hereinafter.

Referring now to FIG. 2, the poultry processor 10 includes a transmission, generally designated 88, engaged with the first car 30a of the plurality of cars 30. The transmission 88 drives the first car 30a along a first portion 14c of the first track 14 at a first speed, and intermittently stops the first car 30a at a second portion 14d of the first track 14, such that the poultry is transported along the conveyor 12. The poultry processor 10 physically processes the poultry while the conveyor 12, via the transmission 88, is maintaining the poultry in a stationary position with respect to the support surface 20. As used herein, the terminology "physical processing" means carrying out some physical operation on the bird, aside from a visual inspection. Such physical processing includes, inter alia, cutting a circular opening at the vent of the poultry while the conveyor 12 is maintaining the poultry in a stationary position with respect to a support surface, and then starting a second cut in the poultry at the circular opening and extending generally toward the breast point or keel bone, while the conveyor 12 maintains the poultry in a stationary position with respect to the support surface 20. Other examples of such physical processing include eviscerating the poultry and cleaning the poultry, either with a normal clean out procedure, or a radical clean out procedure, as described in more detail hereinafter.

Referring now to FIGS. 2-4, 6 and 9, the transmission 88 preferably includes a first rotatably driven auger 90 supported proximate the first track 14. The first auger 90 includes a generally helical flute 90a. The first auger 90 further includes a longitudinal axis 90b which extends generally parallel to the first track 14. The first auger 90 is driven by the transmission 88 at a generally constant speed. More particularly, the first auger 90 is driven by a motor 90c mounted at one of the terminal ends of the first auger 90.

As best shown in FIG. 6, the first car 30a includes a rotatable follower 30c positioned within the flute 90b. The follower 30c is rotatably mounted to a flange 30d extending from the upper wall 38a of the subframe 38. The follower 30c is generally in the form of a disk which is sized to be complementarily fit within the flute 90a of the first auger 90.

Accordingly, the first car 30a is translated along the first track 14 upon rotation of the first auger 90. Since the second cars 30b are secured to the first car 30a in the form of a train, all of the cars 30 in each train are translated along the first track 14 upon rotation of the first auger 90.

Figure 9:
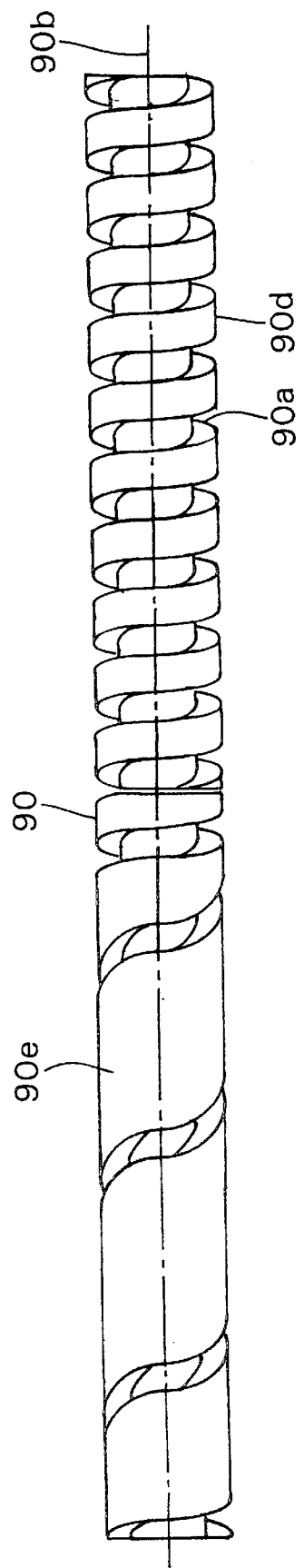
FIG. 9 is a greatly enlarged elevational view of an auger for transporting poultry in accordance with the present invention.

As best shown in FIGS. 2 and 9, the helical flute 90a of the first auger 90 has a first portion 90d of uniform pitch for moving the first car 30a, and the second cars 30b secured thereto, at a uniform speed along a first section 14e of the first track 14, and a second portion 90e of the varying pitch for accelerating and decelerating the first car 30a along a second section 14f of the first track 14. Accordingly, the first and second sections 14e, 14f of the first track 14 fall within the first portion 14c of the first track 14, wherein the transmission 88 drives the first car 30a at a first speed along the first track 14.

Referring now to FIGS. 2-4 and 6, the first auger 90 is rotatably supported in a generally complementarily sized aperture 24b along the lateral ends of the cross member 24. The first auger 90 is rotatably supported by a set of pillow blocks 92 at opposing ends of the first auger 90, which allow the auger 90 to rotate with respect to the cross members 24. As mentioned above, the motor 90c is mounted at one end of the first auger 90 for driving the auger 90 at a generally constant speed.

While in the present embodiment it is preferred that the first auger 90 be rotatably mounted on the cross members 24 via the pillow blocks 92, it is understood by those of ordinary skill in the art from this disclosure that the present invention is not limited to mounting the first auger 90 proximate the first track 14 in any particular manner.

Referring now to FIG. 2, the transmission 88 further includes a second rotatably driven auger 96 supported proximate the first track 14. The second auger 96 is generally identical to the first auger 90, except for slight variations in pitch conducive to the particular speed at which it is preferred to move the cars 30 along the portion of the first track 14 adjacent thereto. The first and second augers 90, 96 are supported in a similar manner on the cross members 24. The second auger 96 also includes a generally helical flute 96a, and is positioned downstream and spaced from the first auger 90 a predetermined distance.

The plurality of cars 30 includes first, second, third and fourth car trains 30(1), 30(2), 30(3), 30(4) respectively, having followers 30c. The second car train 30(2) is located between the first and second augers 90, 96. The first, second and third car trains 30(1), 30(2), 30(3), have a length. The followers 30c are located on the first, second and third car trains 30(1), 30(2), 30(3) at a first end thereof (i.e., the trailing end thereof). The length of the first, second, third and fourth car trains 30(1), 30(2), 30(3), 30(4) and the predetermined distance between the first and second augers 90, 96 is selected such that, upon rotation of the first and second augers 90, 96, at least one of the first, second and third car trains 30(1), 30(2), 30(3) is translated along the first track 14 by the first auger 90. The other of the first, second and third car trains 30(1), 30(2), 30(3), is stationary with respect to translation along the first track 14 until the translated one of the first, second and third car trains 30(1), 30(2), 30(3), are translated the length of one of the first, second and third car trains 30(1), 30(2), 30(3), whereupon the translated one of the first, second and third car trains 30(1), 30(2), 30(3) engages and moves the other of the first, second and third car trains 30(1), 30(2), 30(3) along the first track 14 to position the follower 30c of the other of the first, second or third car trains 30(1), 30(2), 30(3), within the flute 96a of the second auger 96 to translate the other of the first, second and third car trains 30(1), 30(2), 30(3) along the first track. The translated one of the first, second and third car trains 30(1), 30(2), 30(3) is positioned between the first and second augers 90, 96 in a stationary position with respect to translation along the first track 14, as described in more detail hereinafter.

Referring now to FIG. 2, in the present embodiment, it is preferred that the poultry processor 10 include third and fourth augers 97, 98, respectively, positioned proximate the first track 14 in a manner identical to that described above in connection with the first auger 90. The third and fourth augers 97, 98 are generally identical to the first auger 90, except for slight variations in pitch conducive to the particular speed at which it is preferred to move the cars 30 along the portion of the first track 14 adjacent thereto. Each on the second, third and fourth augers 96, 97, 98 is driven at a constant speed by a motor 96c, 97c, 98c, respectively, at one end thereof. The first, second, third and fourth augers 90, 96, 97, 98 are preferably driven at the same speed.

The first, second, third and fourth augers 90, 96, 97, 98 are arranged around the first track 14 to control the speed, position and dwell times of the various car trains mounted on the first track 14. That is, the pitch of the flutes 90a, 96a, 97a, 98a of the first, second, third and fourth augers 90, 96, 97, 98, respectively, is selected such that, when the car trains are located in the venting and opening station 110, eviscerating station 210 and cleaning station 410, the car trains are in a stationary position with respect to the first track 14 and the support surface 20. This can be achieved in one of two ways, either locating the follower for a particular car train in an flute of an auger which has zero pitch, or locating the follower of a particular train along the first track between the augers. For instance, the latter method is used to maintain the car trains within the venting and opening station 110 and the eviscerating station 210. In the present embodiment, there are fourteen car trains, each including five cars, spaced about the first track 14. The car trains located upstream from the venting and opening station 110 receive poultry to be processed, while the car trains located downstream from the cleaning station 410 transfer the processed poultry to another processor for further handling.

Referring now to FIG. 2, in use, an initial car train 30(0) having a follower 30c engaged with the flute 90c located along the first portion 90d of the first auger 90 receives poultry to be processed from a transfer shackle (not shown). The initial car train 30(0) is translated along the first track 14 by the first portion 90d of the first auger 90 until the bumper 44 on the leading second car 30b eventually bumps into the bumper 44 on the trailing first car 30a on the first car train 30(1), which has its follower 30c located within a portion of the flute 90a of the first auger 90 having zero pitch. Upon being bumped by the initial car train 30(0), the first car train 30(1) is accelerated along the second portion 90e of the first auger 90 until it bumps the second car train 30(2) and pushes the second car train 30(2) from its stationary position within the venting and opening station 110. The first car train 30(1) travels the full length of the second portion 90e of the first auger 90, whereupon it becomes stationary when the follower 30c of the first car train 30(1) exits the second portion 90e of the first auger 90. At this point, the first car train 30(1) is located in a stationary position within the cleaning and venting station 110 and the second car train 30(2) has been moved to a position on the first track 14 between the venting and opening station 110 and the eviscerating station 210. The third car train 30(3), which was between the venting and opening station 110 and the eviscerating station 210, is then pushed along the first track 14 by the second car train 30(2) until its follower 30c is located just upstream of the second auger 96. The fourth car train 30(4) which was stationary within the eviscerating station 210, is then bumped and pushed forward such that its follower 30c is transferred into the second portion 96e of the second auger 96, whereupon it is accelerated out of the eviscerating station 210 to make room for the third car train 30(3). The fourth car train 30(4) then bumps into a fifth car train 30(5). While the fourth car train 30(4) was undergoing processing in the eviscerating station 210 the fifth car train 30(5) was being constantly translated along the first track 14 by the first portion 96d of the second auger 96, to allow for room for the fourth car train 30(4) to pushed from the evisceration station 210. This process continues throughout the length of the first track 14 such that each of the car trains is either in a stationary position, an accelerated position, or in a constant velocity position, to carry out all of the various functions described in detail hereinafter.

While in the preferred embodiment the car trains each include five cars 30, it is understood by those of ordinary skill in the art that the number of cars which form the trains is not pertinent to the present invention, and that other numbers of cars could be used to form the trains, including one or ten. By selecting the car trains to carry five cars, each car train is sufficiently long to carry ten poultry at a time, so that ten poultry at a time are processed at each station, consistent with a production goal of seventy birds per minute.

In summary, the number of cars 30 on the first track 14 is less than the number that would fill it completely, bumper-to-bumper. In this way, one train of cars 30 can be accelerated ahead of the following train of cars 30, then brought to rest at a processing station while operations are performed, before the following train of cars 30 catch up with the train of cars 30 in the processing station. The car grouping arrangement permits the car motion to be intermittent at the venting and opening, eviscerating, and cleanup stations 110, 210, 410, and continuous everywhere else, including the loading and unloading stations, where continuous motion is customary and preferable.

While in the present embodiment it is preferred that the cars 30 be transported by the first and second tracks 14, 64 and the augers 90, 96, 97, 98 through the various stations of the poultry processor 10, it is understood by those of ordinary skill in the art from this disclosure that other transporting type devices could be used without departing from the spirit and scope of the invention so long as the cars 30 are stationary in the venting and opening, eviscerating, and cleanup stations 110, 210, 410 and hold the poultry in the positions described hereinafter. For instance, instead of the augers, each of the cars 30 could have its own AC motor (not shown).

Referring now to FIGS. 10A through 15C, there is shown the venting and opening station 110 for automatically venting and opening a slaughtered poultry 112. The poultry 112 includes a pair of hocks 112a, a ring muscle 112b, and a back 112c. The conveyor 12 receives the poultry 112 and transports it along a predetermined path. As discussed above in connection with the conveyor 12, the predetermined path is along the first track 14. The first track 14 extends through the venting and opening station 110 in a generally linear manner. However, it is understood by those of ordinary skill in the art that the first track 14 could extend through the venting and opening station 110 in other manners, such as in an arcuate path (not shown). The poultry 112 is positioned on the conveyor 12 in a first predetermined position, as shown in phantom in FIG. 10A, wherein the poultry 112 is hanging by its hocks 112a with its back 112c in a generally horizontal position. The back 112c of the poultry 112 is maintained in a generally horizontal position by maintaining the position of the shoulder supporting members 66 with respect to the hock hooks 58 such that the back 112c of the poultry 112 extends in a generally horizontal direction. The relative positions of the hock hooks 58 and shoulder supporting members 66 is controlled by the relative position of the second track 64 with respect to the first track 14. For instance, when poultry to be processed is transferred to the poultry processor 10 near the first auger 90, the shoulder supporting members 66 are pivoted inwardly and away from the hock hooks 58 to permit the poultry 112 to be automatically and easily transferred by the transfer shackle (not shown) to the hock hooks 58. After the transfer is completed, the second track 64 causes the second end 62b of the shoulder supporting arm 62 to move upwardly and outwardly the to thereby engage the shoulders and wings of the poultry 112 and lift the back 112c of the poultry 112 to a generally horizontal position (as shown in phantom in FIG. 10A) for entry into the venting and opening station 110.

Figure 10C:
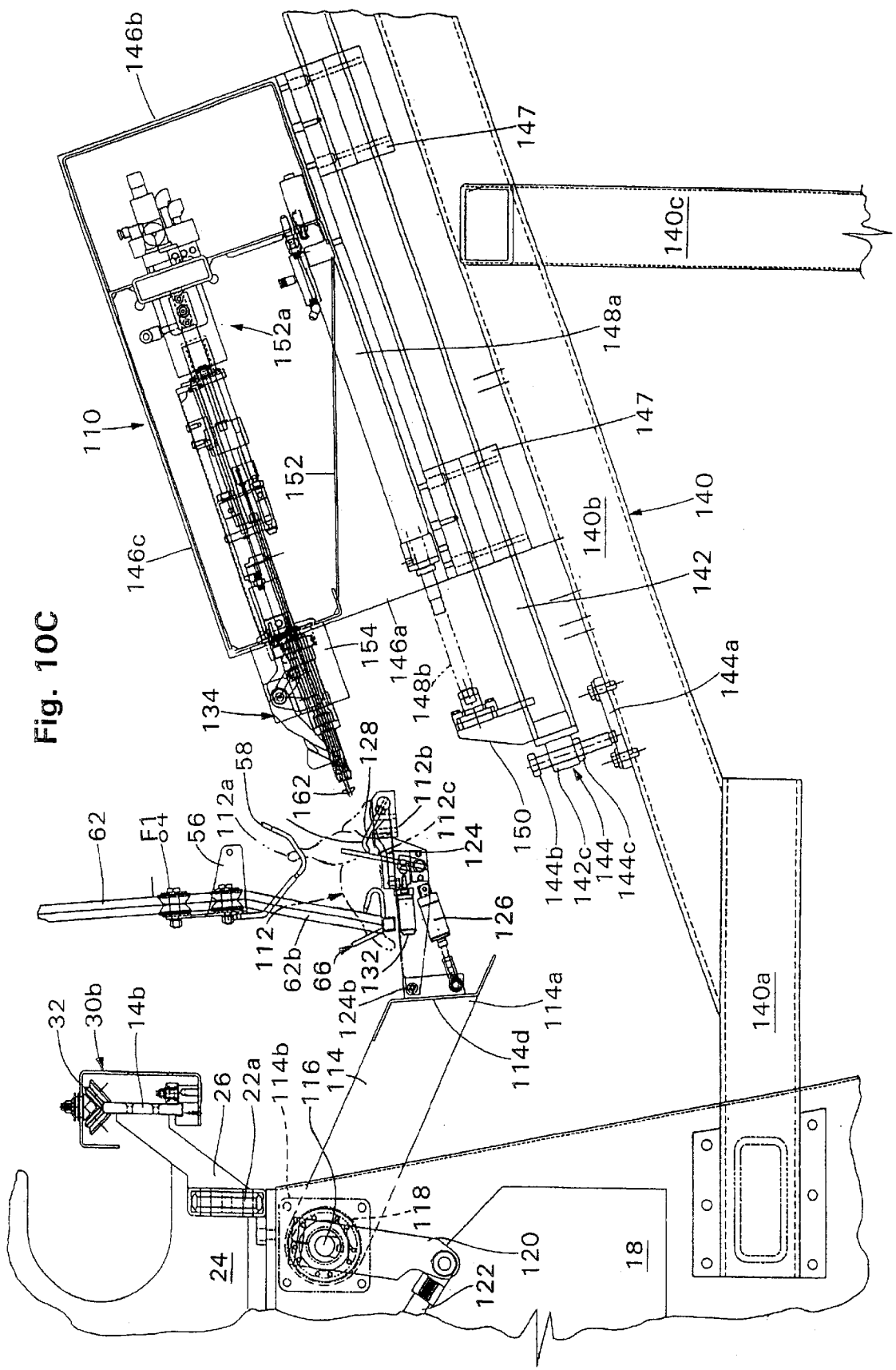
Figure 10D:
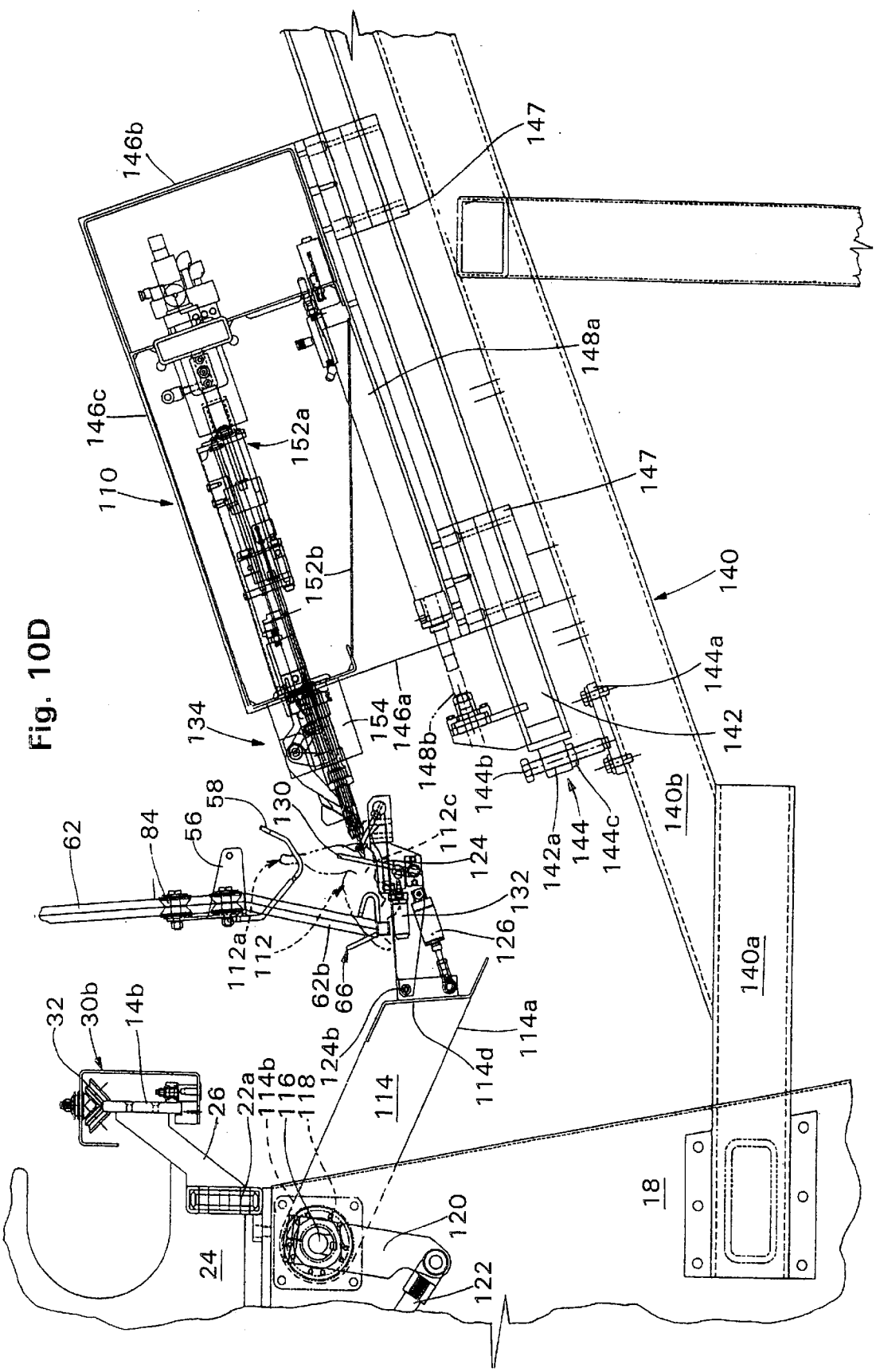
Figure 10E:
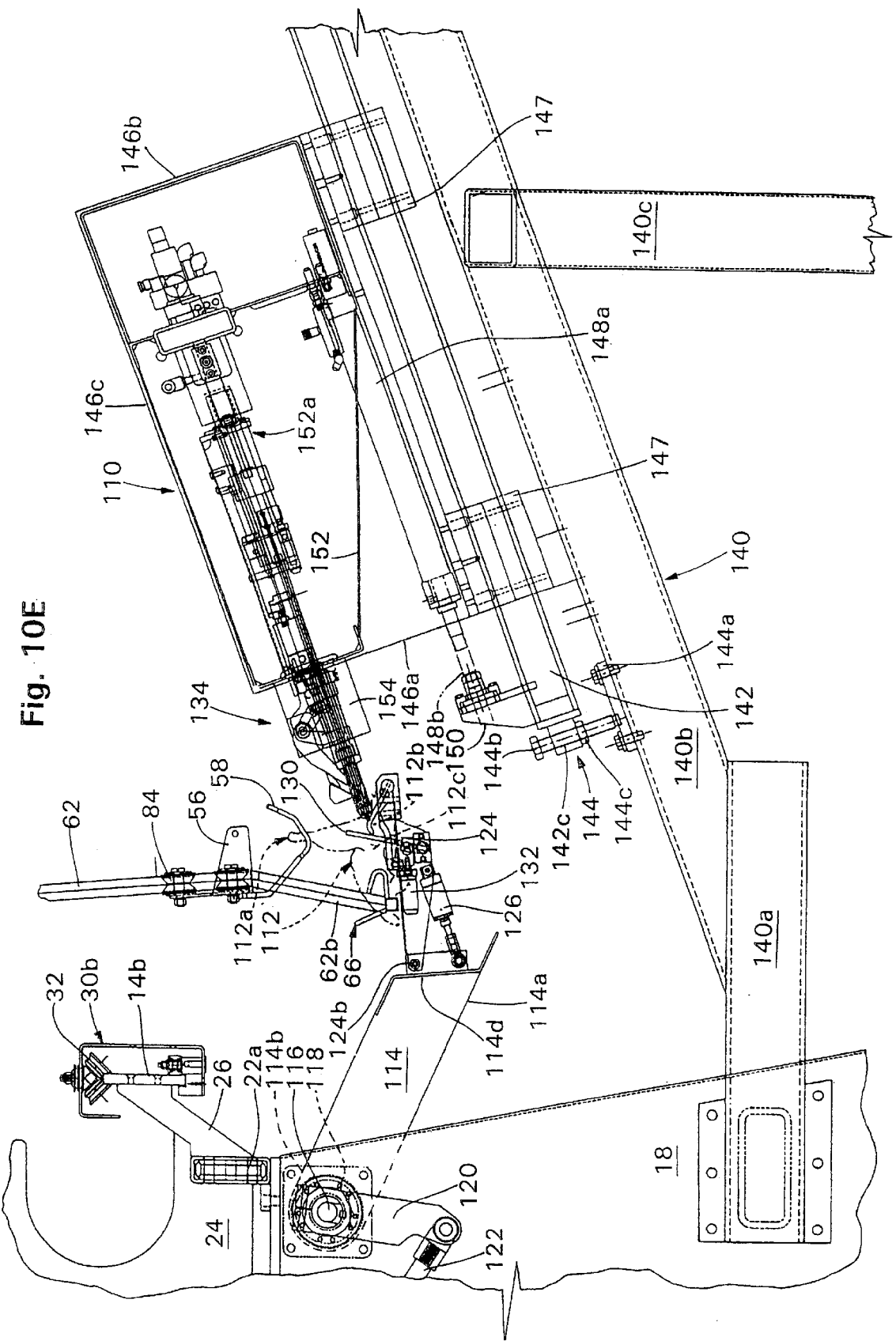
Figure 10F:
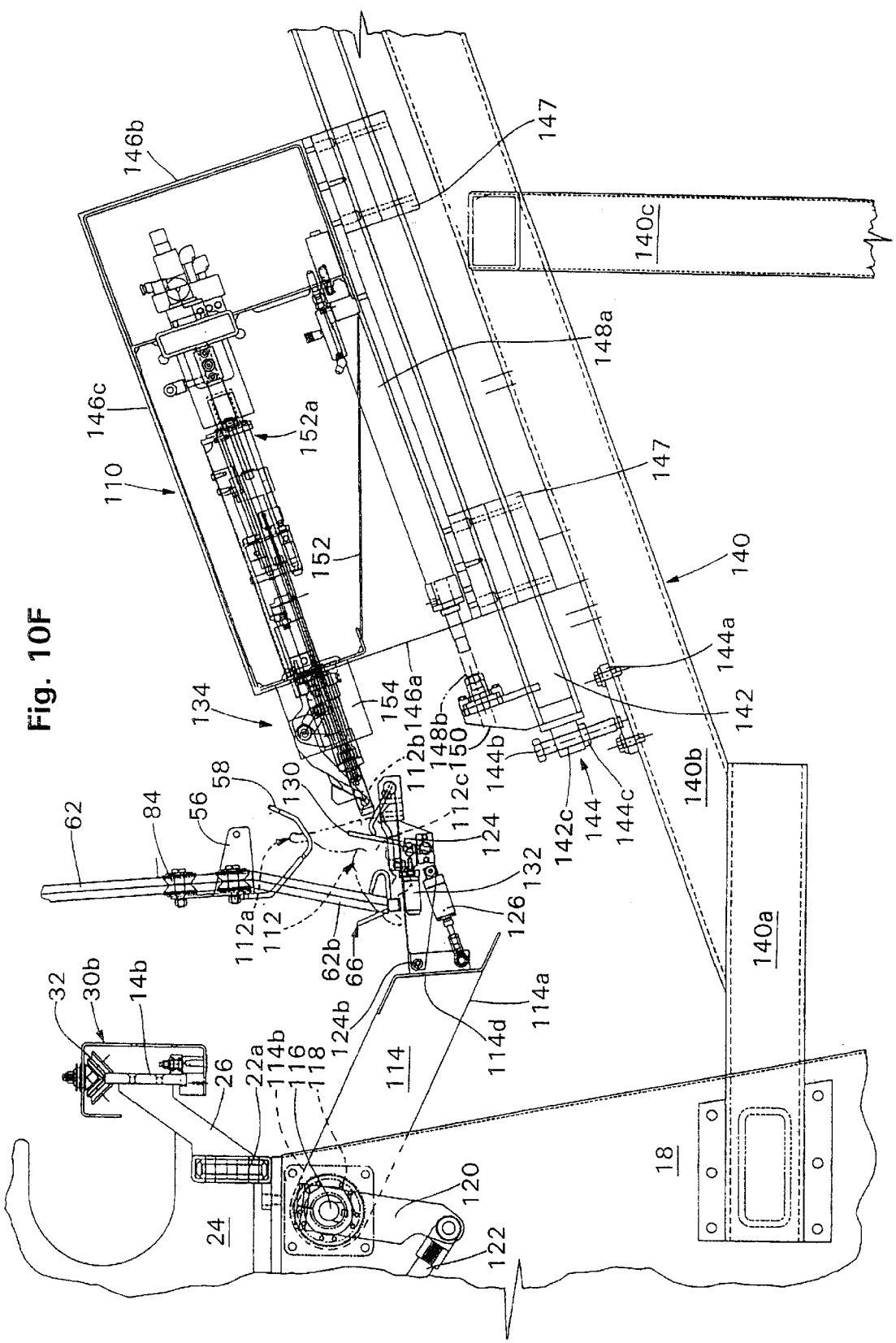
Figure 10G:
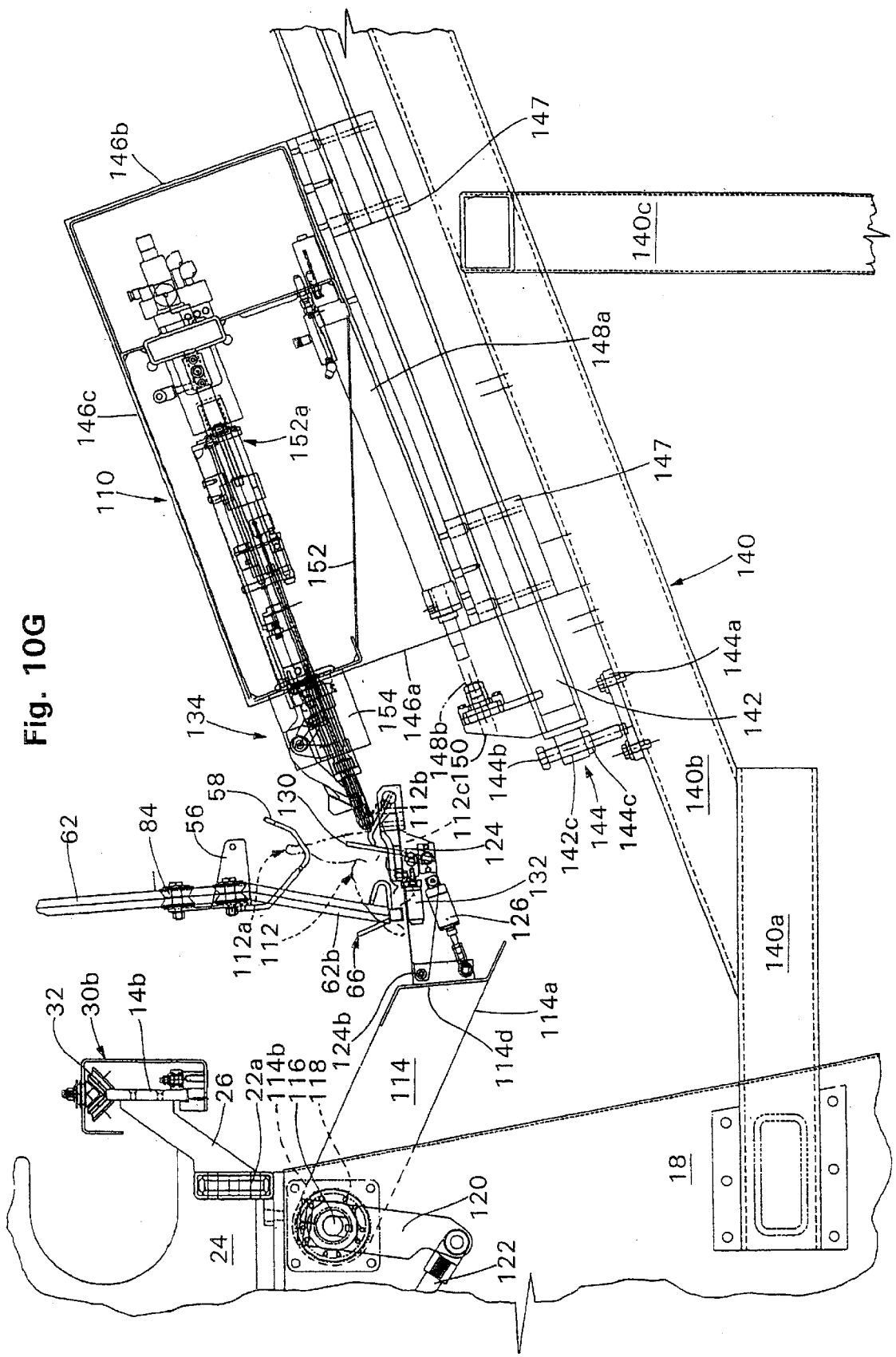
Figure 10H:
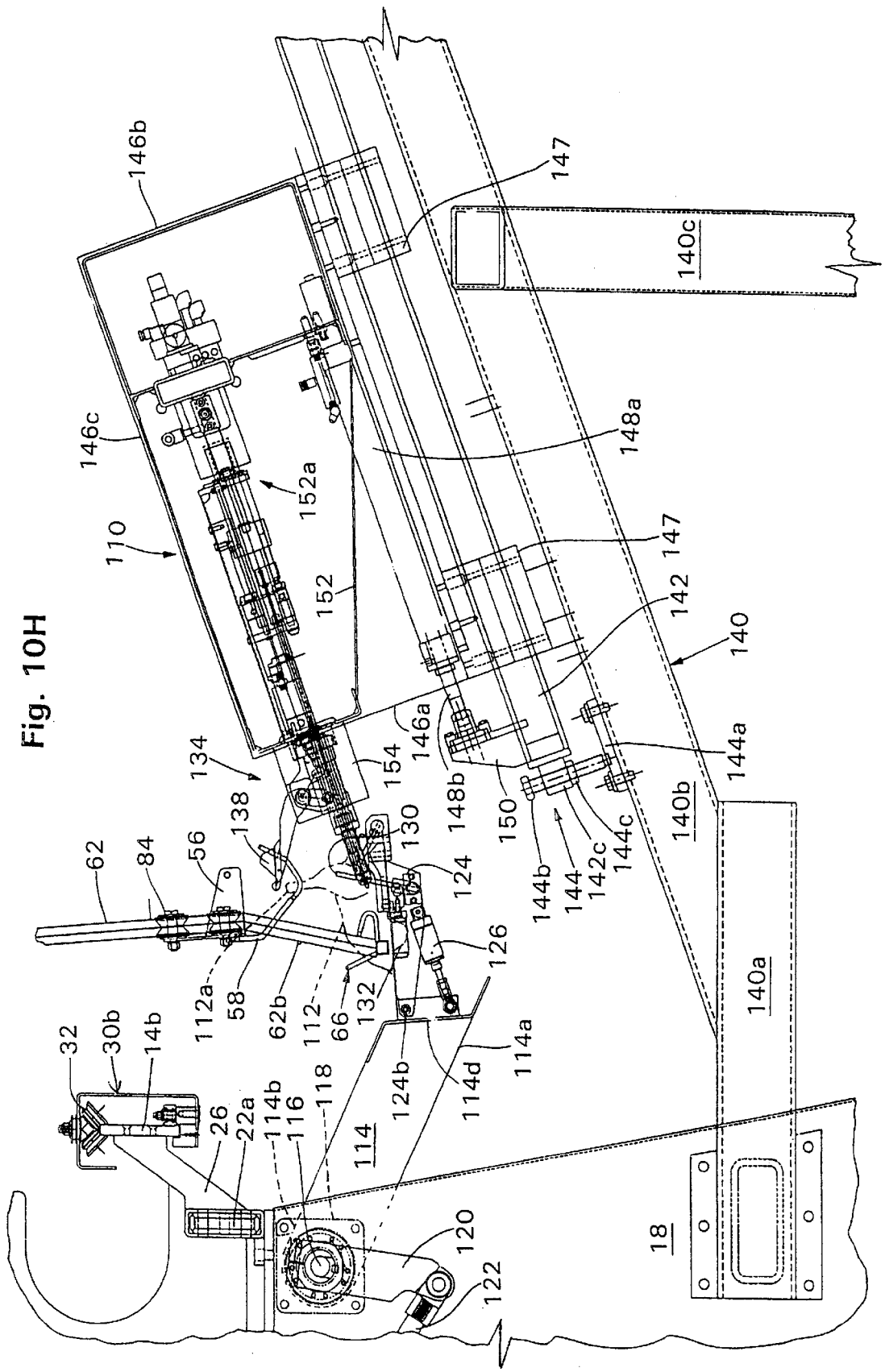
Figure 10I:
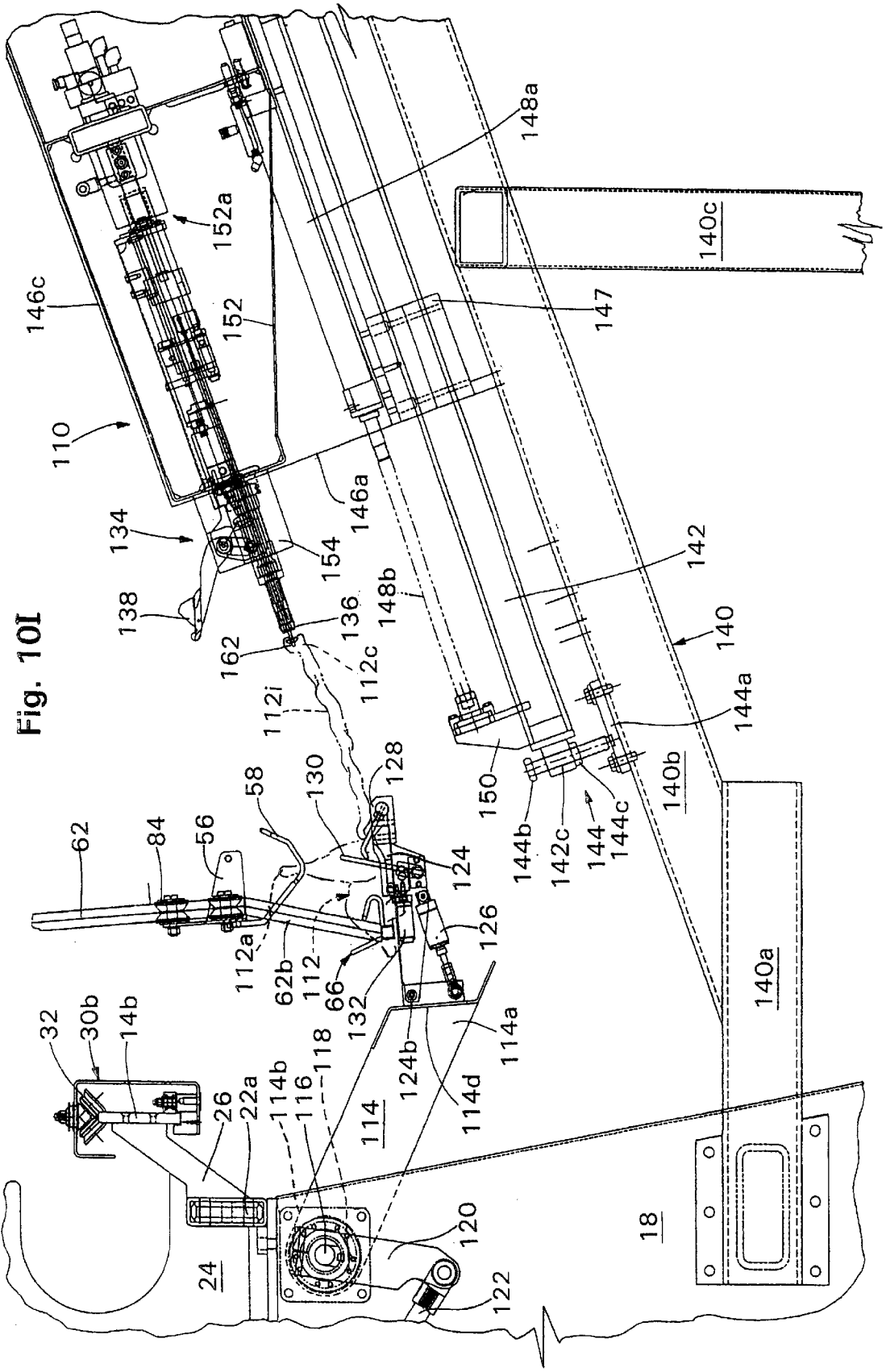
Figure 10J:
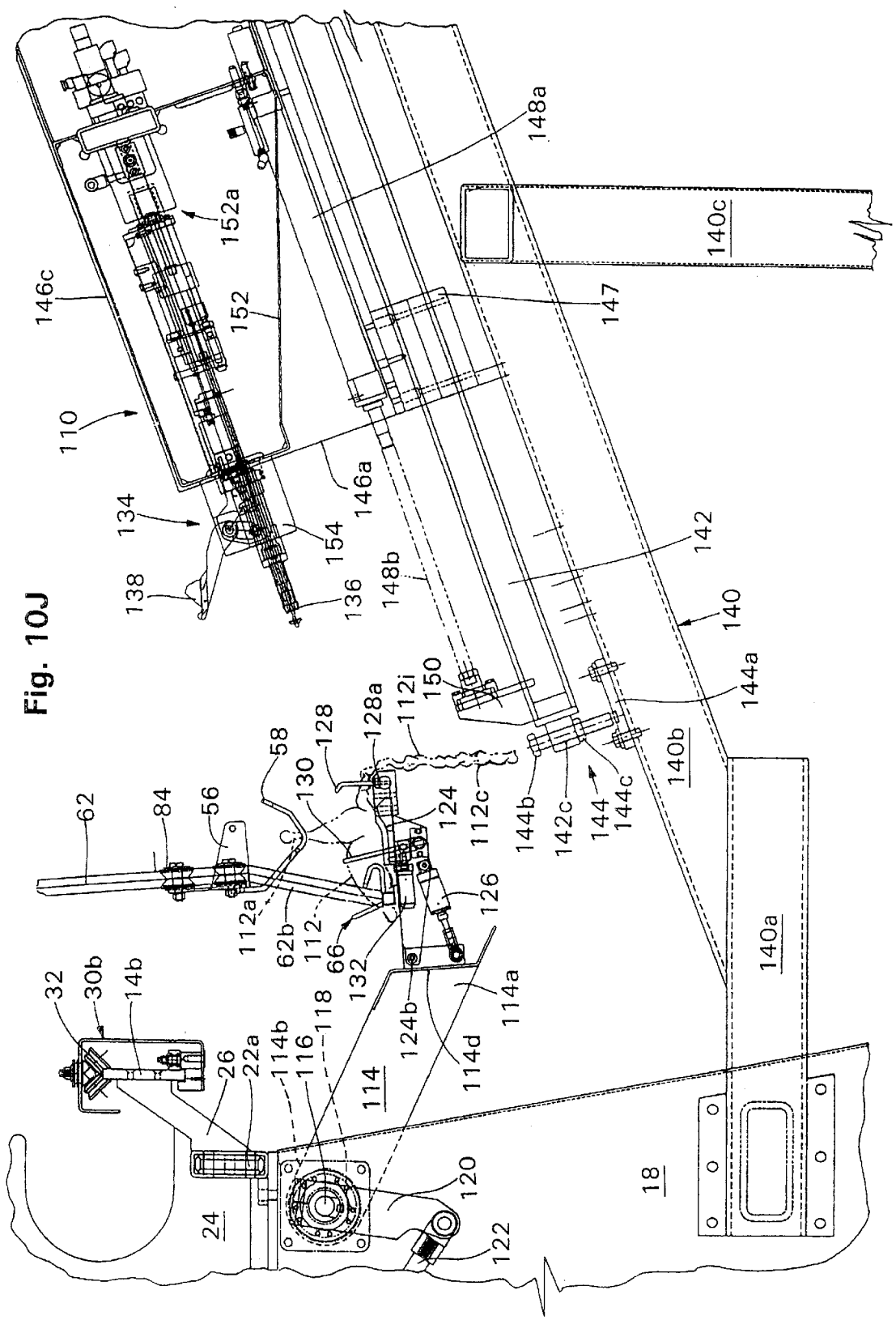
Figure 11:
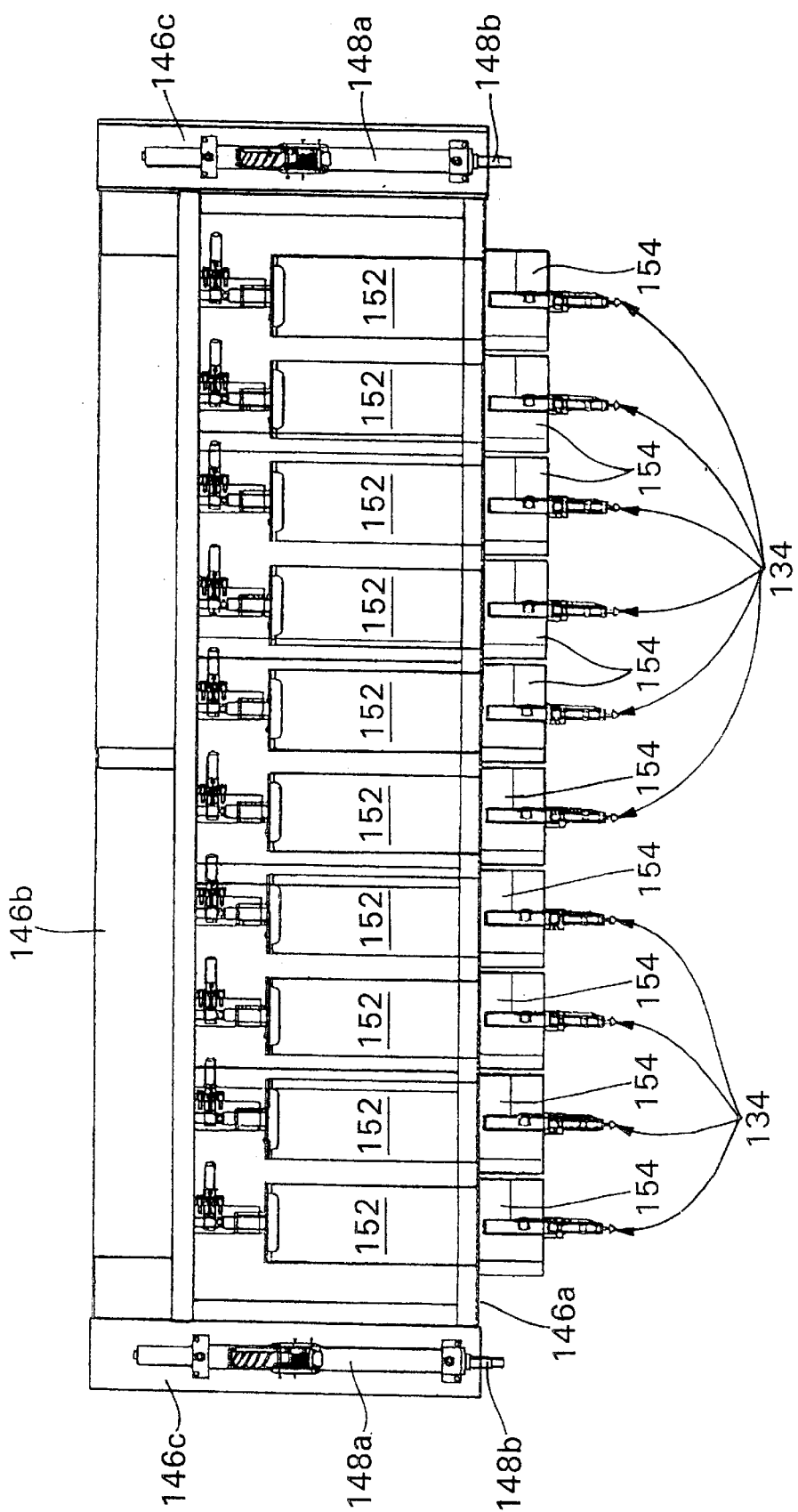
FIG. 11 is a top plan view of the venting and opening station in accordance with the present invention.

Referring now to FIGS. 10A through 14, there is shown a venting and opening station 110 which receives the conveyed poultry 112. As best shown in FIG. 11, the venting and opening station 110 is designed to vent and open ten poultry simultaneously. That is, each car train carrying ten poultry is located within the venting and opening station 110, and the venting and opening process is carried out with respect to each poultry 112 on the train of cars 30. The following description of the venting and opening process is set forth with respect to one poultry 112, but is identically carried out with respect to the remaining nine poultry.

Referring now to FIG. 10A, the venting and opening station 110 includes a positioning arm 114 having a first end 114a movable between a stowed position (shown in FIG. 10A) spaced from the conveyed poultry 112 and a cutting position (shown in FIGS. 10B–10J) when the poultry 112 is clamped in position on the first end 114a for cutting the vent and opening the abdomen. The positioning arm 114 includes a second end 114b rotatably fixed to a support bar 116. The support bar 116 extends between the towers 18 located on opposite sides of the venting and opening station 110, as shown in FIG. 1. The support bar 116 is rotatably mounted on the towers 118 via a bearing mechanism 118. A lever 120 extends from the support rod 116 and is rotatably secured thereto. A hydraulic cylinder 122, mounted on the tower 18, is secured to the terminal end of the lever 120 to cause the support bar 116 to rotate, thereby causing the first end 114a of the positioning arm 114 to move between the stowed position and the cutting position.

A support plate 124 is mounted on the first end 114a of the positioning arm 114. More particularly, the support plate 124 is movably mounted on the first end 114a of the positioning arm 114 to move between a fully extended position, when the positioning arm 114 is in the stowed position (as shown in FIGS. 10A, 10B and 10J), and a compressed position, when the positioning arm 114 is in the cutting position (as shown in FIGS. 10C through 10I). The support plate 124 is biased to the extended position by a spring force. More particularly, the support plate 124 is pivotally mounted to the first end 1 14a of the positioning arm 114 at a pivot point 124b. A first pneumatic cylinder 126 extends between the first end 114a of the positioning arm 114 and the support plate 124. The first pneumatic cylinder 126 is arranged to maintain the support plate 124 in a generally horizontal position when the positioning arm 114 is located in the cutting position. The first pneumatic cylinder 126 is the spring force which biases the support plate 124 toward the extended position. While in the present embodiment it is preferred that the spring force be provided by a pneumatic cylinder, it is understood by those of ordinary skill in the art, from this disclosure, that other mechanisms could be used to bias the support plate 124 to the extended position, such as coil or leaf springs (not shown), without departing from the spirit and scope of the invention.

The first end 114a of the positioning arm 114 includes a pair of pivotally mounted pelvis clamping bars 128 having a pivot point 128a located a known dimension from the conveyor 12. The pelvis clamping bars 128 are movable between an open position when the positioning arm 114 is in the stowed position (as shown in FIGS. 10A and 10J) and a clamping position when the positioning arm 114 is in the cutting position (as shown in FIGS. 10C–10I). The pelvis clamping bars 128 are positioned on both sides of the ring muscle 112b. Unlike the support plate 124, the pelvis clamping arms 128 are maintained in a predefined clamping position by a force F1 (see FIG. 10C) adequate to maintain that predefined position. The pelvis clamping arms 128 are actuated by a pneumatic cylinder (not shown).

In the present embodiment, the positioning arm 114 is generally U shaped in plan view. There are two positioning arms 114 which are secured to the towers 18 which are proximate the venting and opening station 110. A cross plate 114d, which is generally Z shaped in cross section, extends between the first ends 114a of the two positioning arms 114. There are ten support plates 124 (one for each poultry 112) and first pneumatic cylinders 126 (only one is shown) mounted on the cross plate 114d. Similarly, there are ten sets of pelvis clamping bars 128. However, only a single pneumatic cylinder (not shown) actuates the pelvis clamping bars 128 simultaneously. The pneumatic cylinder which controls the position of the pelvis clamping bars 128 is fixed in relation to the conveyor 12 or the towers 18. In this manner, the positioning arm 114 is located with respect to the conveyor 12 such that, as the first end 114a of the positioning arm 114 moves from the stowed position to the cutting position, the support plate 124 engages the back 112c of the poultry 112 to maintain the back 112c in a generally horizontal position. The pelvis clamping bars 128 are then moved to the clamping position to bias the poultry 112 toward the support plate 124 to move the support plate 124 toward the compressed position to hold the poultry 112 against the support plate 124 in position for venting and opening when the positioning arm 114 is in the cutting position. Generally, the ring muscle 112b of the poultry 112 is usually located a fixed distance from the pelvis area of the poultry 112. As such, because the pivot point 128a of the pelvis clamping bars 128 is fixed in relation to the conveyor 12 or towers 18, and the support plate 124 can move with respect to the conveyor 12 and/or towers 18 due to the first pneumatic cylinder 126, when the pelvis clamping bar 128 are moved to the clamping position, depending upon the thickness of the back 112c of the poultry 112, the support plate 124 is compressed against the first pneumatic cylinder 126 such that the ring muscle I 12b of the vent of the poultry 112 is always in a fixed position with respect to the pelvis clamping bars 128 and the conveyor 112. That is, the support plate 124 and first pneumatic cylinder 126 compensate for differently sized poultry, so that the ring muscle 112b is always in a fixed position for cutting, regardless of the size of the poultry.

To assist with maintaining the poultry 112 in proper position for the venting and opening process, a pair of hip bars 130 are pivotally mounted to the support plate 124 and movable between an open position (as shown in FIGS. 10A and 10J), when the positioning arm 114 is in the stowed position, and a clamping position (as shown in FIGS. 10C–10I), when the positioning arm 114 is in the cutting position. The hip bars 130 are moved to the clamping position by a second pneumatic cylinder 132 mounted on the support plate 124.

Referring now to FIGS. 10A through 14, the venting and opening station 110 includes a cutting tool, generally designated 134, positioned with respect to each pelvis clamping bar 128 and the support plate 124 to consistently cut the poultry 112 at a specific location on the poultry 112 when the poultry 112 is held against the support plate 124 by the pelvis clamping bars 128. In the present embodiment, it is preferred that the cutting tool 134 be positioned with respect to the pelvis clamping bars 128 and the support plate 124 to consistently cut the poultry 112 at the ring muscle 112b or vent of the poultry 112 when the poultry 112 is held against the support plate 124 by the pelvis clamping bars 128. More particularly, the venting and opening station 110 includes a bank of cutting tools 134 (i.e., one for each poultry 112) which move simultaneously with respect to the first end 114a of the positioning bar 114. The bank of cutting tools 134 is best shown in FIG. 11. Each cutting tool 134 includes a generally cylindrical drill 136 for cutting around the ring muscle 112b of the poultry 112. A cutting blade 138 is positioned to cut a portion of the abdomen of the poultry 112 when the poultry 112 is held against the support plate 124 by the pelvis clamping bars 128, in a manner well understood by those of ordinary skill in the art.

Referring now to FIG. 10A, the bank of cutting tools 134 is reciprocally mounted on a second frame 140 which extends from the towers 18 which support the support bar 116. The second frame 140 is comprised of a pair of first struts 140a (only one is shown) which extend from the towers 18. The first struts 140a are secured to the towers 18 using a conventional securing method, such as by using a standard hardware (e.g., a bracket and bolt arrangement). However, the first struts 148 can be secured to the towers 18 using other methods, such as welding.

The second frame 140 further includes a pair of second struts (only one is shown) which extends from the terminal ends of the first struts 140a at an angle of approximately thirty degrees with respect to a horizontal plane. The second struts 140b are supported at approximately their mid-points by a pair of third struts 140c which extend downwardly to the support surface 20 to firmly support the bank of cutting tools 134. The second struts 140b are secured to the first struts 140a, and the third struts 140c are secured to the second struts 140b by conventional fastening methods, such as welding. In the present embodiment, each of the first, second and third struts 140a, 140b, 140c is in the form of a generally rectangular tube, as best shown in FIG. 10A. While in the present embodiment it is preferred that the bank of tools 134 be supported by the second frame 140, it is understood by those of ordinary skill in the art that the present invention is not limited to supporting the bank of cutting tools 134 in any particular manner. For instance, the bank of cutting tools 134 could be supported on a frame which is not connected to the towers 18 (not shown).

The bank of cutting tools 134 is reciprocally mounted on the second struts 140b. That is, a carriage beam 142 is mounted on each of the second struts 140b on the upper surface thereof. The carriage beam 142 is mounted to be spaced from the upper surface of the second struts 140b by an adjustable leg 144 at one end thereof and a post at the other end (shown in connection with the evisceration station 210, described hereinafter). The adjustable leg 144 include a base plate 144a bolted to the upper surface of the second truss 140b. A threaded bolt 144b extends upwardly from the base plate 144a and extends through a collar 142a extending from the end of the carriage beam 142. The vertical position of the collar 142a with respect to the base plate 144a is controlled by a nut 144c threadably disposed on the threaded bolt 144b. By controlling the position of the nut 144c, the vertical position of the cutting tool 134 can be adjusted with respect to the pelvis clamping bars 128 to ensure that the cutting tool 134 always engages the ring muscle 112b of the poultry 112.

Referring now to FIG. 11, there is shown the bank of cutting tools 134 mounted within a third frame 146 slidably disposed on the carriage beam 142 for uniform movement of each of the cutting tools 134 with respect to the pelvis clamping bars 128 and the poultry 112. The third frame 146 is comprised of a front wall 146a which supports the operating end of the cutting tools 134, and a rear wall 146b which supports the opposite end of the cutting tools 134. The front and rear walls 146a, 146b extend between a pair of side walls 146c whose bottom ends include bearings 147 which are slidably disposed on the carriage beam 142. More particularly, housed within each of the side walls 146c is a hydraulic cylinder 148a having a reciprocating rod 148b extending therefrom toward the conveyor 12. The terminal end of the rod 148b is secured to a column 150 extending upwardly from the end of the carriage beam 142 proximate the adjustable leg 144, such that actuation of the hydraulic cylinder and rod 148a, 148b causes the third frame 146 to reciprocate along the length of the carriage beam 142 through a predescribed range of motion, as described in more detail hereinafter.

Referring now to FIGS. 11–15C, each cutting tool 134 includes a housing 152 for receiving the various operating elements, generally designated 152a, of the cutting tool 134 which control the movement of the drill 136 and cutting blade 138. A control block 154 is mounted to the front face of the housing 152 for supporting the drill 136 and cutting blade 138, as described in more detail hereinafter.

Figure 12:
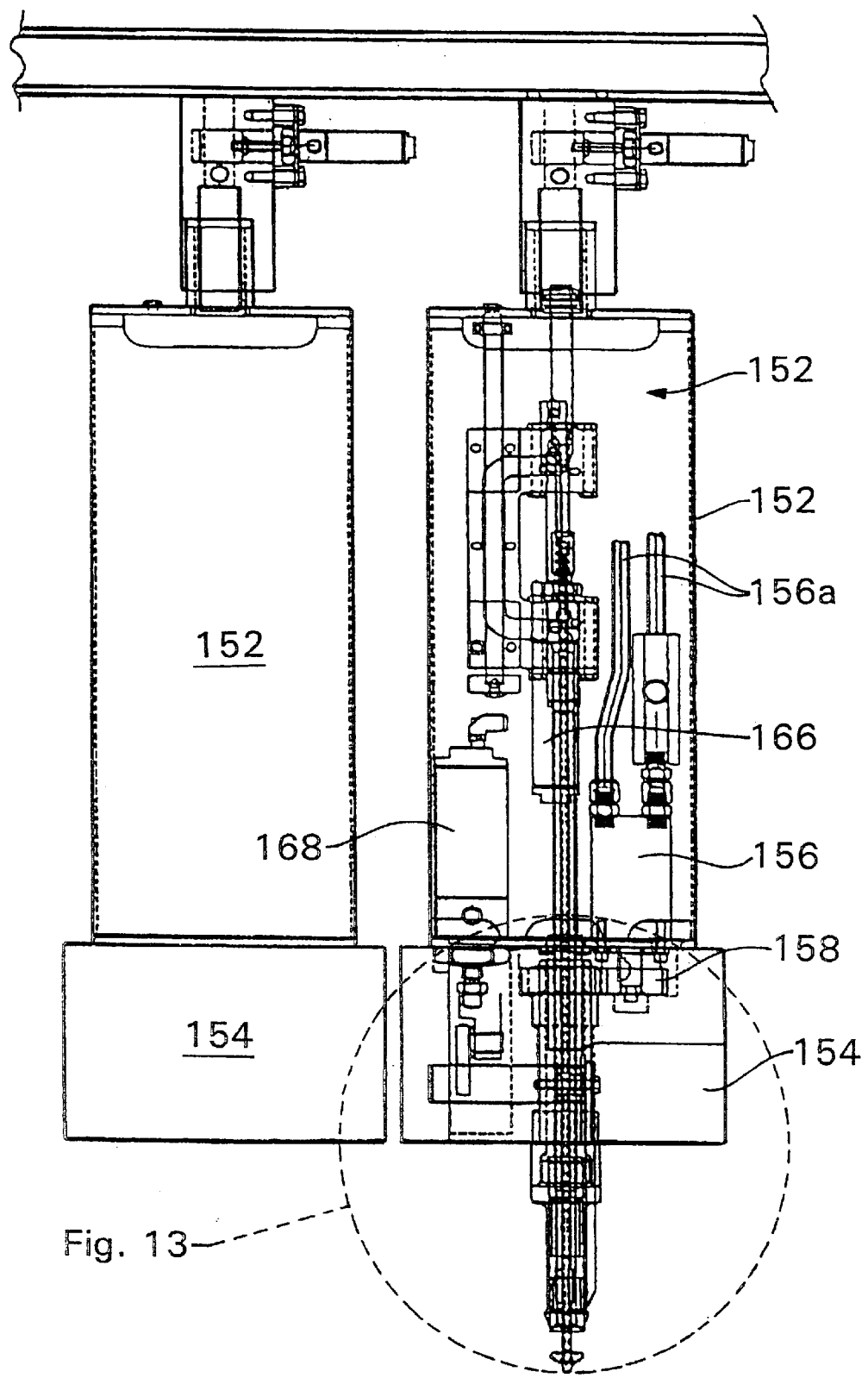
FIG. 12 is an enlarged top plan view of a portion of FIG. 11, partially broken away.

The generally cylindrical tool 136 is rotatably mounted on the control block 154. A hydraulically driven motor 156 is mounted within the housing 152. Conduits 156a lead to and from the motor 156 for providing the drive and exhaust liquid to the hydraulic motor 156. As shown in FIG. 12, the hydraulic motor 156 is offset from the longitudinal axis of the drill 136. As such, a gear train 158 is provided for translating the rotary motion of the hydraulic motor 156 to the drill 136. The gear train 158 is spaced longitudinally from the drill 136 and, therefore, a generally cylindrical linkage 160 extends between the gear train 158 and the drill 136. The linkage 160 translates rotary motion to rotary motion through the use of splines on the terminal ends thereof (not shown).

Figure 13:
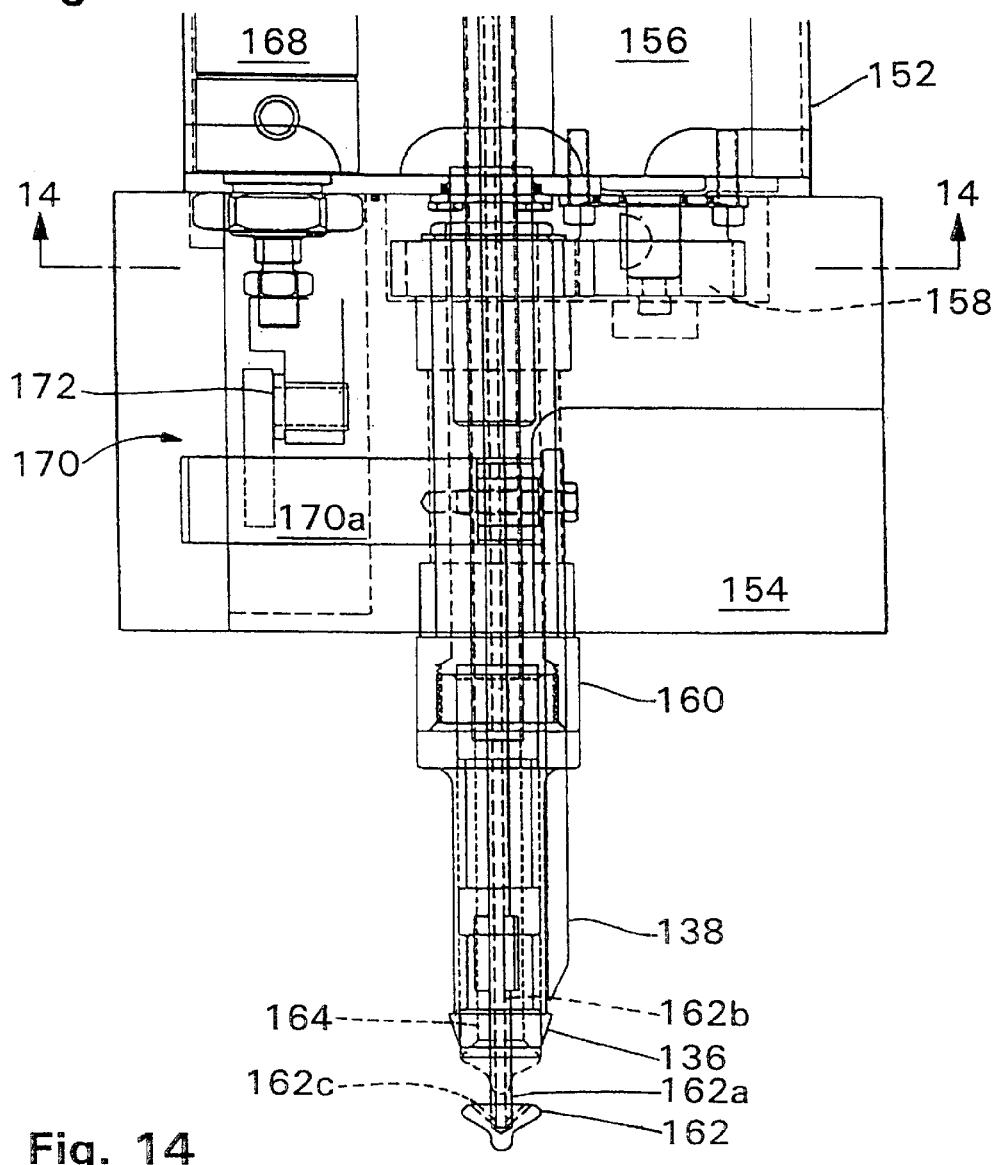
FIG. 13 is a greatly enlarged fragmentary view of a portion of FIG. 12.
Figure 14:
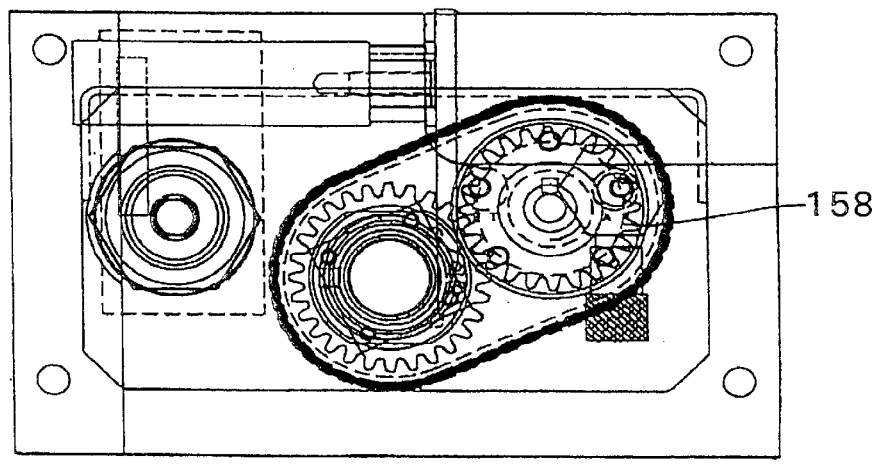
FIG. 14 is a cross-sectional view of a portion of FIG. 13, taken along line 14—14 of FIG. 13.

Referring now to FIG. 13, reciprocally mounted within the cylindrical drill 136 is a probe 162 for being positioned just within the anus of the poultry 112. The probe 162 is reciprocally movable between a closed position, where it is in facing engagement with the cylindrical drill 136 (as shown in phantom in FIG. 13), and an extended position (as shown in solid lines in FIG. 13), where it is positioned just within the anus of the poultry 112. An extension rod 162a extends from the probe 162 into the drill 136 and includes a centrally disposed bore 162b therein, which is in fluid communication with a series of ports 162c which extend toward the rear face of the probe 162. A generally cylindrical complementary polymeric sleeve 164 is disposed within the drill 136, and has a chamfered end for complementarily receiving the probe 162 in generally sealed relation. The internal area of the sleeve 164 and the bore 162b of the probe 162 both communicate with a vacuum source and a source of compressed air, respectively, (not shown), for purposes described hereinafter. The reciprocal motion of the probe 162 is controlled by a third pneumatic cylinder 166 located within the housing 152.

Referring now to FIGS. 15A–15D, there is shown the drill 136 and cutting blade 138 which form an apparatus for cutting and opening the vent of the slaughtered poultry 112. The circumferential drill 136 has a circumferential surface 136a. As described in more detail hereinafter, the drill 136 is rotated in a first direction, indicated by the arrow 136b, for cutting the tissue around the ring muscle 112b of the slaughtered poultry 112. The cutting blade 138 has a cutting edge 138c for cutting an opening in the abdomen adjacent the ring muscle 112b of the poultry 112. That is, the cutting blade 138 makes a cut from the side of the vent hole formed by the drill 136 upwardly to the keel. The cutting edge 138c is disposed adjacent the circumferential surface 136a of the drill 136 such that, as the drill 136 rotates in the first direction 136b, the circumferential surface 136a of the drill 136 rotates away from the cutting edge 138c. This prevents tissue from the slaughtered poultry 112 from becoming pinched between the drill 136 and the cutting blade 138. Since the primary tissue surrounding the ring muscle 112c of the poultry 112 is the intestines and entrails, arranging the drill 136 and cutting blade 138 in this manner minimizes the chances of piercing the intestines or entrails, and exposing the poultry 112 to fecal matter.

As shown in FIG. 15D, the cutting blade 138 has a leading disk shaped tip 143 having first and second sides 143a, 143b. The first side 143a extends at an angle with respect to the second side 143b such that the disk shaped tip 143 is generally V-shaped in cross section. This configuration of the tip 143 promotes inserting the blade 138 into the opening formed by the drill 136.

Referring now to FIGS. 12, 13 and 15C, the housing 152 includes a fourth pneumatic cylinder 168 positioned opposite from the hydraulic motor 156 on the other side of the extension rod 162a of the probe 162. The fourth pneumatic cylinder 168 controls the position of the cutting blade 138 through a linkage mechanism 170, which translates the linear motion of the fourth pneumatic cylinder 168 to the pivotal motion of the cutting blade 138. As shown in FIG. 13, the linkage mechanism 170 is comprised of a first rod 170a which extends from the pivoting end of the cutting blade 138 across the drill 136 toward the fourth pneumatic cylinder 168. A pair of pivotably connected links 172 are secured to the first rod 170a such that translation of the fourth pneumatic cylinder 168 causes the first rod 170a to pivot downwardly in the direction of the arrow 141, thereby causing the cutting blade 138 to pivot upwardly in the direction of the arrow 139 with respect to the drill 136.

Referring now to FIGS. 10A through 10J, the following is a description of the venting and opening station 110 in operation. A train of cars 30 is indexed by the conveyor 12 into the venting and opening station 110 with the back 112c of the poultry 112 in a generally horizontal position. At this time, the bank of cutting tools 134 is at the one-inch position, as shown in FIG. 10A. Upon a proximity sensor's (not shown) sensing that the train of cars 30 is in position, a signal is transmitted to a microprocessor which controls the various functions of the venting and opening station, namely controlling the solenoid operated valves (not shown) which control the delivery of compressed air and hydraulic fluid to the various hydraulic motors, pneumatic cylinders, and hydraulic cylinders described above, in a manner well understood by those of ordinary skill in the art. The precise programming of the microprocessor to achieve the control of the venting and opening station 110, and other stations described below, is not disclosed herein, as given the function of the venting and opening station 110, one of ordinary skill in the art could readily program the microprocessor to carry out the intended function.

With the positioning arm 114 in the stowed position, and the bank of cutting tools 134 in the one-inch position, the process of venting the slaughtered poultry 112 is ready to begin. First, the hydraulic cylinder 148a is actuated to move the bank of cutting tools 134 to the thirteen-inch position, while the hydraulic cylinder 122 is actuated to move the ten positioning arms 114 upwardly to the cutting position, as shown in FIG. 10B. Once the positioning arms 114 are in the cutting position, the pelvis clamping bars 128 and the hip bars 130 are pivoted to the clamping position to secure the poultry 112 against the support plate 124. Depending upon the thickness of the back 112c of the poultry 112, the support plate 124 will move slightly downward against the spring force of the first pneumatic cylinder 126 to properly position the ring muscle 112b with respect to the pelvis clamping bars 128.

Once the poultry 112 is clamped in position by the hip bars 130 and pelvis clamping bars 128, the bank of cutting tools 134 is further moved toward the poultry 112 by the hydraulic cylinder 148a to the seventeen-inch position, causing the insertion of the probe 162 into the anus of the poultry 112. As shown in FIG. 10D, the probe 162 is in its extended position at this time. As shown in FIG. 10E, the probe 162 is then pulled slightly backward to clamp the ring muscle 112b of the poultry 112 between the rear surface of the probe 162 and the front surface of the sleeve 164 located within the drill 136. As shown in FIG. 10F, the drill 136 is then actuated by the hydraulic motor 156 while the probe 162 and sleeve 164 are pulled back through the drill 136, cutting a circular opening in the ring muscle 112b of the poultry 112. By bringing the ring muscle 112b tissue to the drill 136, the chances of the drill 136 piercing the entrails of the poultry 112 and exposing fecal matter are significantly reduced. After the probe 162 and the sleeve 164 retreat approximately three inches into the drill 136, and the drill 136 is rotated, the cutting or venting process is complete and the anus and ring muscle 112b are removed from the pelvis area of the poultry 112 leaving a generally circular opening therein. As shown in FIG. 10G, the probe 162 and sleeve 164 then return to the position adjacent the opening formed by the drill 136.

Referring now to FIG. 10H, the bank of cutting tools 134 is then moved forward two inches to the nineteen-inch position by the hydraulic cylinder 148a such that the cutting blade 138 with the cutting edge 138c is positioned just within the opening formed by the drill 136 along one side thereof. The fourth pneumatic cylinder 168 is then actuated to rotate the cutting blade 138 upwardly toward the keel (not shown) of the poultry 112 approximately sixty degrees to cause a cut to be made into the abdomen of the poultry 112, thereby completing the opening process. The bank of cutting tools 134 is then moved backward along the carriage beam 142 by the hydraulic cylinder 148 to the original one-inch position, while maintaining the grip on the ring muscle 112b. Once the bank of cutting tools 134 reaches the one-inch position, the probe 162 is then extended outwardly to release ring muscle 112b and the entrails 112i attached thereto, which then hang vertically from the poultry 112, outside of the carcass. When the probe 162 is extended outwardly from the sleeve 164 to release the ring muscle 112c, compressed air is applied through the bore 162b and the ports 162c to push the ring muscle 112c away from the probe 162, thereby releasing the same. At this point, the venting and opening station 110 has completed its operation, and the train of cars 30 is then indexed toward the eviscerating station 210, to make room for the next train of cars 30 to be received.

As is apparent from the foregoing description, the poultry processor 10 physically processes the poultry 112 while the poultry 112 is positioned with its back 112c at a generally horizontal plane, to permit the various organs of the poultry 112 to be readily removed therefrom. Similarly, if an accident occurs, wherein one of the organs is unintentionally pierced, the matter flowing from the pierced organ would flow away from the poultry 112, as opposed to flowing into the poultry 112 in accordance with conventional methods. As is apparent from the foregoing description, the venting and opening process, which comprises cutting a circular opening at the vent of the poultry 112 and starting a second cut in the poultry 112 at the circular opening and extending generally toward the keel with the cutting blade 113, are all carried out with the poultry 112 stationary and in a generally horizontal plane. While in the present embodiment it is preferred that the poultry 112 be positioned in a generally horizontal plane, it is understood by those of ordinary skill in the art that the principles of the present invention can be carried out with the back 112c of the poultry 112 extending at an angle in the range of zero degrees to forty degrees with respect to a generally horizontal plane, without departing from the spirit and scope of the invention. Similarly, the present invention is not limited to physically processing the poultry 112 in any manner when it is held in this position, as the evisceration process and cleaning processes, described hereinafter, are carried out with the poultry 112 in this position as well.

Referring now to FIGS. 16 through 22A, there is shown the poultry eviscerating and cropping apparatus or eviscerating and cropping station 210 for removing viscera from the body cavity 112d of the poultry 112 through the pre-cut opening at the poultry vent formed by the venting and opening station 110, as described above. The body cavity 112d includes an internal breast wall 112e and an opposed internal back wall 112f, as is well understood by those of ordinary skill in the art. The eviscerating station 210 is positioned downstream from the venting and opening station 110, as best shown in FIG. 2. Between the venting and opening station 110 and the eviscerating station 210, the second track 64 bends outwardly from the first track 14 to lift the shoulder-supporting members 66 upward slightly, so that the back 112c of the poultry 112 moves from a generally horizontal position to a position where the back extends downwardly to a position in the range of twenty-two degrees to twenty-eight degrees from a horizontal plane, and preferably, approximately twenty-five degrees from a horizontal plane. This provides the optimum position for eviscerating the poultry 112 so that, in the event of an unlikely accident, and an organ is damaged, the resulting accident exits the body cavity 112d due to the force of gravity.

As mentioned above, the conveyor 12 transports the poultry 112 along a predetermined path, i.e., namely, along the first and second tracks 14, 64, with the poultry 112 positioned on the conveyor 12 in a first predetermined position, wherein the poultry's back 112c is in a generally horizontal position at about twenty-five degrees below a horizontal plane. The conveyor 12 moves a train of cars 30 into the eviscerating station 210 in an indexed manner, such that the train of cars 30 is in a generally stationary position within the eviscerating station 210. A proximity switch (not shown) senses the location of the train of cars 30 within the eviscerating station 210, which signals to a microprocessor to begin the evisceration process, described in more detail hereinafter.

Referring now to FIGS. 18A–18G, the eviscerating station 210 includes a locating arm 214 having a first end 214a movable between a stowed position (shown in FIG. 18A) spaced from the conveyed poultry 112, and an eviscerating position (shown in FIGS. 18B–18G), wherein the poultry 112 is clamped in position on the first end 214a. Like the positioning arm 114 of the venting and opening station 110, there are ten locating arms 214, each for positioning one of the ten poultry on the train of cars 30 in position for the evisceration process. The locating arm 214 is similar to the positioning arm 114 of the venting and opening station 110, except for the first end 214a as described below. Accordingly, for purposes of convenience and brevity only, instead of repeating the description of the operation and structure of the locating arm 214, the element numerals used in connection with the venting and opening station 110 which are applicable to the positioning arm 114 have been used in connection with the locating arm 214, except that they have been modified to use the two hundred series prefix, instead of the one hundred series prefix.

Figure 18A:
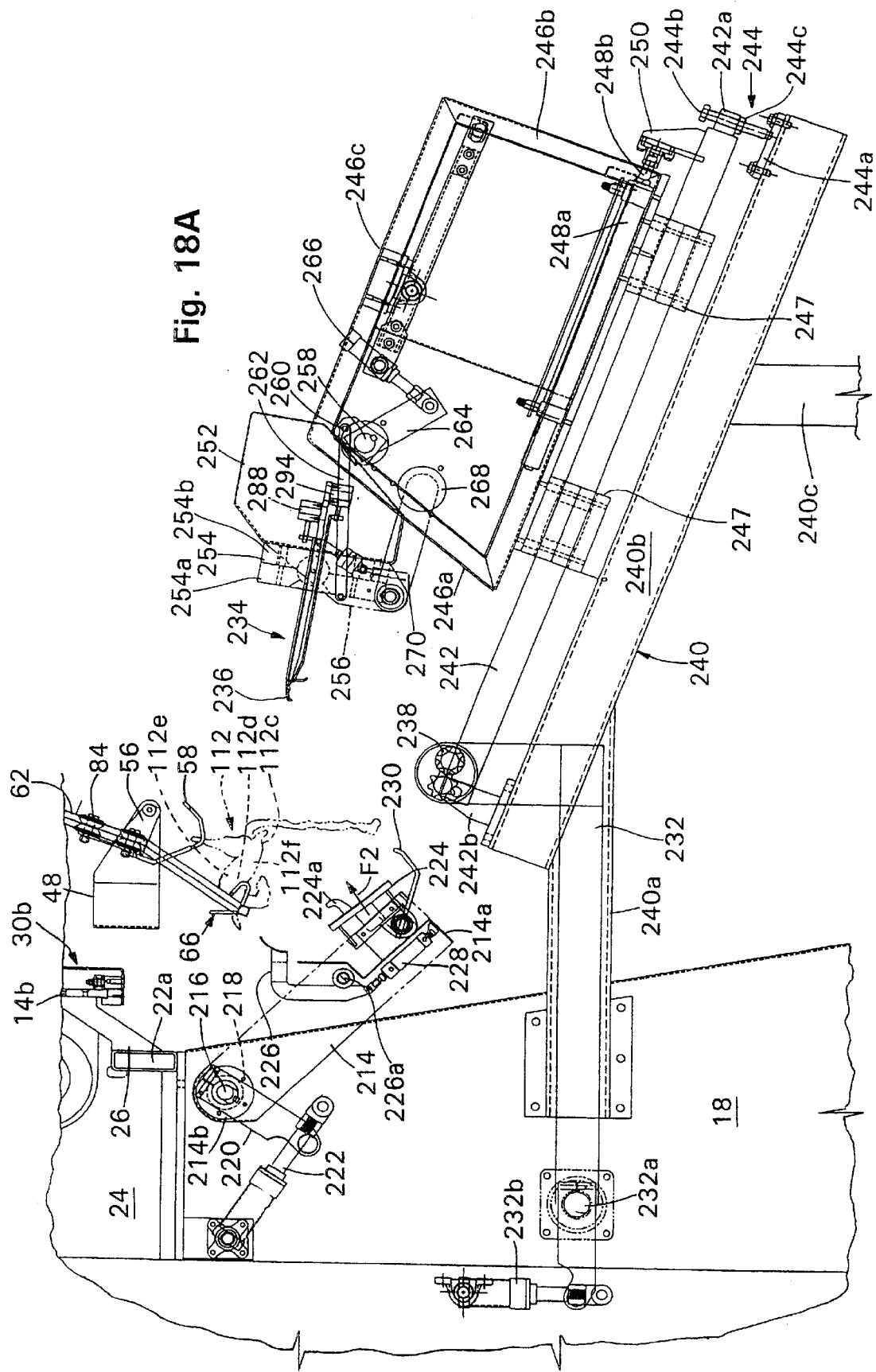

A support plate 224 is movably mounted on the first end 214a of the locating arm 214 to move between a fully extended position, when the locating arm 214 is in the stowed position (as shown in FIG. 18A), and a compressed position, when the locating arm 214 is in the cutting position (as shown in FIGS. 18A–18G). The support plate 224 is biased to the extended position by a first force represented by the arrow "F2". The first force F2 is provided by compression springs (not shown) extending between the support plate 224 and the first end 214a of the locating arm 214. The support plate 224 is slidably mounted on the first end 214a of the locating arm 214. The support plate 224 includes two upwardly extending, spaced apart flanges (only one is shown) 224a for receiving the poultry 112 therebetween, and to assist with properly positioning the poultry 112 on the support plate 224 for the evisceration process. As best shown in FIG. 18A, the flanges 224a are generally L-shaped.

Figure 18C:
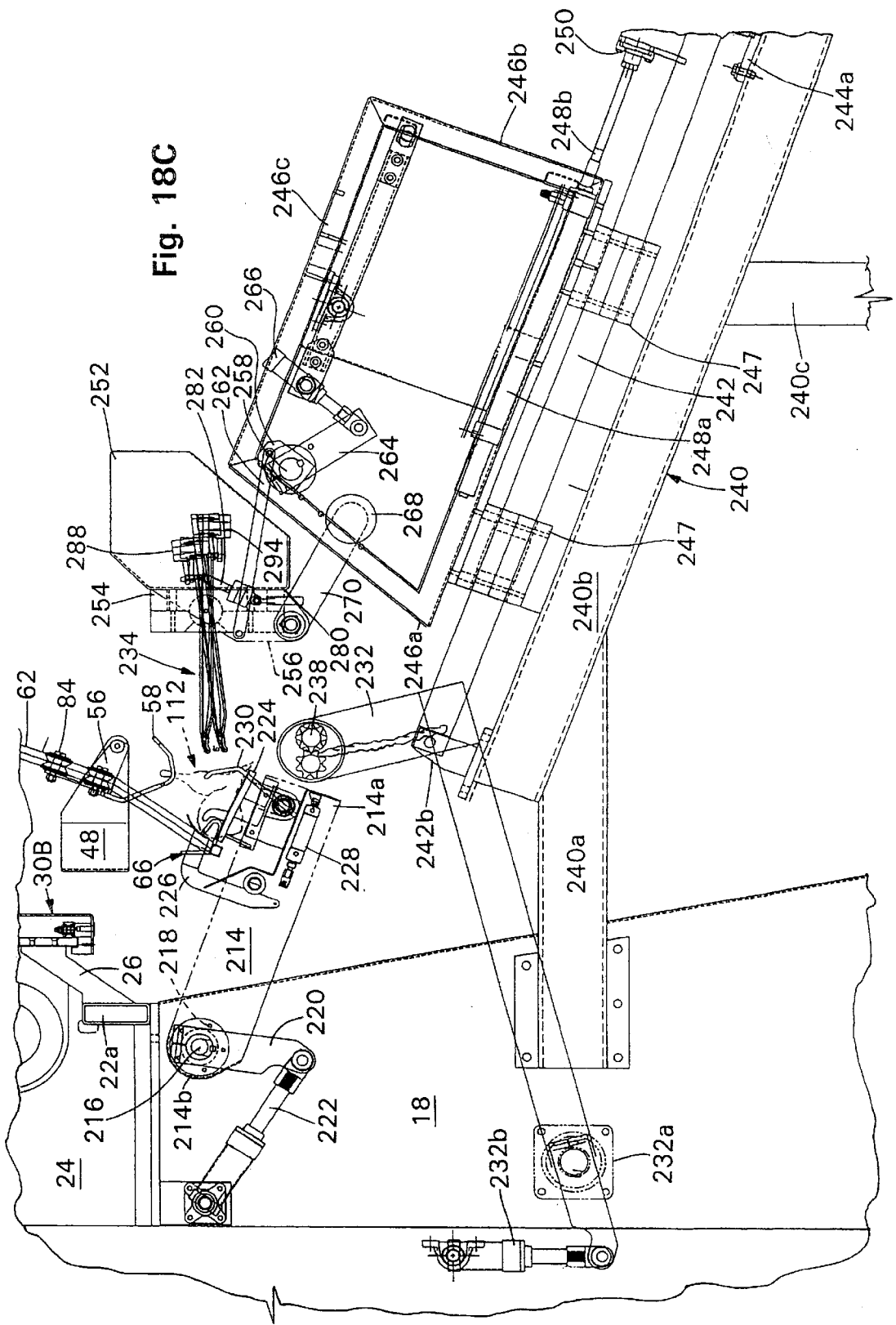

Referring now to FIGS. 18A–18C, the first end 214a of the locating arm 214 includes a movably mounted breast positioning bar 226 movable between an open position (shown in FIGS. 18A and 18B), when the locating arm 214 is in the stowed position, and a clamping position (shown in FIGS. 18C–18G), when the locating arm 214 is in the cutting position. The locating arm 214 is located with respect to the conveyor 12 such that, as the first end 214a moves from the stowed position to the cutting position, the support plate 224 engages the back 112c of the poultry 112, and maintains the back 112c in a position in the range of zero degrees to forty degrees downwardly from a horizontal plane. More particularly, it is preferred that, when the first end 214a of the locating arm 214 moves to the cutting position, the support plate 224 engages the back 112c of the poultry 112, and maintains the back 112c in a position of the range of twenty-two degrees to twenty-eight degrees downwardly from the horizontal plane and most preferably about twenty-five degrees downwardly for the horizontal plane. However, it is understood by those of ordinary skill in the art that the present invention is not limited to any particular range of maintaining the back 112c of the poultry 112 downwardly from the horizontal plane so long as gravity aids in removing organs from the body cavity 112d during the evisceration process, as described in more detail hereinafter.

As shown in FIGS. 18A and 18C, the breast positioning bar 226 is moved to the clamping position to bias the poultry 112 toward the support plate 224 with a second force to hold the poultry 112 against the support plate 224 in position for eviscerating when the locating arm 214 is in the cutting position. More particularly, both the first force and the second force are in the form of spring forces. In the case of the second force, a fifth pneumatic cylinder 228 extends between the first end 214a of the locating arm 214 and one end of the breast positioning bar 226. The breast positioning bar 226 is pivotally mounted to the locating arm 214 by a pintle mechanism 226a located proximate the fifth pneumatic cylinder 228. The fifth pneumatic cylinder 228 acts as a spring when it is moved to the clamping position to maintain the poultry 112 against the support plate 224.

While in the present embodiment, it is preferred that the first and second forces be spring forces applied by compression springs and pneumatic cylinders, respectively, it is understood by those of ordinary skill in the art that other mechanisms could be used to apply the spring forces, including leaf springs (not shown), without departing from the spirit and scope of the invention.

As shown in FIGS. 18A- 18C, a pair of pelvis positioning arms 230 (only one is shown) is movably mounted on the first end 214a of the locating arm 214 between an open position (shown in FIGS. 18A and 18B), when the locating arm 214 is in the stowed position, and a clamping position (shown in FIGS. 18C-G), when the locating arm 214 is in the eviscerating position, which holds the poultry 112 against the support plate 224. The pelvis positioning arms 230 are also biased to the clamping position by a pneumatic cylinder (not shown) mounted on the first end 214a of the locating arm 214.

Figure 16:
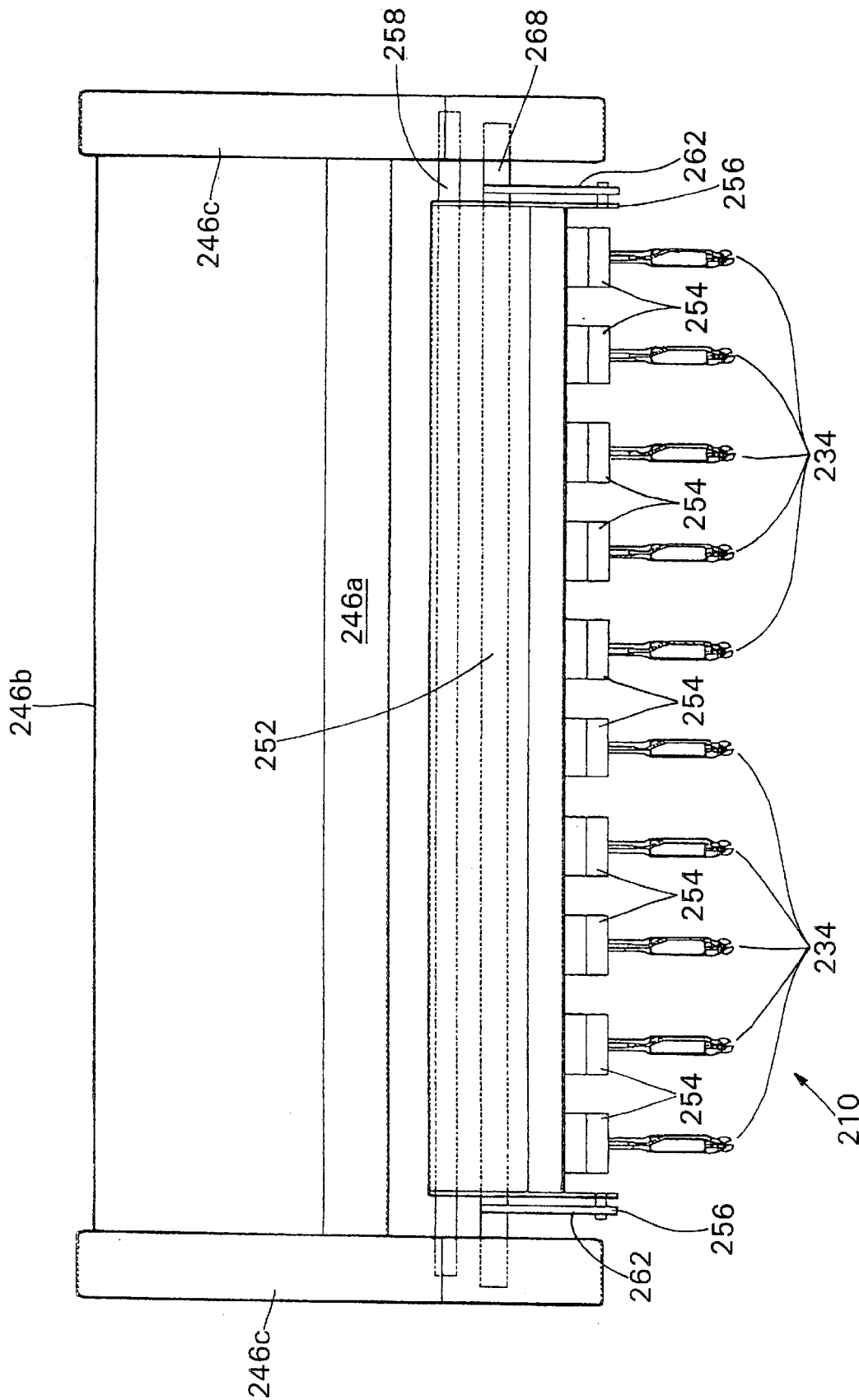
FIG. 16 is a top plan view of an evisceration station in accordance with the present invention.

Referring now to FIGS. 16 through 18C, the eviscerating station 210 includes an eviscerating tool 234 having a working portion 236 insertable into the body cavity 112d of the poultry 112 through the access opening formed by the venting and opening station 110 along a predetermined path. As best shown in FIG. 16, in the preferred embodiment there are ten eviscerating tools 234 which form a bank of eviscerating tools 234, much like the bank of cutting tools 134 in the venting and opening station 110. The bank of eviscerating tools 234 are mounted to move in unison with respect to the conveyor 12 and the locating arm 214, to simultaneously eviscerate ten poultry at once.

The bank of eviscerating tools 134 is mounted on a fourth frame 240, which is generally identical to the second frame 140, and includes a pair of first struts 240a, second struts 240b, and third struts 240c, except that the second pair of struts 240b extend at an angle downwardly from a horizontal plane at approximately thirty degrees. Similarly, the eviscerating station 210 includes a carriage beam 242 mounted above each second strut 240b by a post 242b at the one end closest to the tower 18, and an adjustable leg 244, having a base plate 244a, threaded bolt 244b, and nut 244c, for receiving a collar 242a extending from the carriage beam 242. Again, the fourth frame 240, carriage beam 242 and adjustable leg 244 are generally identical to the similar elements discussed above in connection with the venting and opening station 110, having similar element numerals and, therefore, further description thereof is omitted for purposes of convenience and brevity only, and is not limiting.

Prior to the evisceration process beginning, a portion of the intestines of the entrails 112i, hanging downwardly from the poultry 112 after the venting and opening process, are removed. Generally speaking, this is accomplished in a conventional manner by a pair of rotating longitudinal gears 238 which are moved into engagement with the distal end of the entrails 112i hanging from the poultry 112. The longitudinal gears 238 are rotated in opposite directions to pinch the entrails 112i therebetween, and force them downwardly between the longitudinal gears 238, in a manner well understood by those of ordinary skill in the art. To move the longitudinal gears 238 into position to remove the entrails 112i, a bank of the longitudinal gears 238 (i.e., ten, but only one is shown) are mounted on a pair of L-shaped pivot arms 232 pivotally mounted to the two towers 18 located proximate the eviscerating station 210. The L-shaped pivot arms 232 are pivotally mounted to the towers 18 by a standard pintle-type mechanism 232a. A hydraulic cylinder 232b is mounted to the tower 18 to move the L-shaped pivot arm 232 upwardly and downwardly, as needed, in a manner well understood by those skilled in the art.

Referring now to FIGS. 16 through 18G, the bank of eviscerating tools 234 are mounted on a fifth frame 246 having front and rear walls 246a, 246b, respectively. A pair of side walls 246c extends between the front and rear walls 246a, 246b. A hydraulic cylinder 248a, and rod 248b, are mounted within the side walls 246c of the fifth frame 246, and engage a column 250, extending upwardly from the carriage beam 242 proximate the adjustable leg 244, to reciprocate the fifth frame 246 along the carriage beam 242. The carriage beam 242 is reciprocally supported by a pair of bearings 247 extending from the side walls 246, which slidably receive the carriage beam 242 therethrough. The operation of the hydraulic cylinder 248a of the eviscerating station 210 is generally identical to the operation of the hydraulic cylinder 148a used in connection with the venting and opening station 110, accordingly, further description thereof is omitted for purposes of convenience and brevity only, and is not limiting.

Figure 17:
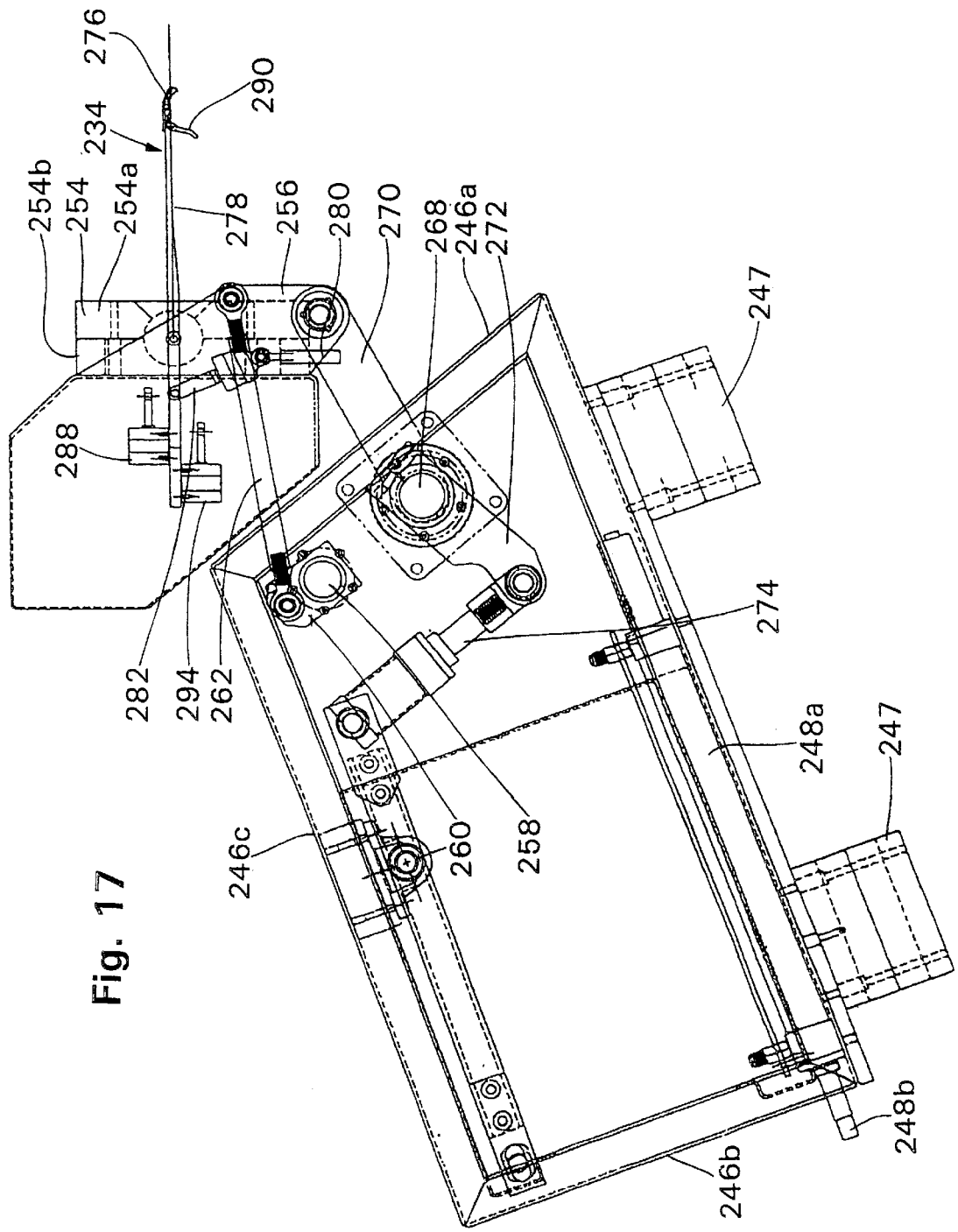
FIG. 17 is an enlarged left-side elevational view of the evisceration station shown in FIG. 16.

Referring now to FIGS. 16, 17 and 18A, the eviscerating station includes a housing 252 extending across the width of the fifth frame 246. The housing 252 is movable with respect to the fifth frame 246, as described in detail hereinafter. Each of the eviscerating tools 234 is mounted to the housing 252 via a control block 254. The control block 254 and the housing 252 house the necessary elements to control the movement of the eviscerating tool 234 with respect to the housing 252, as described in more detail hereinafter.

As best shown in FIGS. 17 and 18A, the housing 252 is generally in the form of a pentagon in cross section. A linkage plate 256 extends from the ends of the housing 252 towards the conveyor 12. A first or upper control bar 258 extends between the pair of side walls 246c of the fifth frame 246 behind the housing 252. Each end of the first control bar 258 has a pivot arm 260 rotatably secured thereto, and extending therefrom. A linking arm 262 extends between the terminal end of each pivot arm 260 and the corresponding linkage plate 256. The linkage arm 262 is rotatably secured to the terminal end of the pivot arm 260 and the linking plate 256. A second pivot arm 264 extends from the first control bar 258 along the side wall 246c on the downstream side of the fifth frame 246. The opposite end of the second pivot arm 264 is rotatably secured to a hydraulic cylinder 266 mounted to the side wall 246c located on the downstream side of the fifth frame 246.

Similarly, a second or lower control bar 268 extends between the side walls 246c of the fifth frame 246 below the first control bar 258, and behind the housing 252. A third pivot arm 270 is rotatably secured to and extends from the ends of the second control bar 268 into pivotable engagement with each linking plate 256 at a location just beneath the location where the linking arm 262 rotatably attaches to the linkage plate 256. A fourth pivot arm extends from the end of the second control bar 268 located at the side wall 246c, located on the upstream side of the fifth frame 246. The fourth pivot arm 272 is rotatably secured to the second control bar 268 at one end, and is pivotally connected to a second hydraulic cylinder 274, located on the side wall 246c on the upstream side of the fifth frame 246. In this manner, by controlling the movement of the first hydraulic cylinder 266, the second hydraulic cylinder 274 and the sixth pneumatic cylinder 280, a range of motion for the eviscerating tool 234 can be prescribed, which will eviscerate and crop the poultry 112, as described in more detail hereinafter.

Figure 18D:
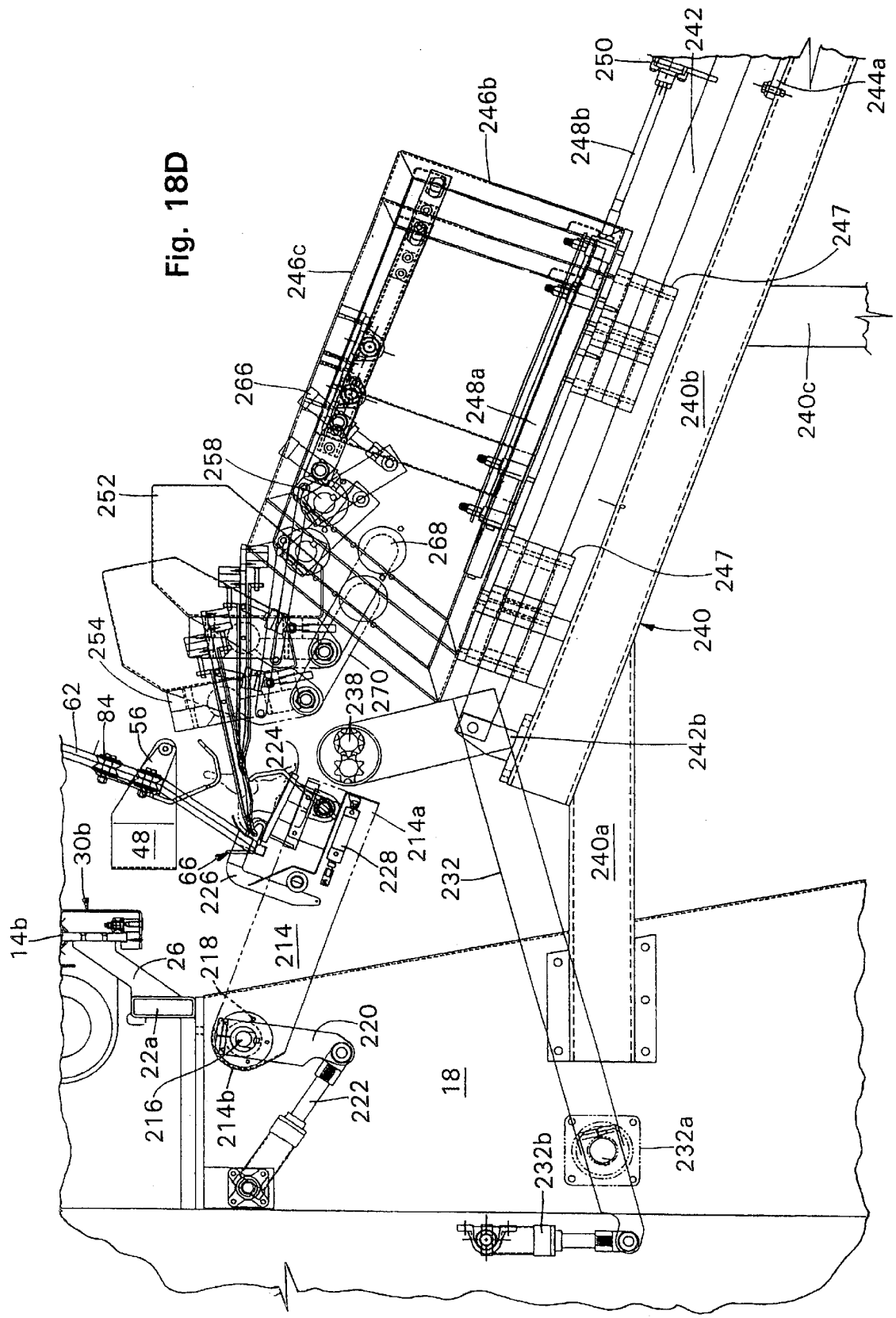
Figure 18F:
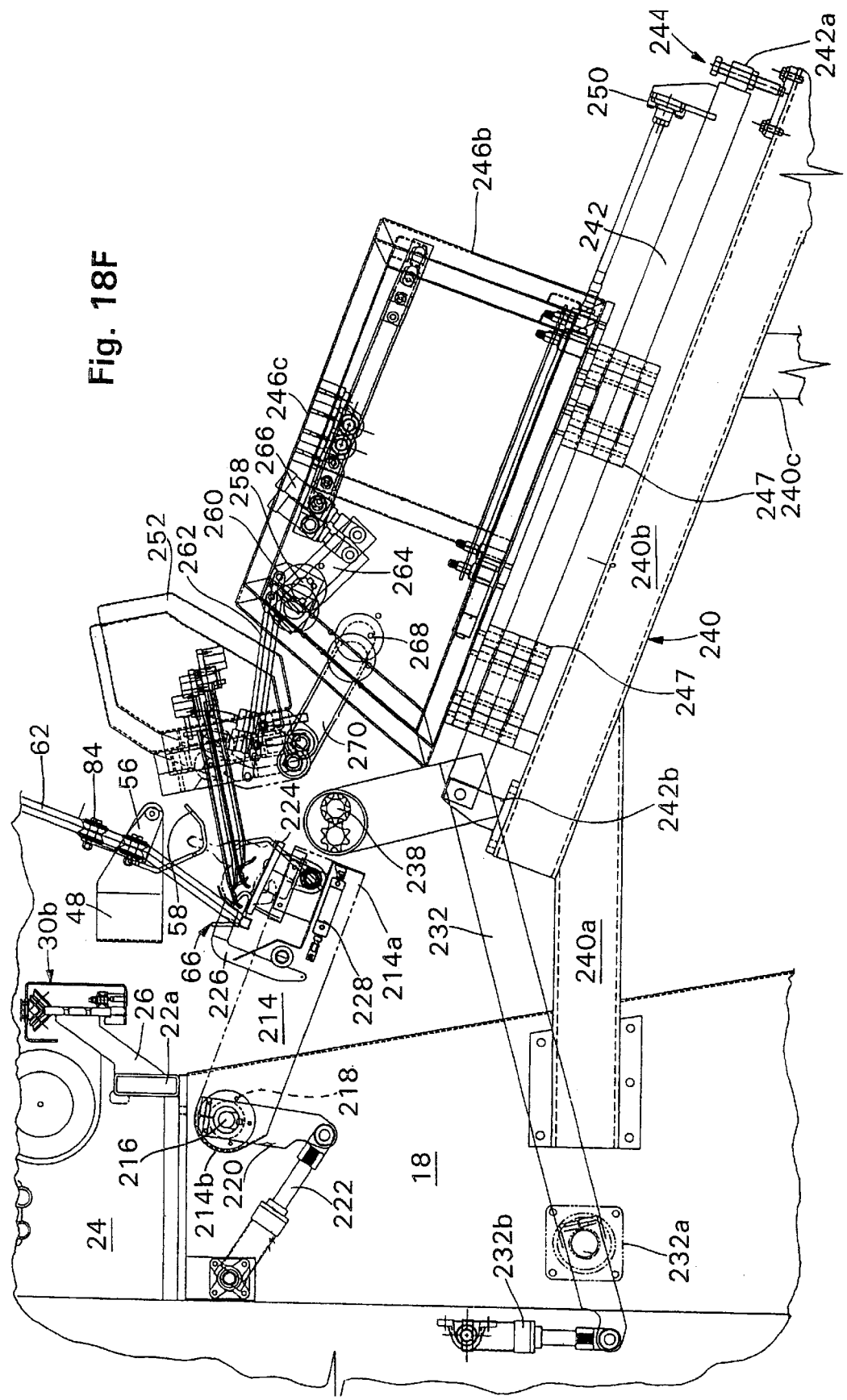
Figure 18G:
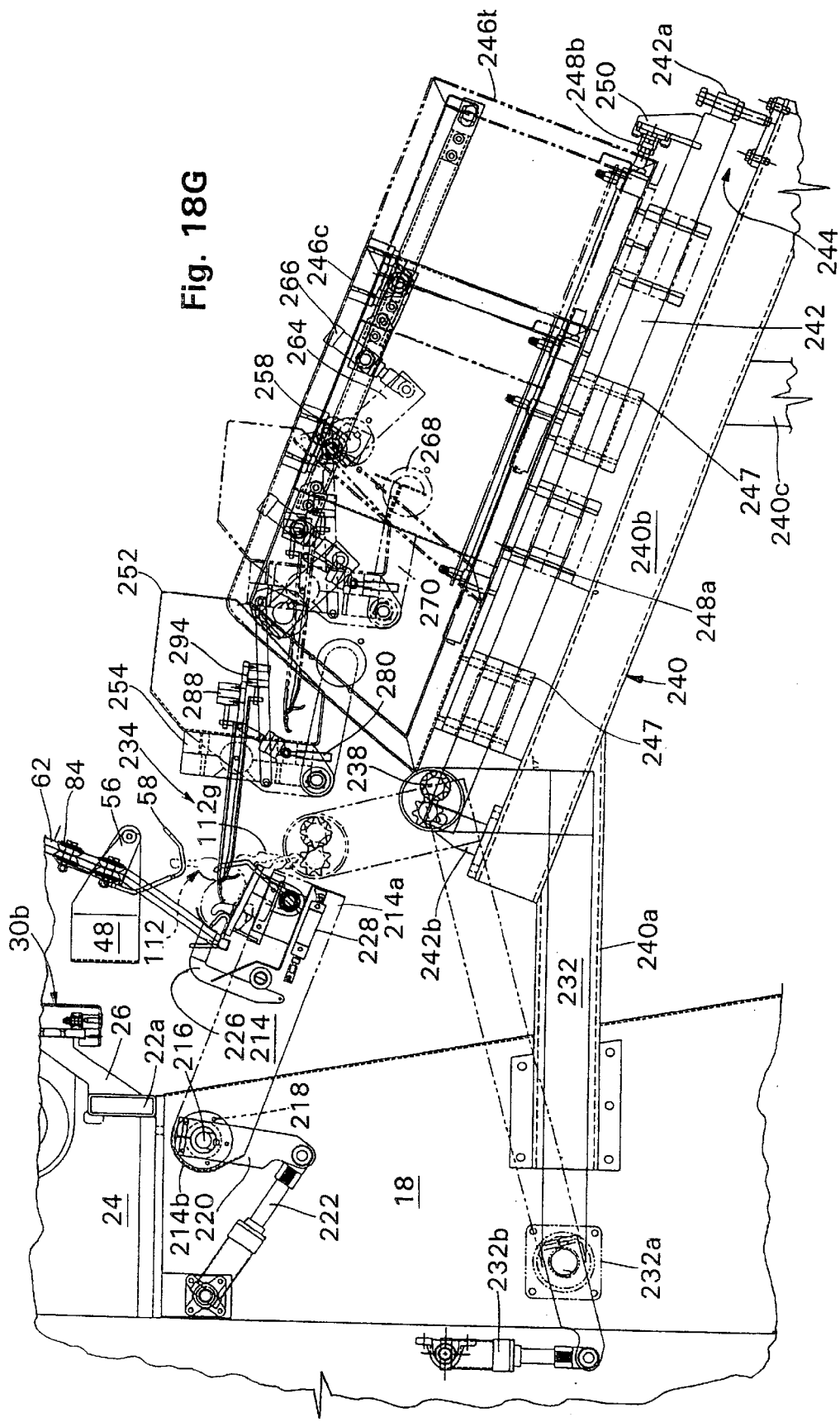

Referring now to FIGS. 17 through 18G, each control block 254 is secured to the face of the housing 252, and is formed in first and second halves, 254a, 254b, which are bolted together, and then bolted to the housing 252. The working portion 236 of the eviscerating tool 234 is comprised of a spoon 276, attached to an elongated carrier 278. The elongated carrier 278 extends through an aperture formed in the control block 254, and is mounted to pivot with respect to the control block 254 via a pin extending through an aperture 278c in the elongated carrier 278, as shown in FIGS. 18C and 22A. A sixth pneumatic cylinder 280 is mounted in the bottom of the second half 254b of the control block 254, and includes a linkage 282 extending therefrom into engagement a second aperture 278d in the elongated carrier 278 within the housing 252. Accordingly, linear movement of the sixth pneumatic cylinder 280 causes the spoon 276 of the evisceration tool 234 to pivot up and down and also assists with maintaining the spoon 276 against the keel bone during the evisceration process, as described in more detail below.

Referring now to FIGS. 19A through 22B, the spoon 276 has an arcuate front edge 276a, and is formed as a scissors or jaw mechanism 284. That is, the spoon 276 is divided into a first part 276b, and a second part 276c which is pivotally secured to the first part 276b by a standard hinge mechanism, as best shown in FIGS. 19A and 19B. An elongate actuating rod 286 extends from the second part 276c of the spoon 276 along the elongated carrier 278. The elongated carrier 278 has an opening 278a therein, adjacent the spoon 276. The opening 278a is sized to permit the removed internal organs or viscera package to pass therethrough during the evisceration process. In this manner, as the spoon 276 and elongated carrier 278 pass through the body cavity 112d of the poultry 112, the viscera package can be displaced into the opening 278a without being crushed or damaged by the elongated carrier 278. The actuating rod 286 is conformed to extend around the opening 278a to avoid impacting the viscera package during the eviscerating process as well. Further, the actuating rod 286 extends through the control block 254 into engagement with a seventh pneumatic cylinder 288 located within the housing 252. The seventh pneumatic cylinder 288 controls the movement of the actuating rod 286 to control the jaw mechanism 284.

Pivotally mounted on the underside of the elongated carrier 278 proximate the spoon 276 is a rake 290. The rake 290 can be swung from the spoon 276, or working portion 236 of the eviscerating tool 234, away from the spoon 276 downwardly. A second actuating rod 292 controls the movement of the rake 290. The second actuating rod 292 extends along the underside of elongated carrier 278 around the opening 278a, through the control block 254 into engagement with an eighth pneumatic cylinder 294 located within the housing 252. Movement of the eighth cylinder 294 causes the second actuating rod to reciprocate, causing the rake 290 to swing toward and away from the spoon 276.

Referring now to FIGS. 18A through 18G, as mentioned above, the working portion 236, or spoon 276, of the eviscerating tool 234 is inserted into the body cavity 112d of the poultry through the access opening formed by the venting and opening station 110 along a predetermined path. A portion of the predetermined path includes moving the spoon 276 of the eviscerating tool 134 along the breast wall 112e of the cavity 112d with a third force (applied by the first and second hydraulic cylinders 266, 274 and the sixth pneumatic cylinder 280 through the various mechanical elements) which is greater than the second force (applied by the fifth pneumatic cylinder 228 associated with the breast positioning bar 226), such that the breast wall 112e of the poultry 112 can move with respect to the first end 214a while being maintained against the spoon 276 of the eviscerating tool 234 without the spoon 276 damaging the breast wall 112e. That is, since the breast positioning bar 226 is held against the breast wall 112e by the fifth pneumatic cylinder 228, it acts as a spring being pushed against the breast wall 112e. The constant force applied by the first and second hydraulic cylinders 266, 274 and the sixth pneumatic cylinder 280, to the spoon 276 of the evisceration tool 234 through the various elements associated with the housing 252, is countered by the spring force applied by the fifth pneumatic cylinder 228 such that the breast wall 112e essentially floats with respect to the first end 214a in a precise path which allows the spoon 276 to follow closely along the internal breast wall 112e of the poultry 112. By using the spring force applied by the fifth pneumatic cylinder 228, the constant path of the spoon 276 with respect to the support surface 20 is compensated for to the extent different sized poultry 112 are processed by the poultry processor 10, this also assists with preventing damage to the liver and gall bladder of the poultry.

Similarly, another portion of the predetermined path of movement of the eviscerating tool 234 includes moving the spoon 276 of the eviscerating tool 234 along the back wall 112f of the body cavity 112d with a fourth force which is greater than the first force F2, such that the back wall 112f of the poultry 112 and the support plate 224 can move with respect to the first end 214a of the locating arm 214 while the back wall 112f is maintained against the spoon 276 of the eviscerating tool 234 without the spoon 276 damaging the back wall 112f of the body cavity 112d. Again, because the support plate 224 is held in position by a pneumatic cylinder, its spring force compensates for differently sized poultry to follow the precise path of the spoon 276 of the evisceration tool 234. To further supplement the positioning of the poultry 112 on the support plate 224, the pelvis positioning arms 230 are biased toward the clamping position with a fifth force which is less than the fourth force applied by the spoon 276 of the evisceration tool 234 as it moves along the back wall 112f of the body cavity 112d, for the same reasons as discussed above.

Referring now to FIGS. 18A through 18G, the following is a description of the method of removing the viscera package from the body cavity 112d of the poultry 112 through the precut opening at the poultry vent formed by the venting and opening station 110. As is well understood by those of ordinary skill in the art, the body cavity 112d includes a heart, lungs and trachea along the internal back wall 112f. After the train of cars 30 is indexed into position in the eviscerating station 210, a proximity switch (not shown) senses the positioning of the next train of cars 30 to receive the evisceration process and, thus, communicates with a microprocessor to begin the automatic control of the various pneumatic and hydraulic cylinders, described above to carry out the functions described hereinafter. After the train of cars 30 is in position, the hydraulic cylinder 222 is actuated to lift the locating arms 214 from the stowed position upwardly into the cutting position wherein the support plate 224 receives the back 112c of the poultry 112, and maintains it at an angle in the range of zero degrees and forty degrees downwardly from a horizontal plane, and preferably at about twenty-five degrees.

At this time, as shown in FIG. 18B, the fifth pneumatic cylinder 228 is actuated to swing the breast positioning bar 226 into engagement with the breast of the poultry 112 while, at the same time, the pelvis positioning arms 230 are moved to the clamping position such that the poultry 112 is clamped in position on the support plate 224 by the breast positioning bar 226 and the pelvis positioning arms 230 to thereby place the poultry in a first position. At the same time, the hydraulic cylinder 232b secured to the tower 18 is actuated to pivot the L-shaped pivot arm 232 upwardly so that the longitudinal gears 238 grab the entrails 112i hanging from the poultry 112 and pull them downwardly away from the poultry 112, in a manner well understood by those of ordinary skill in the art.

Referring now to FIG. 18C, the hydraulic cylinders 248a in the side walls 246c of the fifth frame 246 are then actuated to move the fifth frame 246 along the carriage beam 242 approximately twelve inches. At the same time, the sixth pneumatic cylinder 280 is actuated to lift the rear portion of the elongated carrier 278 within the housing 252 through the linkage 282 such that the spoon 276 of the evisceration tool 234 dips downwardly approximately six degrees. This allows the spoon 276 of the elongated carrier 278 to become generally centered with the access opening created by the venting and opening station 110.

Referring now to FIG. 18D, the hydraulic cylinders 248 located within the side walls 246 of the fifth frame 246 are then actuated to move the fifth frame 246 an additional seven inches along the carriage beam 242. Simultaneously, the first and second hydraulic cylinders 266, 274 are actuated to cause the housing 252 to pivot up and away from the fifth frame 246 and the sixth pneumatic cylinder 280 to cause the spoon 276 to follow along the internal breast wall 112e of the poultry 112. That is, the eviscerating tool 234 having the spoon 276 is moved into the body cavity 112d of the poultry 112 through the access opening. The spoon 276 of the eviscerating tool 234 is then moved into engagement with the internal breast wall 112e or keel bone of the poultry. The spoon 276 of the eviscerating tool 234 is then moved along the breast wall 112e of the cavity 112d with the third force, which is greater than the second spring force when the poultry 112 is in position on the support plate 224, such that the breast wall 112e of the poultry 112 can move with respect to its initial position while being maintained against the spoon 276 of the eviscerating tool 234 without the spoon 276 damaging the breast wall. This allows the spoon 276 to clear the gall bladder and liver, which are both fragile, and causes the aorta to be severed.

Referring now to FIG. 18E, once the spoon 276 of the eviscerating tool 234 completes its range of motion across the breast wall 112e, the jaw or scissors mechanism 284 is opened by the seventh pneumatic cylinder 288 and, at the same time, the rake 290 is swung downwardly away from the spoon 276 toward the back wall 112f to peel the heart, lungs and trachea (not shown) from the body cavity 112d. The rake 290 is swung downwardly by the eighth pneumatic cylinder 294 through the second actuating rod 292.

Referring now to FIG. 18F, the spoon 276 of the eviscerating tool 234 is then moved along the back wall 112f of the cavity 112d a first distance of approximately one inch with a fourth force generated by the first and second hydraulic cylinders 266, 274, and the sixth pneumatic cylinder 280. The fourth force is greater than the second spring force F when the poultry 112 is in the first position on the support plate 224, such that the back wall 112f of the poultry 112 and support plate 224 can move with respect to the first position and first end 214a while the back wall 112f is maintained against the spoon 276 of the eviscerating tool 234 without the spoon 276 damaging the back wall 112f. The jaw or scissors mechanism 284 is then closed by the seventh pneumatic cylinder 288 and actuating rod 286 to pinch the esophagus (not shown).

Referring now to FIG. 18G, the spoon 276 of the eviscerating tool 234 is then further moved along the back wall 112f of the cavity 112d with the fourth force, which is greater than the first spring force, when the poultry 112 is in the first position such that the back wall 112f of the poultry 112 and support plate 224 can move with respect to the first position while the back wall 112f is maintained against the spoon 276 of the evisceration tool 234 without the spoon 276 damaging the back wall 112f, until the spoon 276 of the evisceration tool 234 exits the body cavity 112d through the access opening. As the spoon 276 exits from the neck cavity, the esophagus continues to slip through the slot 290a until in comes in contact with the proventriculus. This contact/stretching causes the esophagus to move upward seating itself higher in the slot 290a of the rake 290. At this point, the spoon 276 pinches the esophagus. Accordingly, as the spoon 276 leaves the body cavity 112d, the crop (not shown) is removed with the esophagus.

As the spoon 276 exits the access opening, the jaw or scissors mechanism 284 is opened by the seventh pneumatic cylinder 288, and the rake 290 is swung toward the spoon 276 by the eighth pneumatic cylinder 294 such that the heart, lungs, esophagus, crop, and other organs (i.e., the viscera package), generally designated 112g, that were in the body cavity 112d hang downwardly from the poultry 112 external of the carcass as an entire unit, for subsequent visual inspection.

One of the key elements of the evisceration station is the ability for it to compensate for differently sized poultry without risk to damaging the poultry itself. This is accomplished by the use of various spring forces which act against the forces applied to the evisceration tool, such that the poultry 112 essentially floats in position at a predetermined force level to insure the complete cleaning of the body cavity 112d. As such, it is imperative that the stroke of the evisceration tool 234 be set to generally correspond to the largest size poultry. In this manner, smaller poultry will float with respect to the spoon 276 of the evisceration tool 234 to compensate for the larger stroke.

Prior to being transferred to the poultry processor 10, the neck of each poultry 112 is broken to facilitate removal of the crop. By removing the crop before inspection, there is an unobstructed visual look at the internal barrel of the carcass during the inspection process, as described in more detail hereinafter. In addition, by removing the crop before inspection, there is no risk of contaminating the poultry by a subsequent error in removing the crop.

Figure 23:
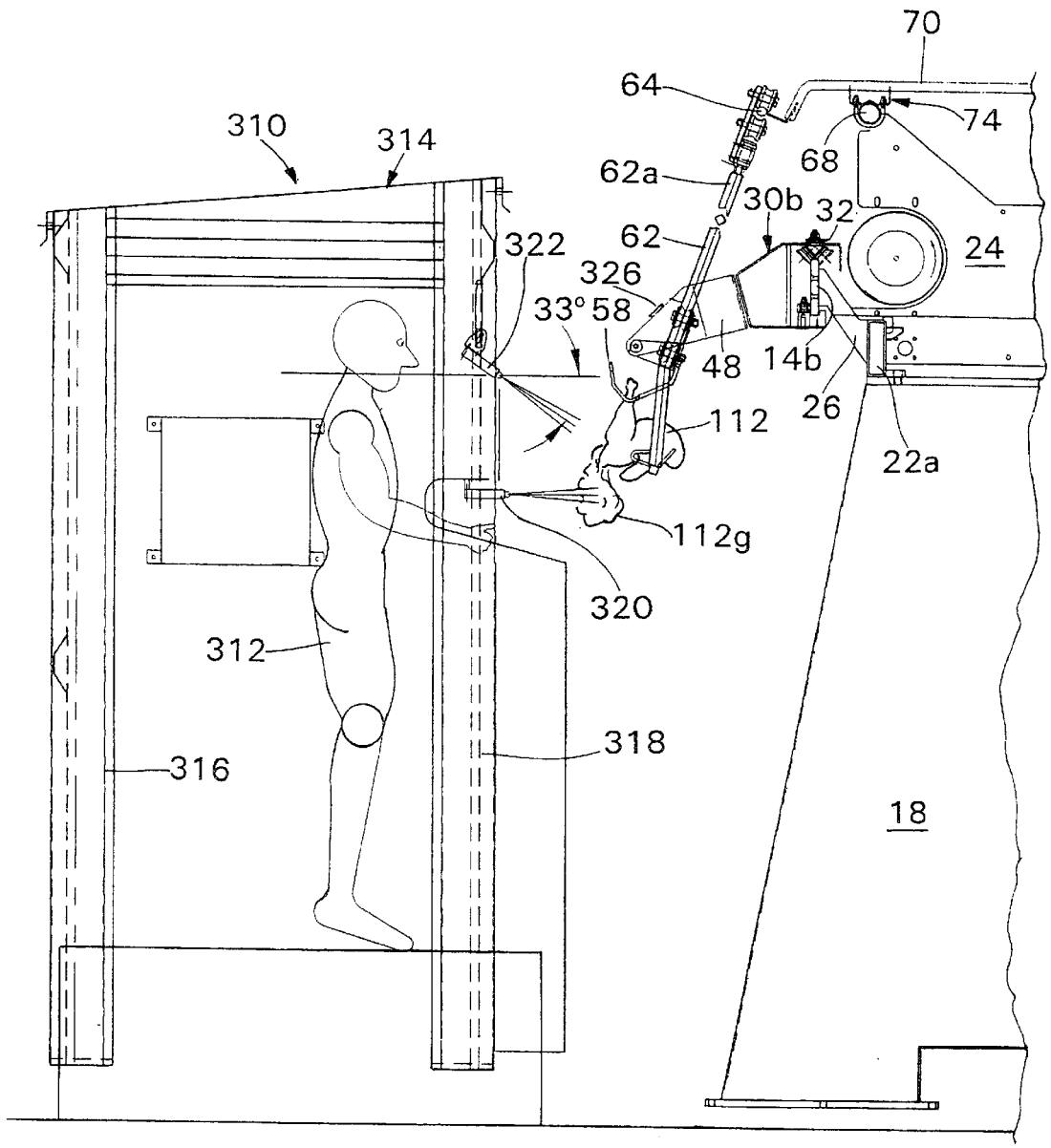
FIG. 23 is an enlarged cross-sectional view of the inspection station shown in FIG. 2, taken along line 23–23 of FIG. 2.

Referring now to FIG. 23, there is shown an inspection station 310 for inspecting the poultry on line without the inspector 312 physically touching the poultry 112 or the viscera package 112g. Like the venting and opening station 110 and eviscerating station 210, the poultry 112 is conveyed through the inspection station 310 on the train of cars 30. However, unlike the venting and opening station 110 and eviscerating station 210, the train of cars 30 is not in a stationary position during the inspection process. Instead, the train of cars 30 is continuously moved through the inspection station at a constant rate of speed.

As shown in FIG. 23, the inspector is located within an inspection stand 314. The inspection stand 314 includes a frame 316 which surrounds the inspector.

The frame 316 includes a front wall 318 which has an opening therein (not shown) for viewing the poultry 112 as it passes by the inspector 312. First and second lights 320 and 322 are mounted proximate the opening on the front wall 318 of the frame 316. The first light 320 extends generally horizontally, and is directed at the viscera package 112g. The second light 322 is positioned above the first light 320, and extends downwardly at an angle of approximate thirty-three degrees, to shine into the body cavity 112d. In the present embodiment, it is preferred that the first and second lights 320, 322 be of a wavelength which generally corresponds to natural sunlight, to provide the inspector with a natural view of the viscera package 112g and internal body cavity 112d to identify any potential ailments or concerns.

The poultry 112 is passing in front of the inspection station 314 at a speed of approximately seventy poultry per minute. As such, the inspector 312 has a ten-inch window to visually inspect the poultry 112 as it passes by the window in just less than one second. For this reason, it is important that the lighting be of high quality to provide the inspector 312 with the best possible view in a short period of time.

While inspecting the poultry 112, if the inspector 312 detects a poultry 112 that should either be condemned, or radially cleaned out, he can individually tag that poultry for the specific process needed. This is accomplished by physically moving an indication element or flag located on the car 30 proximate the poultry 112 being inspected. Referring now to FIG. 5, there is shown first and second flags 324, 326 (the flags 324, 326 are only shown in FIGS. 5 and 23) pivotally mounted to the pintle mechanism 60 external to the side plates 54 of the extension arm 48. The first and second flags 324, 326, each include a tab 324a, 326a, respectively, extending therefrom. Both sides of the tab 324a of the first flag 324 are colored red, whereas both sides of the tab 326a of the second flag 326 are colored yellow. Both the first and second flags 324, 326 are pivotable about the pintle mechanism 60 between the position shown in solid lines in FIG. 5, and a generally downwardly extending position, as shown in phantom in FIG. 5 in connection with the first flag 324. When either of the first and second flags 324, 326 is in the downwardly extending position, a proximity sensor detects this position, to signal the microprocessor of an upcoming poultry that needs special processing.

For instance, in the event that the first flag 324 were moved to the downwardly extended position, it would trigger a proximity sensor which would identify the poultry 112 hanging in the hock hooks 58 proximate the first flag 324 as being condemned. Then, just downstream from the inspection station 310, the condemned carcass would be removed from the conveyor 12 automatically by a condemned carcass removal station (not shown). Similarly, if the inspector moves the second flag 326 to the downwardly extended position, it will identify the associated poultry 112 as requiring a radical clean out procedure. Again, a proximity sensor (not shown) will identify the second flag 326 being in the radical clean out location, and send a signal to the microprocessor which will in turn communicate with the cleaning station 410 to process the identified particular poultry 112 with the radical clean out procedure. If neither of the first or second flags 324, 326 are moved to the downwardly extended position by the inspector, then the poultry 112 will receive the normal clean out procedure. In this manner, each inspected poultry 112 is treated individually and automatically, to result in a generally high yield by the poultry processor 10.

While in the present embodiment it is preferred that the first and second flags 324, 326 be used to identify the condition of the inspected poultry, it is understood by those of ordinary skill in the art that other methods could be used to tag the inspected poultry with subsequent treatment conditions. For instance, a voiceactivated computer interface (VACI) could be used. In this event, as the poultry 112 passes through a specific window, the inspector can give a voice command identifying the particular process that the poultry 112 should receive. In this manner, the VACI can record all dispositions, and signal for condemned carcasses to be removed from the line automatically. The VACI will also signal the cleaning station 410 to perform a radical clean out, if the inspector requests that one be done, or, if a flock's condition reaches a level where twenty percent of the flock is receiving the radical treatment, it will automatically signal the radical treatment for all poultry until conditions fall below seventeen percent. The normal and radical clean out procedures are described in more detail hereinafter in connection with the cleaning station 410.

Referring now to FIGS. 24 through 30, there is shown an apparatus or cleaning station 410 for cleaning the inside of the body cavity 112d, including the neck or neck cavity 112h, of a plurality of slaughtered, eviscerated poultry 112, with either a normal clean out procedure or a radical clean out procedure. The body cavity 112d includes leaf fat pads, sex glands and kidneys (not shown), in locations well understood by those of ordinary skill in the art. The normal clean out procedure maintains the leaf fat pads, sex glands and kidneys in the body cavity 112d, and the radical clean out procedure removes the leaf fat pad, sex glands and kidneys from the body cavity 112d, as described in more detail hereinafter.

The cleaning station 410 is positioned downstream from the inspection station 310. The conveyor 12 transports the poultry 112 along a predetermined path through the cleaning station 410, generally identical to that described above in connection with the evisceration station 210. Similarly, the poultry 112 is positioned on the cars 30 generally identically to that described above in connection with the evisceration station 210. Accordingly, further description of the process of conveying and supporting the poultry 112 through the cleaning station 410, is omitted for purposes of brevity and convenience only, and is not limiting. Prior to entering the cleaning station 410, the viscera package 112g hanging from the poultry 112 is removed automatically for further separate processing in a manner well understood by those of ordinary skill in the art.

Referring now to FIGS. 28A–28D, the cleaning station 410 includes a locating arm 414 having a first end 414a movable between a stowed position (see FIG. 28A) spaced from the conveyed poultry 112, and a cleaning position (see FIGS. 28A–28D) wherein the poultry 112 is clamped in position on the first end 14a. A support plate 424 is movably mounted on the first end to move between a fully extended position when the locating arm 414 is in the stowed position, and a compressed position when the locating arm 414 is in the cleaning position. The first end 414a of the locating arm 414 further includes a movably mounted breast positioning bar 426 movable between an open position (see FIG. 28A) when the locating arm 414 is in the stowed position, and a clamping position (see FIGS. 28B–D) when the locating arm is in the cleaning position. Similarly, the first end 414a includes a pair of pelvis positioning arms 430 (only one is shown) movably mounted on the first end 414a of the locating arm 414 between an open position (see FIG. 28A) when the locating arm 414 is in the stowed position, and a clamping position (see FIGS. 28B–D) when the locating arm is in the cleaning position, which holds the poultry 112 against the support plate 424.

The locating arm 414 used in connection with the cleaning station 410 is identical to the locating arm 214 used in connection with the eviscerating station 210. Accordingly, a complete description of the locating arm 414 and its elements is not repeated here, instead, reference numerals having the four hundred series prefix, instead of the two hundred series prefix, have been designated on the drawings showing the clean out station 410, to identify identical elements on the locating arm 414.

Figure 24:
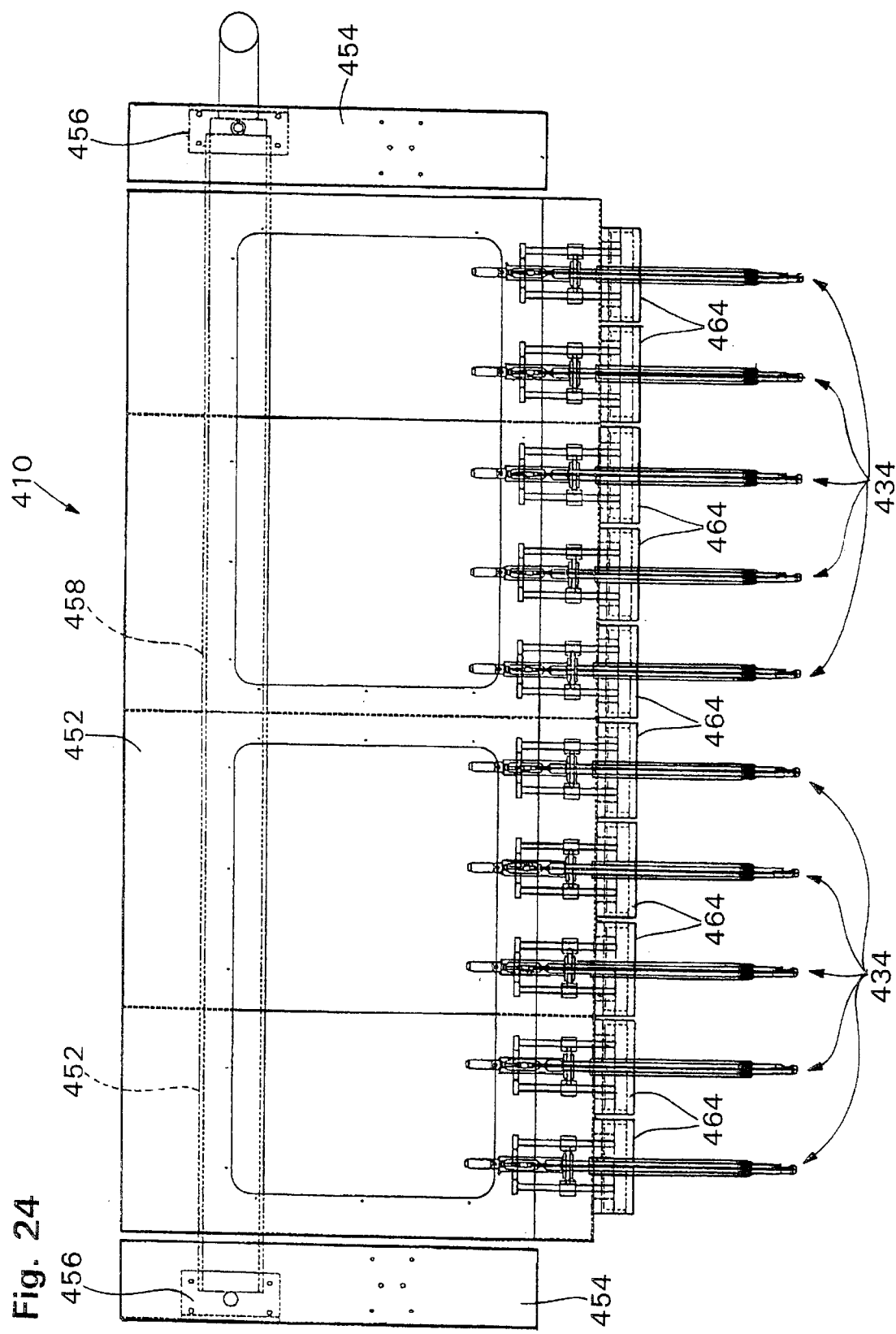
FIG. 24 is a top plan view of a cleaning station in accordance with the present invention.

Referring now to FIGS. 25 and 28A–28D, the cleaning station 410 includes a washing tool 434 having a working portion 436 insertable into the body cavity 112d of the poultry 112 through the access opening formed by the venting and opening station 110 along a predetermined path. In the preferred embodiment, as shown in FIG. 24, there is a bank of ten washing tools 434 each associated with one of the two poultry 112 hanging from each car 30 on the train of cars 30 Referring now to FIGS. 24, 25 and 28A-28D, the cleaning station 410 includes a pair of end panels 454. The end panels 454 house the hydraulic cylinder 448a and rod 448b for movement of the end panels with respect to the carriage beam 442. Positioned between the end panels 454 is a central housing 452. A trunnion 456 extends through the back half of the central housing 452 into the end panels 454 to allow the central housing to pivot with respect to the end panels 454 about the trunnion 456. A vacuum tube 458 extends through the center of the trunnion 456, and is in the form of a header, to allow each of the washing tools 434 to vacuum the body cavity 112d of the poultry 112, as described in more detail hereinafter.

The end panels 454 and central housing 452 are slidably disposed on the carriage beam 442 by a pair of bushings 447, and their position is controlled by the hydraulic cylinder 448a and rod 448b in engagement with a column 450 extending upwardly from the carriage beam 442. The carriage beam 442 is supported proximate the conveyor 12 by an eighth frame 440. The eighth frame 440, carriage beam 442, bearings 447, hydraulic cylinder 448a, rod 448b, column 450, are generally identical to the corresponding elements having the two hundred series prefix described above in connection with the eviscerating station 210. Accordingly, further description of this portion of the cleaning station 410 is omitted for purposes of convenience and brevity only, and is not limiting.

Figure 25:
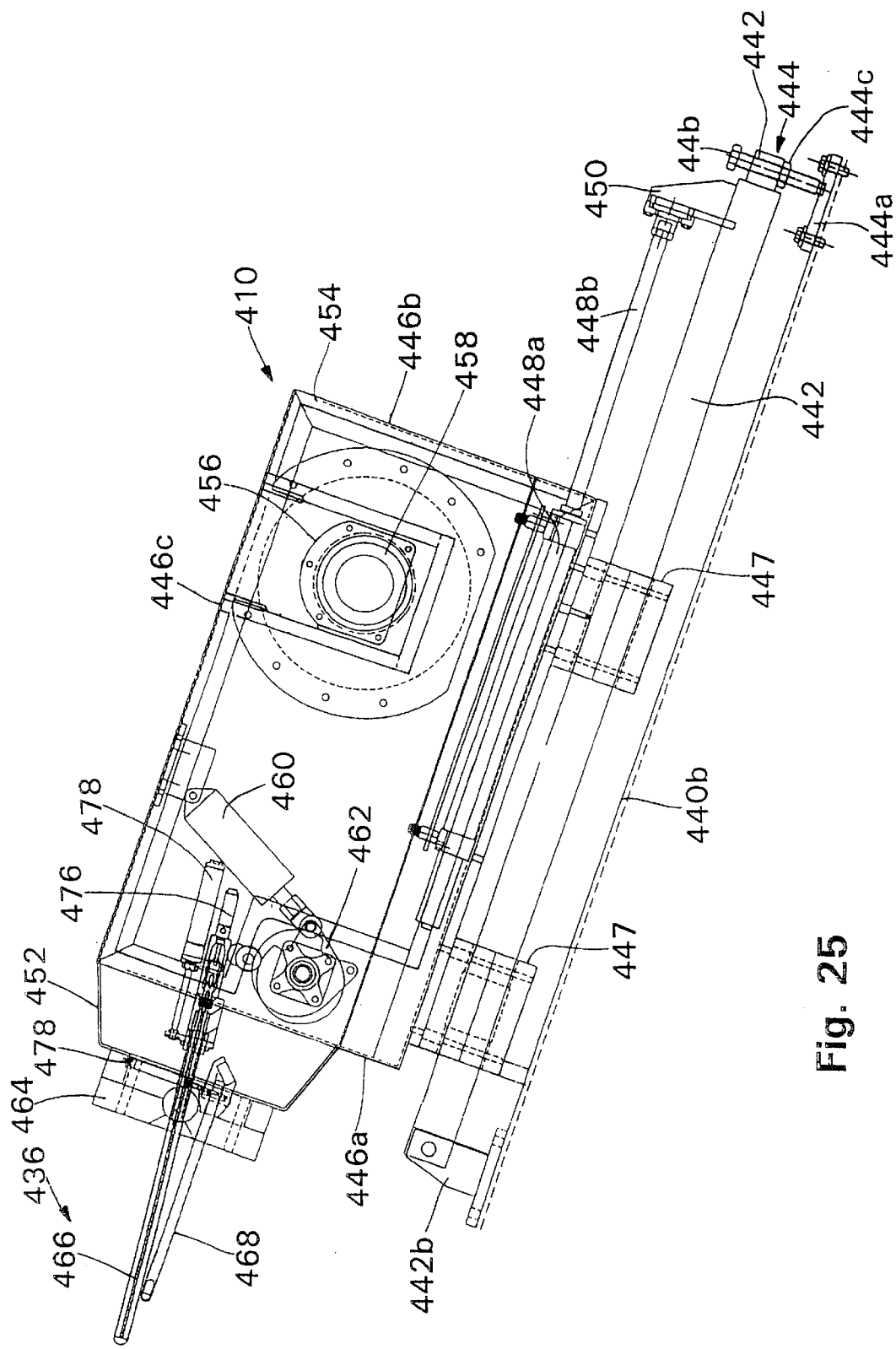
FIG. 25 is an enlarged left-side elevational view of the cleaning station shown in FIG. 24.
Figure 28B:
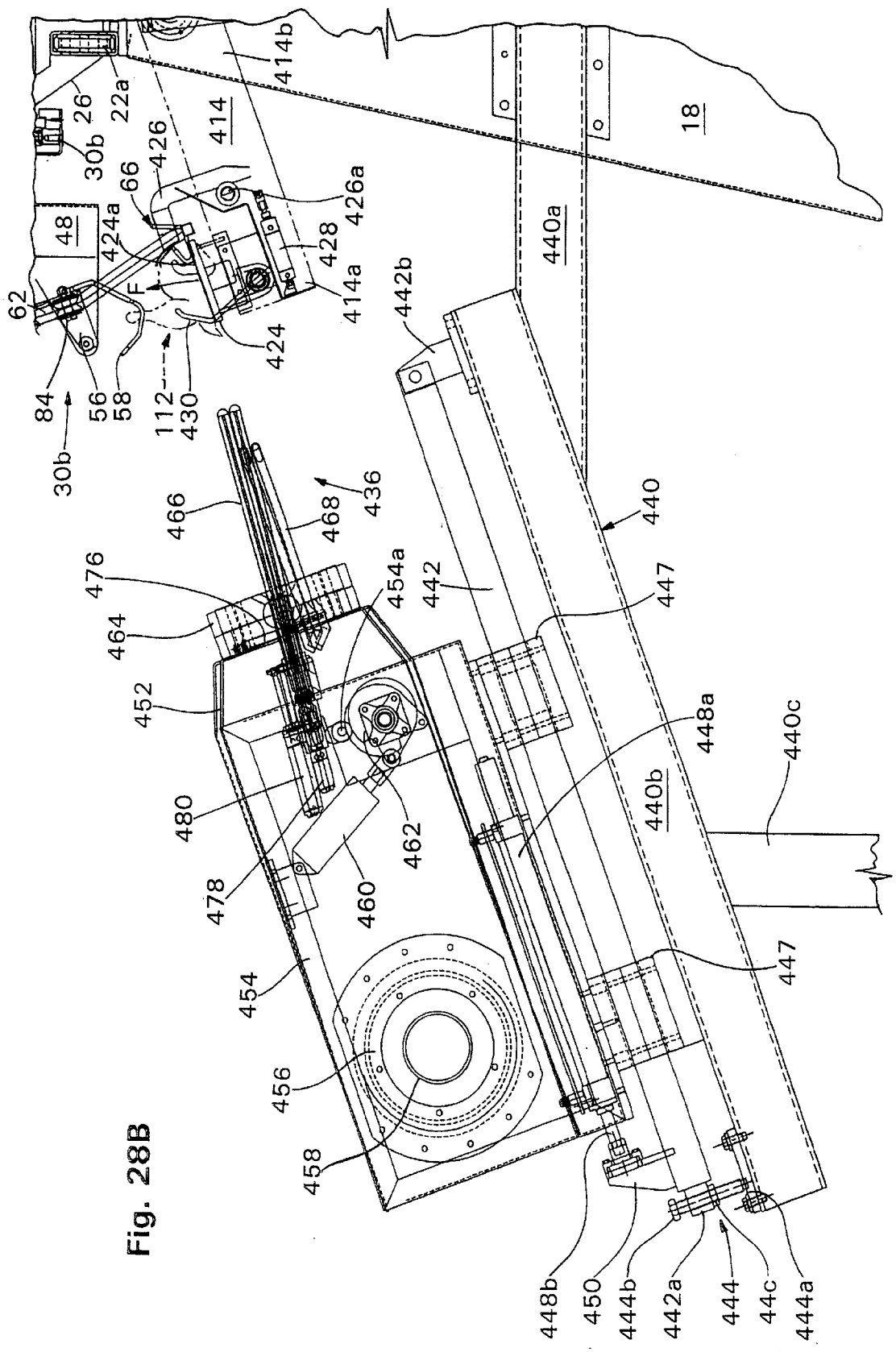
Figure 28C:
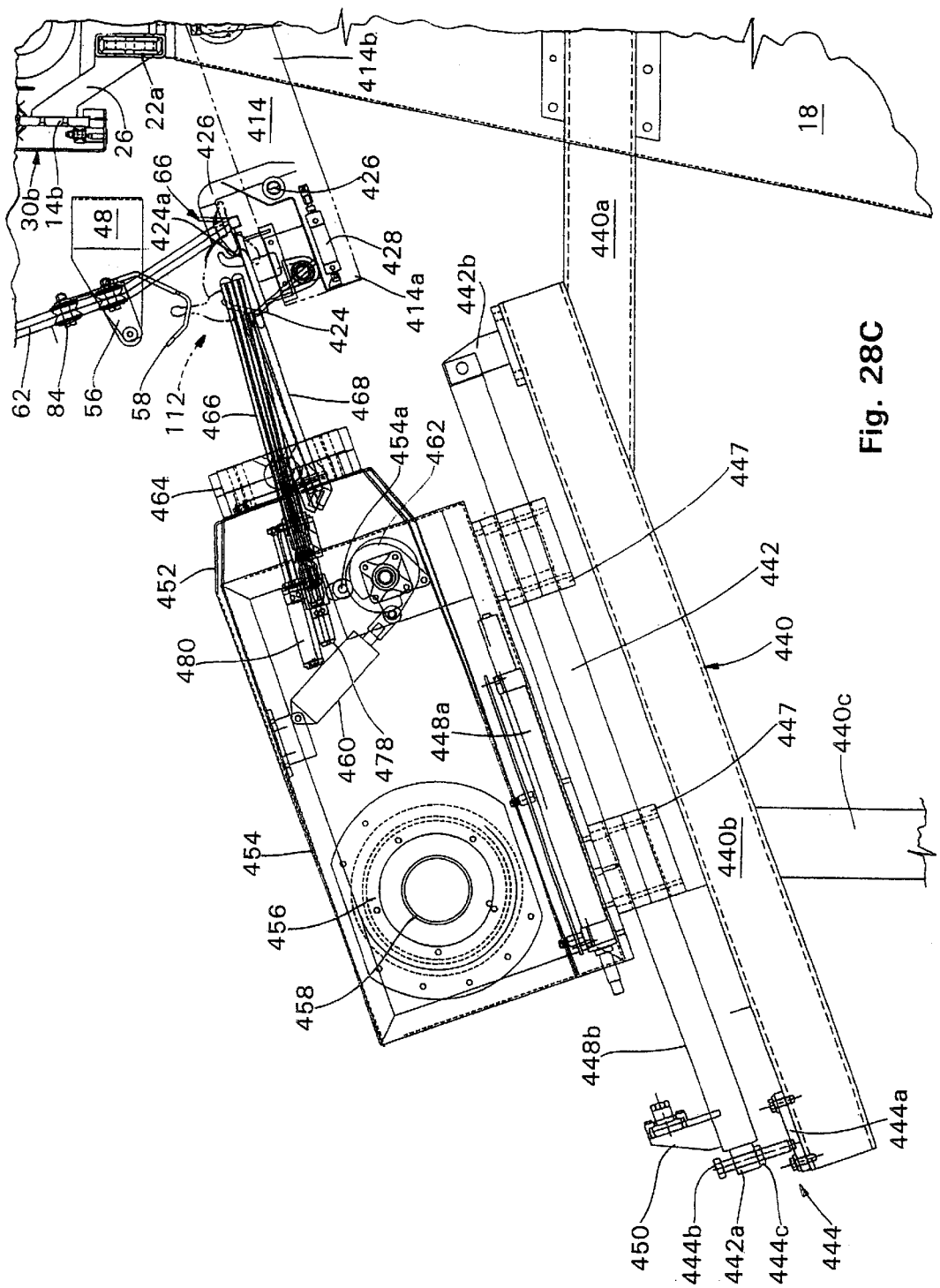
Figure 28D:
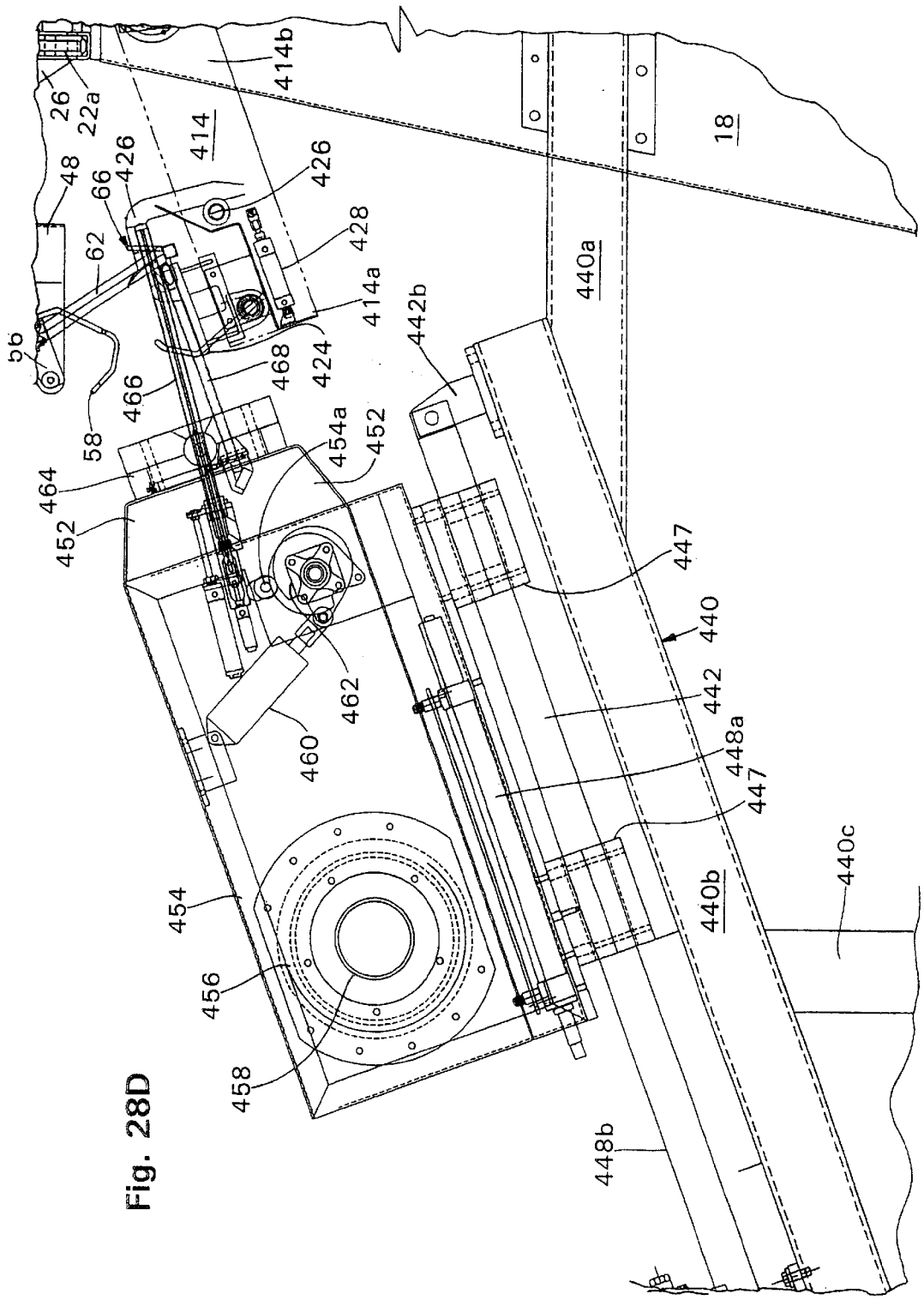

Referring now to FIGS. 25 and 28C, housed within each end panel 454 is a ninth pneumatic cylinder 460 which extends between the upper surface of the end panel 454 and an eccentric cam 462. The eccentric cam 462 extends inwardly from the end panels 454 into engagement with a cam follower 454a mounted on the central housing 452 such that, upon actuation of the ninth pneumatic cylinder 460, the eccentric cam 462 rotates, causing the central housing to pivot upwardly approximately three-quarters of an inch, as best shown in FIG. 28C.

Between each of the washing tools 434 and the front face of the central housing 452 is a control block 464 for securing the washing tools 434 to the central housing 452. The control block 464 is similar to the control block 254 discussed above in connection with the eviscerating station 210.

Figure 31:
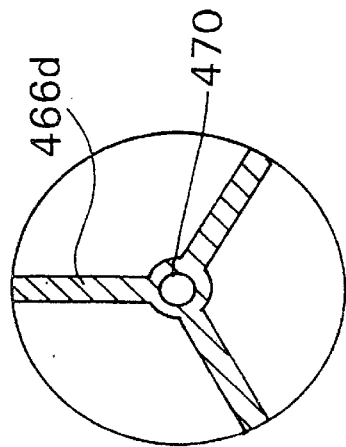
FIG. 31 is a cross-sectional view of the cropper shown in FIG. 30, taken along line 31—31 of FIG. 30.
Figure 30:
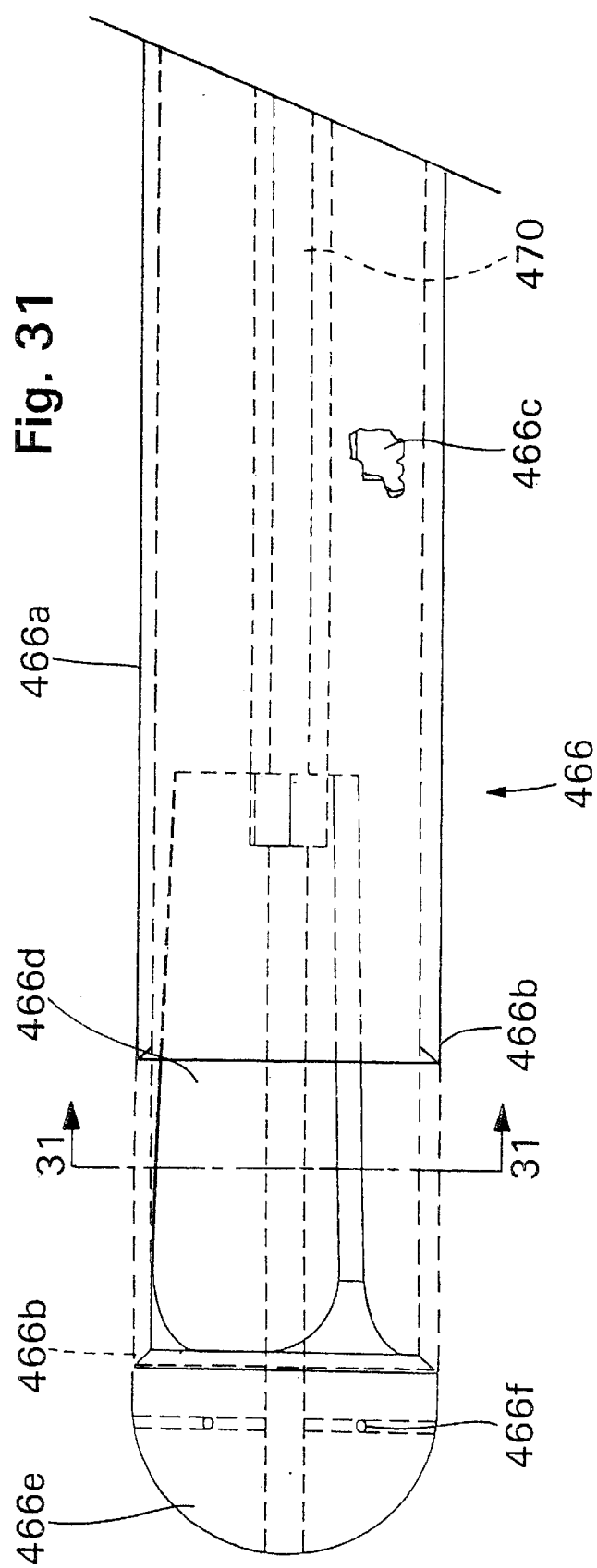
FIG. 30 is a greatly enlarged side-elevational view of a cropper which forms part of the clean-out assembly shown in FIGS. 26 and 27.

In the present embodiment, it is preferred that the washing tool 234 be comprised of a washing and vacuuming tool or cropper 466, and a pair of vacuum tools or lung tubes 468. Referring now to FIGS. 30 and 31, there is shown the cropper 466. The cropper 466 includes an elongate hollow tube 466a having a first end 466b and an interior area 466c. The cropper 466 also includes a rod 466d having a first end 466e with a plurality of holes 466f therein in fluid communication with a source of fluid, such as tap water (not shown). The rod 466d is reciprocally mounted within the tube 466a to move between a closed position (shown in phantom) wherein the first end 466e of the rod 466d is sealingly engaged with the first end 466b of the tube 466, and an open position (shown in solid lines) wherein the first end 466e of the rod 466d is spaced from the first end 466b of the tube 466a. The rod 466d is sized to create a radial space between the rod 466d and the tube 466a such that a vacuum can be applied to the interior area 466c when the rod 466d is in the open position, to thereby cause portions of the inside of the poultry 112 to be pulled into the tube 466a through the first end 466b thereof.

As shown in FIG. 30, an elongate bore 470 extends through the rod 466d and is in fluid communication with the first end 466e thereof, to allow fluid to be dispensed therethrough. The first end 466e of the rod 466d is generally semi-spherical, and includes a chamfered portion which complements the first end 466b of the elongate tube 466a. Inwardly of the first end 466e of the rod 466d, the rod 466d is generally Tshaped in cross section to assist with supporting the first end 466e with respect to the elongate tube 466a when the rod 466d is in the open position.

Referring now to FIGS. 29A and 29B, there is shown the lung tubes 468. The lung tubes 468 include a generally oval opening or vacuum port 472 at one end thereof. As best shown in FIG. 29B, the oval opening 472 is formed along a side of the lung tubes 468 to control the direction of any vacuum applied through the lung tubes 468. The opposite end of the lung tubes 468 include a flange 474 which is used to control the rotational position of the lung tubes 468, as described in more detail hereinafter. The lung tubes 468 are preferably hollow, to permit a vacuum source to be applied to the oval opening 472 to remove various organs and fluid from the body cavity 112d of the poultry 112. For reasons described hereinafter, it is preferred that the lung tubes 468 be provided as a pair, to allow a sweeping vacuum motion to be provided as the lung tubes 468 are reciprocated within the body cavity 112d of the poultry 112.

Figure 27:
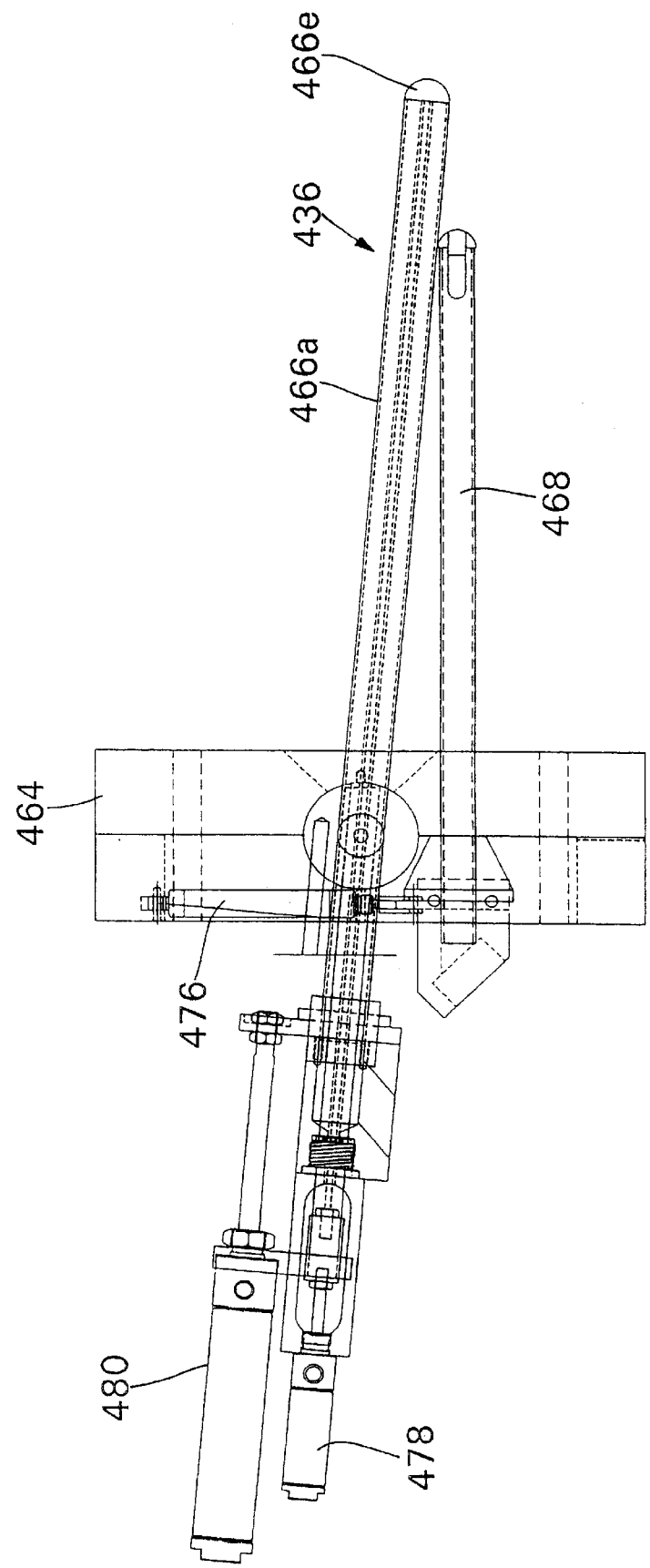
FIG. 27 is a right-side elevational view of FIG. 26.

Referring now to FIG. 27, the lung tubes 468 are mounted within the control block 464 to rotate with respect thereto. A tenth pneumatic cylinder 476 is provided for each lung tube 468, and is in engagement with the flange 474 such that, upon actuation of the tenth pneumatic cylinder 476, rotation of the lung tubes 468 is provided. More particularly, the tenth pneumatic cylinder 476 causes the lung tubes 468 to rotate from a first position wherein the oval openings 472 are oppositely facing to a second position wherein the oval openings face downwardly towards the internal back wall 112f of the body cavity 112d when the lung tubes 468 are located therein. The tenth pneumatic cylinder 476 is housed within the control block 464.

Figure 26:
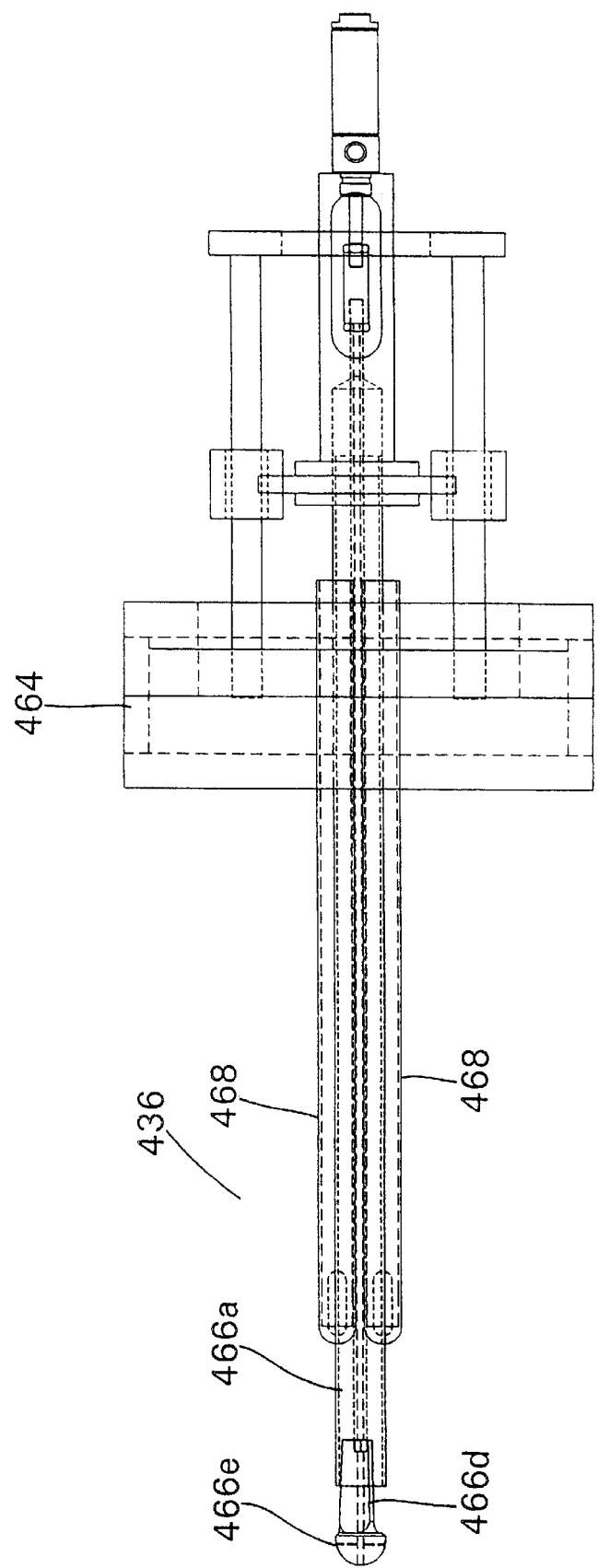
FIG. 26 is a greatly enlarged top plan view of a portion of the cleaning station shown in FIG. 24 showing the clean-out assembly.

With reference to FIGS. 26 and 27, the cropper 466 extends through a central opening formed in the control block 464. The first end 466e of the rod 466d is located just beyond the terminal end of the lung tubes 468, as best shown in FIG. 27. Movement of the rod 466d with respect to the elongate tube 466a is achieved by an eleventh pneumatic cylinder 478 located within the central housing 452.

In addition, the cropper 466 is movable longitudinally with respect to the control block 464 and lung tubes 468. A twelfth pneumatic cylinder 480 controls the longitudinal movement of the cropper 466 with respect to the control block 464 and lung tubes 468. The specific manner in which the tenth, eleventh and twelfth pneumatic cylinders 476, 478, 480 engage and move the lung tubes 468 and cropper 466 is not pertinent to the present invention, as many linkages could be used to carry out the intended preferred motion of the cropper 466 and lung tubes 468, without departing from the spirit and scope of the invention. Accordingly, further description is omitted for purposes of convenience and brevity only.

In use, the inspection and cleaning stations 310, 410 are used together to control whether the poultry 112 receives a normal or radical clean out procedure. First, the poultry 112 is conveyed through the inspection station 310 with the poultry 112 positioned on the conveyor 12 in a first position, as described above and shown in FIG. 23, to permit inspection of the poultry 112. The inspector 312 inspects the poultry 112. If the inspector 312 identifies a particularly poultry 112 as requiring the radical clean out procedure, such as if the poultry 112 has an air sac salvage, GIT contamination, kidney infection, minor air sac or a condemned viscera. The inspector 312 then selects the poultry 112 for the radical clean out procedure by moving the second flag or indicating element 326 to the downwardly extending position. That is, the inspector 312 selects the poultry 112 to receive the radical clean out procedure by changing the position of the second flag or indicating element 326 associated and being conveyed with that particular poultry 112 from the first position, which indicates a normal clean out procedure (i.e., with the flag extending upwardly), to a second position, which indicates a radical clean out procedure, wherein the second flag 326 extends downwardly. The conveyor 12 then transports the poultry 112 to the cleaning station 410.

The selected poultry 112 is then identified, and passed through the cleaning station 410, and the radical clean out procedure is applied to that selected poultry 112, as described in more detail hereinafter. The selected poultry 112 is identified by sensing the position of the second flat 326 or indicating element using a proximity sensor (not shown).

Referring now to FIGS. 28A–D, after the train of cars 30 has positioned the poultry 112 within the cleaning station 410, the locating arm 414 swings upwardly to the clamping position, and the breast positioning bar 426 and pelvis positioning arm 430 are pivoted to the clamping positions, to secure the poultry 112 on the support plate 424, as shown in FIG. 28B. Simultaneously, the ninth pneumatic-cylinders 460 located in the end panels 54 are actuated to move the eccentric cam 462, thereby lifting the entire central housing 452 upwardly approximately three-quarters of an inch. This positions the cropper 466 and lung tubes 468 for proper entry into the access opening created by the venting and opening station 110.

Referring now to FIG. 28C and with respect to the radical clean out procedure, the hydraulic cylinders 448a located within the end panels 454 are then actuated to move the central housing 452 approximately eight inches along the carriage beam 442. At this location, the first end 466e of the rod 466d of the cropper 466 is located at the access opening of the poultry 112. The eleventh pneumatic cylinder 478 is then actuated to move the rod 466d through the elongate tube 466a to space the first end 466e therefrom. The hydraulic cylinder 448a within the end panels 454 is then further actuated to move the central housing 452 along the carriage beam 442 approximately three more inches, to pass the first end 466e of the cropper 466 into the body cavity 112d of the poultry 112. As the cropper 466 is being moved into the access opening of the poultry 112, the vacuum is applied to the interior area 466c of the cropper, to vacuum the leaf fat pads from the body cavity 112d into the first end 466b of the elongate tube 466a of the cropper 466. As the central housing 252 is moved from the eight-inch position to the eleven-inch position, the ninth pneumatic cylinders 460 within the end panels 454 are actuated to lower the central housing 452, and the cropper 466 therewith, into the body cavity 112b of the poultry 112. The central housing 452 is then further advanced along the carriage beam 442 until the cropper 466 is positioned within the neck 112h of the poultry 112. To insure that the cropper 466 is sufficiently positioned within the neck 112h of the poultry 112, the twelfth pneumatic cylinder is actuated to extend the cropper 466 further outwardly with respect to the control block 464 into the neck 112h of the poultry 112. During this movement, the vacuum applied to the cropper 466 is maintained on.

With the cropper 466 located in the neck 112h of the poultry 112, the first end 466e of the rod 466d is moved rearwardly into engagement with the first end 466b of the elongate tube 466a to grasp the poultry's crop (if still present after the evisceration process) with the cropper 466. Simultaneously, the tenth pneumatic cylinder 476 is actuated to rotate the oval openings or vacuum ports 472, which were facing outwardly, downwardly in facing relation with the lungs and internal back wall 112f of the poultry 112 to vacuum the lungs through the oval opening 472 of the lung tubes 468. Fluid is then applied through the bore 470 of the rod 466d to begin washing the body cavity 112d of the poultry 112. The hydraulic cylinder 448a and the twelfth pneumatic cylinder 480 are then actuated to slowly begin removing the cropper 466 and lung tubes 468 from the body cavity 112d of the poultry 112. The lung tubes 468 are maintained with the oval opening 472 in the downwardly facing position to remove the kidneys from the body cavity 112d of the poultry 112 as the cropper 466 and lung tubes 468 exit the body cavity. In this manner, the body cavity 112d of the poultry 112 is radically cleaned out.

In the normal clean out procedure, the leaf fat pads and kidneys are maintained within the body cavity 112d of the poultry 112. As such, when the cropper 466 is placed within the body cavity 112d, the vacuum is not turned on until the cropper 466 is within the neck 112h of the poultry 112. Similarly, as the lung tubes 468 are being retracted from the body cavity 112, prior to reaching the kidney area along the back wall 112f of the body cavity 112d, the vacuum is turned off and the lung tubes 468 are rotated outwardly so that the oval opening or vacuum port 472 faces away from the kidneys, thereby leaving the kidneys in tact within the body cavity. After the poultry 112 has completed its processing in the cleaning station 410, it is indexed further along the conveyor 12, whereupon it is removed from the poultry processor 10 for further processing, such as de-boning and/or packaging.

The path of the cropper 466 and lung tubes 468 is selected in order to correspond to the generally largest poultry which is processed by the cleaning station 410. As such, the locating arm 414 is used so that the poultry 112 will float with respect to the cropper 466 and lung tubes 468, in a manner generally identical to that described above in connection with the eviscerating station 210. Accordingly, as the cropper 466 is moved into the neck 112h of the poultry 112, it is done with a third force, which is greater than the second force applied by the breast positioning bar 226, such that the neck 112h of the poultry 112 can move with respect to the first end 414a while being maintained against the cropper 466 without the cropper 466 damaging the neck 112h. As the lung tubes 468 are moved along the back wall 112f of the cavity 112d, a fourth force is applied, which is greater than the first force of the support plate 424, such that the back wall 112f of the poultry 112 and the support plate 424 can move with respect to the first end 414a while the back wall 112f is maintained against the lung tubes 468 without the lung tubes 468 damaging the back wall 112f.

Since the cropper 466 is not rotated during the cropping process, the chances of damaging the neck 112h of the poultry are reduced. Similarly, since the cleaning station 410 can individually process the poultry with a normal or radical clean out procedure, the poultry processor 10 reduces processing time and the extra equipment normally used to carry out the radical clean out procedure. Moreover, the yield of the poultry processor 10 is at a maximum because only those birds that require the radical clean out procedure receive the same.

From the foregoing description, it can be seen that the present invention comprises a poultry processor which automatically vents/opens the poultry, eviscerates the poultry, displays it for inspection and cleans the poultry. It will be appreciated by those skilled in the art that changes and modifications may be made to the above-described embodiment without departing from the inventive concepts thereof It is understood, therefore, that the present invention is not limited to the particular embodiment disclosed, but it is intended to include all modifications and changes which are within the scope and spirit of the invention as defined by the appended claims.

What is claimed is:

1. An elongated washer for cleaning the inside of slaughtered, eviscerated poultry, comprising:
   an elongate hollow tube having a first end and an interior area;
   a rod having a first end with a plurality of holes therein in fluid communication with a source of fluid, said rod being reciprocally mounted within said tube to move between a closed position wherein said first end of said rod is sealingly engaged with said first end of said tube and an open position wherein said first end of said rod is spaced from said first end of said tube, said rod being sized to create a radial space between said rod and said tube such that a vacuum can be applied to said interior area when said rod is in said open position to thereby cause portions of the inside of the poultry to be pulled into said tube through said first end thereof.

2. The washer as recited in claim 1 wherein said rod is generally T-shaped in cross section.

3. A method of automatically selectively cleaning the inside of a body and neck cavity of a plurality of slaughtered, eviscerated poultry with either a normal clean out procedure or a radical clean out procedure, the body cavity containing a crop, lungs, sex glands, leaf fat pads and kidneys, the normal clean out procedure maintains the leaf fat pads and kidneys in the body cavity and the radical clean out procedure removes the leaf fat pads, sex glands and kidneys from the body cavity, said method comprising the steps of:
   (a) conveying the poultry through an inspection station, the poultry being positioned on said conveyor in a first position to permit inspection of the poultry;
   (b) inspecting the poultry;
   (c) selecting a portion of the poultry for receiving the radical clean out procedure;
   (d) conveying the poultry through a cleaning station;
   (e) identifying said selected poultry passing through the cleaning station and applying the radical clean out procedure to said selected poultry; and
   (f) applying the normal clean out procedure to a balance of the poultry.

4. The method of claim 3 wherein step (c) comprises:
   (c) selecting a portion of the poultry for receiving the radical clean out procedure by changing a position of an indicating element associated and being conveyed with each poultry from a first position which indicates a normal clean out procedure to a second position which indicates a radical clean out procedure.

5. The method of claim 4 wherein step (e) comprises identifying said selected poultry passing through the cleaning station by sensing said position of said indicating element and applying the radical clean out procedure to said selected poultry.

6. The method of claim 3 wherein the radical clean out procedure of step (e) comprises:
   (e)(1) passing a first end of a washing and vacuuming tool into the body cavity of the poultry;
   (e)(2) vacuuming the leaf fat pads from the body cavity into said first end of said tool;
   (e)(3) moving said first end of said tool into the neck cavity of the poultry;
   (e)(4) moving a first end of a second vacuum tool having a vacuum port into the body cavity proximate the lungs with the vacuum port facing away from the lungs;
   (e)(5) grasping the crop with the first end of said washing and vacuuming tool;
   (e)(6) retracting said washing and vacuuming tool from the body cavity while dispensing a washing fluid from said first end thereof;
   (e)(7) moving the second vacuum tool to position the vacuum port in facing relation with the lungs to vacuum the lungs through the first end of said vacuuming tool; and
   (e)(8) retracting the first end of the vacuum tool from the body cavity while vacuuming the kidneys from the body cavity.

7. The method of claim 3 wherein the normal clean out procedure of step (f) comprises:
   (f)(1) passing a first end of a washing and vacuuming tool into the neck of the body cavity of the poultry;
   (f)(2) moving a first end of a second vacuum tool having a vacuum port into the body cavity proximate the lungs with the vacuum port facing away from the lungs;
   (f)(3) vacuuming a the neck cavity of the poultry with the first end of the washing and vacuuming tool;
   (f)(5) grasping the crop with the first end of said washing and vacuuming tool;
   (f)(6) retracting said washing and vacuuming tool from the body cavity while dispensing a washing fluid from said first end thereof;
   (f)(7) moving the second vacuum tool to position the vacuum port in facing relation with the lungs to vacuum the lungs through the first end of said vacuuming tool; and
   (f)(8) retracting the first end of the vacuum tool from the body cavity while moving the vacuum port to face away from the lungs to prevent vacuuming the kidneys from the body cavity.

8. An apparatus for cleaning the inside of a body cavity, including a neck cavity, of a plurality of slaughtered, eviscerated poultry with either a normal clean out procedure or a radical clean out procedure, the body cavity having a back wall and containing leaf fat pads, sex glands and kidneys, the normal clean out procedure maintains the leaf fat pads, sex glands and kidneys in the body cavity and the radical clean out procedure removes the leaf fat pads, sex glands and kidneys from the body cavity, said apparatus comprising:

a conveyor receiving the poultry and transporting the poultry along a predetermined path, the poultry being positioned on said conveyor in a first position;

a cleaning station receiving the conveyed poultry, said cleaning station comprising:

a locating arm having a first end movable between a stowed position spaced from said conveyed poultry and a cleaning position wherein the poultry is clamped in position on said first end, a support plate movably mounted on said first end to move between a fully extended position when said locating arm is in said stowed position and a compressed position when said locating arm is in said cleaning position, said support plate being biased toward said extended position by a first force, said first end including a movably mounted breast positioning bar movable between an open position when said locating arm is in said stowed position and a clamping position when said locating arm is in said cleaning position, said locating arm being located with respect to said conveyor such that as said first end moves from the stowed position to said cleaning position the support plate engages the back of the poultry and maintains the back in a position in the range of 0° and 40° downwardly from a horizontal plane, said breast positioning bar being moved to said clamping position to bias the poultry toward said support plate with a second force less than said first force to hold the poultry against said support plate in position for cleaning the poultry when said locating arm is in said cleaning position;

a washing tool having a working portion insertable into the body cavity of the poultry through the access opening along a predetermined path, a portion of the predetermined path included moving said working portion of the tool into the neck cavity of the poultry with a third force which is greater than said second force such that the neck of the poultry can move with respect to the first end while being maintained against the working portion of the tool without the working portion damaging the neck, another portion of the predetermined path including moving said working portion of said tool along the back wall of the cavity with a fourth force which is greater than said first force such that the back wall of the poultry and support plate can move with respect to the first end while the back wall is maintained against the working portion of the tool without the working portion damaging the back wall.

9. The apparatus of claim 8 further comprising a pelvis positioning arm movably mounted on the first end of said locating arm between an open position when the locating arm is in the stowed position and a clamping position when the locating arm is in the cleaning position which holds the poultry against said support plate, said pelvis positioning arm being biased toward said clamping position with a fifth force which is less than said fourth force.

10. The apparatus of claim 8 wherein said support plate includes two upwardly extending, spaced apart flanges for receiving the poultry therebetween and assist properly positioning the poultry on the support plate for the cleaning process.

11. The apparatus of claim 8 wherein as the first end moves to said cleaning position the support plate engages the back of the poultry and lifts the back to a position in the range of 22° and 28° downwardly from a horizontal plane.

12. The apparatus of claim 8 wherein the first and second forces are spring forces.

* * * * *